United States Patent
Shahparnia et al.

(10) Patent No.: US 10,061,450 B2
(45) Date of Patent: Aug. 28, 2018

(54) COARSE SCAN AND TARGETED ACTIVE MODE SCAN FOR TOUCH

(71) Applicant: Apple Inc., Cupertino, CA (US)

(72) Inventors: Shahrooz Shahparnia, Monte Sereno, CA (US); Christopher Tenzin Mullens, San Francisco, CA (US); Martin Paul Grunthaner, Los Altos Hills, CA (US); Adam Geboff, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/869,982

(22) Filed: Sep. 29, 2015

(65) Prior Publication Data

US 2016/0162102 A1 Jun. 9, 2016

Related U.S. Application Data

(60) Provisional application No. 62/087,792, filed on Dec. 4, 2014.

(51) Int. Cl.
*G09G 5/00* (2006.01)
*G06F 3/044* (2006.01)
(Continued)

(52) U.S. Cl.
CPC .......... *G06F 3/044* (2013.01); *G06F 1/3215* (2013.01); *G06F 1/3262* (2013.01); *G06F 3/0416* (2013.01); *G06F 2203/04101* (2013.01)

(58) Field of Classification Search
CPC ..... G06F 3/044; G06F 3/04101; G06F 3/0416
(Continued)

(56) References Cited

U.S. PATENT DOCUMENTS 3,462,692 A 8/1969 Bartlett
3,970,846 A 7/1976 Schofield et al.
(Continued)

FOREIGN PATENT DOCUMENTS

CN 1243282 A 2/2000
CN 1278348 A 12/2000
(Continued)

OTHER PUBLICATIONS

Non-Final Office Action dated Jul. 28, 2016, for U.S. Appl. No. 13/560,963, filed Jul. 27, 2012, twelve pages.
(Continued)

*Primary Examiner* — Jennifer Nguyen
(74) *Attorney, Agent, or Firm* — Morrison & Foerster LLP

(57) ABSTRACT

Power consumption of touch sensing operations for touch sensitive devices can be reduced by implementing a coarse scan (e.g., banked common mode scan) to coarsely detect the presence or absence of an object touching or proximate to a touch sensor panel and the results of the coarse scan can be used to dynamically adjust the operation of the touch sensitive device to perform or not perform a fine scan (e.g., targeted active mode scan). In some examples, the results of the coarse scan can be used to program a touch controller for the next touch sensing frame to idle when no touch event is detected or to perform a fine scan when one or more touch events are detected. In some examples, the results of the coarse scan can be used to abort a scheduled fine scan during the current touch sensing frame when no touch event is detected.

20 Claims, 21 Drawing Sheets

(51) Int. Cl.
*G06F 3/041* (2006.01)
*G06F 1/32* (2006.01)

(58) Field of Classification Search
USPC ..................................... 345/174; 178/18.06
See application file for complete search history.

(56) References Cited

U.S. PATENT DOCUMENTS

| | | |
|---|---|---|
| 4,220,815 A | 9/1980 | Gibson et al. |
| 4,281,407 A | 7/1981 | Tosima |
| 4,289,927 A | 9/1981 | Rodgers |
| 4,320,292 A | 3/1982 | Oikawa et al. |
| 4,334,219 A | 6/1982 | Paülus et al. |
| 4,345,248 A | 8/1982 | Togashi et al. |
| 4,405,921 A | 9/1983 | Mukaiyama |
| 4,439,855 A | 3/1984 | Dholakia |
| 4,476,463 A | 10/1984 | Ng et al. |
| 4,481,510 A | 11/1984 | Hareng et al. |
| 4,484,179 A | 11/1984 | Kasday |
| 4,490,607 A | 12/1984 | Pease et al. |
| 4,496,981 A | 1/1985 | Ota |
| 4,520,357 A | 5/1985 | Castleberry et al. |
| 4,542,375 A | 9/1985 | Alles et al. |
| 4,602,321 A | 7/1986 | Bornhorst |
| 4,603,356 A | 7/1986 | Bates |
| 4,642,459 A | 2/1987 | Casewell et al. |
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A | 5/1992 | Blonder et al. |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,239,152 A | 8/1993 | Caldwell et al. |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Van Berkel et al. |
| 5,360,426 A | 11/1994 | Muller et al. |
| 5,365,461 A | 11/1994 | Stein et al. |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,414,283 A | 5/1995 | den Boer et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,608,390 A | 3/1997 | Gasparik |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,736,980 A | 4/1998 | Iguchi et al. |
| 5,751,453 A | 5/1998 | Baur |
| 5,757,522 A | 5/1998 | Kulick et al. |
| 5,767,623 A | 6/1998 | Friedman et al. |
| 5,777,713 A | 7/1998 | Kimura |
| 5,778,108 A | 7/1998 | Coleman, Jr. |
| 5,790,106 A | 8/1998 | Hirano et al. |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | McCartney, Jr. et al. |
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,854,448 A | 12/1998 | Nozaki et al. |
| 5,854,881 A | 12/1998 | Yoshida et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Yiu et al. |
| 5,917,464 A | 6/1999 | Stearns |
| 5,920,309 A | 7/1999 | Bisset et al. |
| 5,920,360 A | 7/1999 | Coleman, Jr. |
| 5,923,320 A | 7/1999 | Murakami et al. |
| 5,926,238 A | 7/1999 | Inoue et al. |
| 5,930,591 A | 7/1999 | Huang |
| 5,940,049 A | 8/1999 | Hinman et al. |

(56) References Cited

U.S. PATENT DOCUMENTS

| | | |
|---|---|---|
| 5,942,761 A | 8/1999 | Tuli |
| 5,956,020 A | 9/1999 | D'Amico et al. |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |
| 5,995,172 A | 11/1999 | Ikeda et al. |
| 6,002,387 A | 12/1999 | Ronkka et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,117 A | 5/2000 | Fujimoto |
| 6,064,374 A | 5/2000 | Fukuzaki |
| 6,067,062 A | 5/2000 | Takasu et al. |
| 6,067,140 A | 5/2000 | Woo et al. |
| 6,069,393 A | 5/2000 | Hatanaka et al. |
| 6,078,378 A | 6/2000 | Lu et al. |
| 6,087,599 A | 7/2000 | Knowles |
| 6,091,030 A | 7/2000 | Tagawa et al. |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward |
| 6,188,391 B1 | 2/2001 | Seely et al. |
| 6,188,781 B1 | 2/2001 | Brownlee |
| 6,232,607 B1 | 5/2001 | Huang |
| 6,236,053 B1 | 5/2001 | Shariv |
| 6,236,063 B1 | 5/2001 | Yamazaki et al. |
| 6,239,788 B1 | 5/2001 | Nohno et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,376 B1 | 12/2001 | Harkin |
| 6,333,544 B1 | 12/2001 | Toyoda et al. |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,454,482 B1 | 9/2002 | Silverbrook et al. |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,642,238 B2 | 11/2003 | Hester, Jr. |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,690,156 B1 | 2/2004 | Weiner et al. |
| 6,690,387 B2 | 2/2004 | Zimmerman et al. |
| 6,700,144 B2 | 3/2004 | Shimazaki et al. |
| 6,720,594 B2 | 4/2004 | Rahn et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | den Boer |
| 6,862,022 B2 | 3/2005 | Slupe |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | den Boer et al. |
| 6,956,564 B1 | 10/2005 | Williams |
| 6,972,753 B1 | 12/2005 | Kimura et al. |
| 6,995,743 B2 | 2/2006 | den Boer et al. |
| 7,006,080 B2 | 2/2006 | Gettemy |
| 7,009,663 B2 | 3/2006 | Abileah et al. |
| 7,015,833 B2 | 3/2006 | Bodenmann et al. |
| 7,015,894 B2 | 3/2006 | Morohoshi |
| 7,023,503 B2 | 4/2006 | den Boer |
| 7,053,967 B2 | 5/2006 | Abileah et al. |
| 7,068,254 B2 | 6/2006 | Yamazaki et al. |
| 7,075,521 B2 | 7/2006 | Yamamoto et al. |
| 7,098,894 B2 | 8/2006 | Yang et al. |
| 7,109,465 B2 | 9/2006 | Kok et al. |
| 7,157,649 B2 | 1/2007 | Hill |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,292,229 B2 | 11/2007 | Morag et al. |
| 7,298,367 B2 | 11/2007 | Geaghan et al. |
| 7,348,946 B2 | 3/2008 | Booth, Jr. et al. |
| 7,372,455 B2 | 5/2008 | Perski et al. |
| 7,408,598 B2 | 8/2008 | den Boer et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 | 10/2009 | Black |
| 7,612,767 B1 | 11/2009 | Griffin et al. |
| 7,629,945 B2 | 12/2009 | Baudisch |
| 7,649,524 B2 | 1/2010 | Haim et al. |
| 7,649,527 B2 | 1/2010 | Cho et al. |
| 7,663,607 B2 | 2/2010 | Hotelling et al. |
| 7,719,515 B2 | 5/2010 | Fujiwara et al. |
| 7,786,978 B2 | 8/2010 | Lapstun et al. |
| 7,843,439 B2 | 11/2010 | Perski et al. |
| 7,848,825 B2 | 12/2010 | Wilson et al. |
| 7,859,519 B2 | 12/2010 | Tulbert |
| 7,868,873 B2 | 1/2011 | Palay et al. |

(56) References Cited

U.S. PATENT DOCUMENTS

| | | |
|---|---|---|
| 7,902,840 B2 | 3/2011 | Zachut et al. |
| 7,924,272 B2 | 4/2011 | den Boer et al. |
| 8,031,094 B2 | 10/2011 | Hotelling et al. |
| 8,059,102 B2 | 11/2011 | Rimon et al. |
| 8,094,128 B2 | 1/2012 | Vu et al. |
| 8,169,421 B2 | 5/2012 | Wright et al. |
| 8,174,273 B2 | 5/2012 | Geaghan |
| 8,228,311 B2 | 7/2012 | Perski et al. |
| 8,232,977 B2 | 7/2012 | Zachut et al. |
| 8,269,511 B2 | 9/2012 | Jordan |
| 8,278,571 B2 | 10/2012 | Orsley |
| 8,373,677 B2 | 2/2013 | Perski et al. |
| 8,390,588 B2 | 3/2013 | Vu et al. |
| 8,400,427 B2 | 3/2013 | Perski et al. |
| 8,479,122 B2 | 7/2013 | Hotelling et al. |
| 8,481,872 B2 | 7/2013 | Zachut |
| 8,493,331 B2 | 7/2013 | Krah et al. |
| 8,536,471 B2 | 9/2013 | Stern et al. |
| 8,537,126 B2 | 9/2013 | Yousefpor et al. |
| 8,552,986 B2 | 10/2013 | Wong et al. |
| 8,581,870 B2 | 11/2013 | Bokma et al. |
| 8,605,045 B2 | 12/2013 | Mamba et al. |
| 8,659,556 B2 | 2/2014 | Wilson |
| 8,698,769 B2 | 4/2014 | Coulson et al. |
| 8,723,825 B2 | 5/2014 | Wright et al. |
| 8,816,985 B1 | 8/2014 | Tate et al. |
| 8,847,899 B2 | 9/2014 | Washburn et al. |
| 8,928,635 B2 | 1/2015 | Harley et al. |
| 8,933,899 B2 | 1/2015 | Shahparnia et al. |
| 9,013,429 B1 | 4/2015 | Krekhovetskyy et al. |
| 9,092,086 B2 | 7/2015 | Krah et al. |
| 9,146,414 B2 | 9/2015 | Chang et al. |
| 9,170,681 B2 | 10/2015 | Huang et al. |
| 9,310,923 B2 | 4/2016 | Krah et al. |
| 9,310,943 B1 | 4/2016 | Omelchuk et al. |
| 9,329,703 B2 | 5/2016 | Falkenburg et al. |
| 9,377,905 B1 | 6/2016 | Grivna et al. |
| 9,519,361 B2 | 12/2016 | Harley et al. |
| 9,557,845 B2 | 1/2017 | Shahparnia |
| 9,582,105 B2 | 2/2017 | Krah et al. |
| 9,652,090 B2 | 5/2017 | Tan et al. |
| 9,921,684 B2 | 3/2018 | Falkenburg et al. |
| 9,939,935 B2 | 4/2018 | Shahparnia |
| 2001/0000026 A1 | 3/2001 | Skoog |
| 2001/0000676 A1 | 5/2001 | Zhang et al. |
| 2001/0003711 A1 | 6/2001 | Coyer |
| 2001/0044858 A1 | 11/2001 | Rekimoto et al. |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 | 6/2002 | Griffis |
| 2002/0071074 A1 | 6/2002 | Noritake et al. |
| 2002/0074171 A1 | 6/2002 | Nakano et al. |
| 2002/0074549 A1 | 6/2002 | Park et al. |
| 2002/0080123 A1 | 6/2002 | Kennedy et al. |
| 2002/0080263 A1 | 6/2002 | Krymski |
| 2002/0126240 A1 | 9/2002 | Seiki et al. |
| 2002/0149571 A1 | 10/2002 | Roberts |
| 2002/0175903 A1 | 11/2002 | Fahraeus et al. |
| 2003/0020083 A1 | 1/2003 | Hsiung et al. |
| 2003/0038778 A1 | 2/2003 | Noguera |
| 2003/0103030 A1 | 6/2003 | Wu |
| 2003/0103589 A1 | 6/2003 | Nohara et al. |
| 2003/0117369 A1 | 6/2003 | Spitzer et al. |
| 2003/0127672 A1 | 7/2003 | Rahn et al. |
| 2003/0137494 A1 | 7/2003 | Tulbert |
| 2003/0151569 A1 | 8/2003 | Lee et al. |
| 2003/0156087 A1 | 8/2003 | den Boer et al. |
| 2003/0156100 A1 | 8/2003 | Gettemy |
| 2003/0156230 A1 | 8/2003 | den Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0197691 A1 | 10/2003 | Fujiwara et al. |
| 2003/0205662 A1 | 11/2003 | den Boer et al. |
| 2003/0218116 A1 | 11/2003 | den Boer et al. |
| 2003/0231277 A1 | 12/2003 | Zhang |
| 2003/0234759 A1 | 12/2003 | Bergquist |
| 2004/0008189 A1 | 1/2004 | Clapper et al. |
| 2004/0046900 A1 | 3/2004 | den Boer et al. |
| 2004/0081205 A1 | 4/2004 | Coulson |
| 2004/0095333 A1 | 5/2004 | Morag et al. |
| 2004/0113877 A1 | 6/2004 | Abileah et al. |
| 2004/0125430 A1 | 7/2004 | Kasajima et al. |
| 2004/0140962 A1 | 7/2004 | Wang et al. |
| 2004/0189587 A1 | 9/2004 | Jung et al. |
| 2004/0191976 A1 | 9/2004 | Udupa et al. |
| 2004/0252867 A1 | 12/2004 | Lan et al. |
| 2005/0040393 A1 | 2/2005 | Hong |
| 2005/0091297 A1 | 4/2005 | Sato et al. |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | den Boer et al. |
| 2005/0270590 A1 | 12/2005 | Izumi et al. |
| 2005/0275616 A1 | 12/2005 | Park et al. |
| 2005/0285985 A1 | 12/2005 | den Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley |
| 2006/0012580 A1 | 1/2006 | Perski et al. |
| 2006/0034492 A1 | 2/2006 | Siegel et al. |
| 2006/0120013 A1 | 6/2006 | Dioro et al. |
| 2006/0125971 A1 | 6/2006 | Abileah et al. |
| 2006/0159478 A1 | 7/2006 | Kikuchi |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2006/0284854 A1 | 12/2006 | Cheng et al. |
| 2007/0030258 A1 | 2/2007 | Pittel et al. |
| 2007/0062852 A1 | 3/2007 | Zachut et al. |
| 2007/0109239 A1 | 5/2007 | den Boer et al. |
| 2007/0109286 A1 | 5/2007 | Nakamura et al. |
| 2007/0131991 A1 | 6/2007 | Sugawa |
| 2007/0146349 A1 | 6/2007 | Errico |
| 2007/0216905 A1 | 9/2007 | Han et al. |
| 2007/0229468 A1* | 10/2007 | Peng .............. G06F 3/044 345/173 |
| 2007/0279346 A1 | 12/2007 | den Boer et al. |
| 2007/0285405 A1 | 12/2007 | Rehm |
| 2007/0291012 A1 | 12/2007 | Chang |
| 2008/0012835 A1 | 1/2008 | Rimon et al. |
| 2008/0012838 A1 | 1/2008 | Rimon |
| 2008/0029691 A1 | 2/2008 | Han |
| 2008/0046425 A1 | 2/2008 | Perski |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055507 A1 | 2/2008 | den Boer et al. |
| 2008/0055295 A1 | 3/2008 | den Boer et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | den Boer et al. |
| 2008/0062156 A1 | 3/2008 | Abileah et al. |
| 2008/0062157 A1 | 3/2008 | Abileah et al. |
| 2008/0062343 A1 | 3/2008 | den Boer et al. |
| 2008/0066972 A1 | 3/2008 | Abileah et al. |

(56) References Cited

U.S. PATENT DOCUMENTS

| | | |
|---|---|---|
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | den Boer et al. |
| 2008/0129913 A1 | 6/2008 | den Boer et al. |
| 2008/0129914 A1 | 6/2008 | den Boer et al. |
| 2008/0142280 A1 | 6/2008 | Yamamoto et al. |
| 2008/0158165 A1 | 7/2008 | Geaghan et al. |
| 2008/0158167 A1* | 7/2008 | Hotelling .............. G06F 3/0416 345/173 |
| 2008/0158172 A1 | 7/2008 | Hotelling et al. |
| 2008/0158180 A1 | 7/2008 | Krah et al. |
| 2008/0162997 A1 | 7/2008 | Vu et al. |
| 2008/0165311 A1 | 7/2008 | Abileah et al. |
| 2008/0170046 A1 | 7/2008 | Rimon et al. |
| 2008/0238885 A1 | 10/2008 | Zachut et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0309625 A1 | 12/2008 | Krah et al. |
| 2008/0309628 A1 | 12/2008 | Krah et al. |
| 2008/0309631 A1 | 12/2008 | Westerman et al. |
| 2009/0000831 A1 | 1/2009 | Miller et al. |
| 2009/0009483 A1 | 1/2009 | Hotelling et al. |
| 2009/0027354 A1 | 1/2009 | Perski et al. |
| 2009/0065269 A1 | 3/2009 | Katsurahira |
| 2009/0066665 A1 | 3/2009 | Lee |
| 2009/0078476 A1 | 3/2009 | Rimon et al. |
| 2009/0095540 A1 | 4/2009 | Zachut et al. |
| 2009/0128529 A1 | 5/2009 | Izumi et al. |
| 2009/0135492 A1 | 5/2009 | Kusuda et al. |
| 2009/0153152 A1 | 6/2009 | Maharyta et al. |
| 2009/0153525 A1 | 6/2009 | Lung |
| 2009/0167713 A1 | 7/2009 | Edwards |
| 2009/0167728 A1 | 7/2009 | Geaghan et al. |
| 2009/0184939 A1 | 7/2009 | Wohlstadter et al. |
| 2009/0189867 A1 | 7/2009 | Krah et al. |
| 2009/0225210 A1 | 9/2009 | Sugawa |
| 2009/0251434 A1 | 10/2009 | Rimon et al. |
| 2009/0262637 A1 | 10/2009 | Badaye et al. |
| 2009/0273579 A1 | 11/2009 | Zachut et al. |
| 2009/0322685 A1 | 12/2009 | Lee |
| 2009/0322696 A1 | 12/2009 | Yaakoby et al. |
| 2010/0001978 A1 | 1/2010 | Lynch et al. |
| 2010/0006350 A1 | 1/2010 | Elias |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1 | 3/2010 | Stern et al. |
| 2010/0053113 A1 | 3/2010 | Wu |
| 2010/0059296 A9 | 3/2010 | Abileah et al. |
| 2010/0060590 A1 | 3/2010 | Wilson et al. |
| 2010/0066692 A1 | 3/2010 | Noguchi et al. |
| 2010/0066693 A1 | 3/2010 | Sato et al. |
| 2010/0073323 A1 | 3/2010 | Geaghan |
| 2010/0085325 A1 | 4/2010 | King-Smith et al. |
| 2010/0118237 A1 | 5/2010 | Katoh et al. |
| 2010/0127991 A1 | 5/2010 | Yee |
| 2010/0155153 A1 | 6/2010 | Zachut |
| 2010/0160041 A1 | 6/2010 | Grant et al. |
| 2010/0194692 A1 | 8/2010 | Orr et al. |
| 2010/0252335 A1 | 10/2010 | Orsley |
| 2010/0271332 A1 | 10/2010 | Wu et al. |
| 2010/0289754 A1 | 11/2010 | Sleeman et al. |
| 2010/0302419 A1 | 12/2010 | den Boer et al. |
| 2010/0309171 A1 | 12/2010 | Hsieh et al. |
| 2010/0315384 A1 | 12/2010 | Hargreaves et al. |
| 2010/0315394 A1 | 12/2010 | Katoh et al. |
| 2010/0321320 A1 | 12/2010 | Hung et al. |
| 2010/0322484 A1 | 12/2010 | Hama et al. |
| 2010/0327882 A1 | 12/2010 | Shahparnia et al. |
| 2010/0328249 A1 | 12/2010 | Ningrat et al. |
| 2011/0001708 A1 | 1/2011 | Sleeman |
| 2011/0007029 A1 | 1/2011 | Ben-David |
| 2011/0043489 A1 | 2/2011 | Yoshimoto |
| 2011/0063993 A1 | 3/2011 | Wilson et al. |
| 2011/0084857 A1 | 4/2011 | Marino et al. |
| 2011/0084937 A1 | 4/2011 | Chang et al. |
| 2011/0090146 A1 | 4/2011 | Katsurahira |
| 2011/0090181 A1 | 4/2011 | Maridakis |
| 2011/0153263 A1 | 6/2011 | Oda et al. |
| 2011/0155479 A1 | 6/2011 | Oda et al. |
| 2011/0157068 A1 | 6/2011 | Parker et al. |
| 2011/0169771 A1 | 7/2011 | Fujioka et al. |
| 2011/0175834 A1 | 7/2011 | Han et al. |
| 2011/0193776 A1 | 8/2011 | Oda et al. |
| 2011/0216016 A1 | 9/2011 | Rosener |
| 2011/0216032 A1 | 9/2011 | Oda et al. |
| 2011/0254807 A1 | 10/2011 | Perski et al. |
| 2011/0273398 A1 | 11/2011 | Ho et al. |
| 2011/0304577 A1 | 12/2011 | Brown et al. |
| 2011/0304592 A1 | 12/2011 | Booth et al. |
| 2012/0013555 A1 | 1/2012 | Takami et al. |
| 2012/0019488 A1 | 1/2012 | McCarthy |
| 2012/0050207 A1 | 3/2012 | Westhues et al. |
| 2012/0050216 A1 | 3/2012 | Kremin et al. |
| 2012/0056822 A1 | 3/2012 | Wilson et al. |
| 2012/0062497 A1 | 3/2012 | Rebeschi et al. |
| 2012/0062500 A1 | 3/2012 | Miller et al. |
| 2012/0068964 A1 | 3/2012 | Wright et al. |
| 2012/0086664 A1 | 4/2012 | Leto |
| 2012/0105357 A1 | 5/2012 | Li et al. |
| 2012/0105361 A1 | 5/2012 | Kremin et al. |
| 2012/0105362 A1 | 5/2012 | Kremin et al. |
| 2012/0146958 A1 | 6/2012 | Oda et al. |
| 2012/0154295 A1 | 6/2012 | Hinckley et al. |
| 2012/0154340 A1 | 6/2012 | Vuppu et al. |
| 2012/0182259 A1 | 7/2012 | Han |
| 2012/0212421 A1 | 8/2012 | Honji |
| 2012/0242603 A1 | 9/2012 | Engelhardt et al. |
| 2012/0274580 A1 | 11/2012 | Sobel et al. |
| 2012/0293464 A1 | 11/2012 | Adhikari |
| 2012/0320000 A1 | 12/2012 | Takatsuka |
| 2012/0327040 A1 | 12/2012 | Simon |
| 2012/0327041 A1 | 12/2012 | Harley |
| 2013/0021294 A1 | 1/2013 | Maharyta et al. |
| 2013/0027361 A1 | 1/2013 | Perski et al. |
| 2013/0033461 A1 | 2/2013 | Silverbrook |
| 2013/0069905 A1 | 3/2013 | Krah et al. |
| 2013/0088465 A1 | 4/2013 | Geller et al. |
| 2013/0100071 A1* | 4/2013 | Wright .................. G06F 1/3262 345/174 |
| 2013/0106722 A1 | 5/2013 | Shahparnia et al. |
| 2013/0113707 A1 | 5/2013 | Perski et al. |
| 2013/0127757 A1 | 5/2013 | Mann et al. |
| 2013/0141342 A1 | 6/2013 | Bokma et al. |
| 2013/0155007 A1 | 6/2013 | Huang et al. |
| 2013/0176273 A1 | 7/2013 | Li et al. |
| 2013/0176274 A1 | 7/2013 | Sobel et al. |
| 2013/0207938 A1 | 8/2013 | Ryshtun et al. |
| 2013/0215049 A1 | 8/2013 | Lee |
| 2013/0257793 A1 | 10/2013 | Zeliff et al. |
| 2014/0028576 A1 | 1/2014 | Shahparnia |
| 2014/0028607 A1 | 1/2014 | Tan |
| 2014/0077827 A1 | 3/2014 | Seguine |
| 2014/0132556 A1 | 5/2014 | Huang |
| 2014/0146009 A1 | 5/2014 | Huang |
| 2014/0168142 A1 | 6/2014 | Sasselli et al. |
| 2014/0168143 A1 | 6/2014 | Hotelling et al. |
| 2014/0184554 A1 | 7/2014 | Walley |
| 2014/0253462 A1 | 9/2014 | Hicks |
| 2014/0253469 A1 | 9/2014 | Hicks et al. |
| 2014/0267071 A1 | 9/2014 | Shahparnia |
| 2014/0267075 A1 | 9/2014 | Shahparnia et al. |
| 2014/0267184 A1 | 9/2014 | Bathiche et al. |
| 2014/0347311 A1 | 11/2014 | Joharapurkar et al. |
| 2014/0375612 A1 | 12/2014 | Hotelling et al. |
| 2015/0022485 A1 | 1/2015 | Chen et al. |
| 2015/0035768 A1 | 2/2015 | Shahparnia et al. |
| 2015/0035769 A1 | 2/2015 | Shahparnia |

(56) References Cited

U.S. PATENT DOCUMENTS

| | | |
|---|---|---|
| 2015/0035797 A1 | 2/2015 | Shahparnia |
| 2015/0103049 A1 | 4/2015 | Harley et al. |
| 2015/0177868 A1 | 6/2015 | Morein et al. |
| 2015/0338950 A1 | 11/2015 | Ningrat et al. |
| 2016/0077667 A1 | 3/2016 | Chiang et al. |
| 2016/0162101 A1 | 6/2016 | Pant et al. |
| 2016/0179281 A1 | 6/2016 | Krah et al. |
| 2016/0357343 A1 | 12/2016 | Falkenburg et al. |
| 2016/0378220 A1 | 12/2016 | Westhues et al. |
| 2017/0097695 A1 | 4/2017 | Ribeiro et al. |
| 2017/0115816 A1 | 4/2017 | Chang |
| 2017/0344174 A1 | 11/2017 | Pant et al. |

FOREIGN PATENT DOCUMENTS

| | | |
|---|---|---|
| CN | 1518723 A | 8/2004 |
| CN | 201329722 Y | 10/2009 |
| CN | 101393488 B | 10/2010 |
| CN | 201837984 U | 5/2011 |
| DE | 036 02 796 A1 | 8/1987 |
| DE | 197 20 925 A1 | 12/1997 |
| EP | 0 306 596 A2 | 3/1989 |
| EP | 0 366 913 B1 | 5/1990 |
| EP | 0 384 509 B1 | 8/1990 |
| EP | 0 426 362 A2 | 5/1991 |
| EP | 0 426 469 A2 | 5/1991 |
| EP | 0 464 908 B1 | 1/1992 |
| EP | 0 488 455 B1 | 6/1992 |
| EP | 0 490 683 B1 | 6/1992 |
| EP | 0 491 436 B1 | 6/1992 |
| EP | 0 509 589 B1 | 10/1992 |
| EP | 0 545 709 B1 | 6/1993 |
| EP | 0 572 009 A1 | 12/1993 |
| EP | 0 572 182 B1 | 12/1993 |
| EP | 0 587 236 B1 | 3/1994 |
| EP | 0 601 837 B1 | 6/1994 |
| EP | 0 618 527 B1 | 10/1994 |
| EP | 0 633 542 B1 | 1/1995 |
| EP | 0 762 319 A2 | 3/1997 |
| EP | 0 762 319 A3 | 3/1997 |
| EP | 0 770 971 A2 | 5/1997 |
| EP | 0 962 881 A2 | 12/1999 |
| EP | 1 022 675 A2 | 7/2000 |
| EP | 1 128 170 A1 | 8/2001 |
| EP | 1 884 863 A1 | 2/2008 |
| EP | 2 040 149 A2 | 3/2009 |
| EP | 2 172 834 A2 | 4/2010 |
| EP | 2 221 659 A1 | 8/2010 |
| EP | 2 660 689 A1 | 11/2013 |
| JP | 55-074635 A | 6/1980 |
| JP | 57-203129 A | 12/1982 |
| JP | 60-179823 A | 9/1985 |
| JP | 64-006927 U | 1/1989 |
| JP | 64-040004 U | 2/1989 |
| JP | 1-196620 A | 8/1989 |
| JP | 2-182581 A | 7/1990 |
| JP | 2-211421 A | 8/1990 |
| JP | 5-019233 A | 1/1993 |
| JP | 5-173707 A | 7/1993 |
| JP | 05-243547 A | 9/1993 |
| JP | 8-166849 A | 6/1996 |
| JP | 9-001279 A | 1/1997 |
| JP | 9-185457 A | 7/1997 |
| JP | 9-231002 A | 9/1997 |
| JP | 9-274537 A | 10/1997 |
| JP | 10-027068 A | 1/1998 |
| JP | 10-040004 A | 2/1998 |
| JP | 10-133817 A | 5/1998 |
| JP | 10-133819 A | 5/1998 |
| JP | 10-186136 A | 7/1998 |
| JP | 10-198515 A | 7/1998 |
| JP | 11-110110 A | 4/1999 |
| JP | 11-242562 A | 9/1999 |
| JP | 2000-020241 A | 1/2000 |
| JP | 2000-163031 A | 6/2000 |
| JP | 2002-342033 A | 11/2002 |
| JP | 2005-129948 A | 5/2005 |
| JP | 2005-352490 A | 12/2005 |
| JP | 2009-054141 A | 3/2009 |
| KR | 10-2013-0028360 A | 3/2013 |
| KR | 10-2013-0109207 A | 10/2013 |
| TW | 200743986 A | 12/2007 |
| TW | 200925944 | 6/2009 |
| TW | 201115414 A | 5/2011 |
| TW | 201118682 A1 | 6/2011 |
| TW | 201324242 A | 6/2013 |
| TW | 201419103 A | 5/2014 |
| TW | 201504874 A | 2/2015 |
| WO | WO-97/40488 A1 | 10/1997 |
| WO | WO-99/21160 A1 | 4/1999 |
| WO | WO-99/22338 A1 | 5/1999 |
| WO | WO-01/45283 A1 | 6/2001 |
| WO | WO-2006/104214 A1 | 10/2006 |
| WO | WO-2007/145346 A1 | 12/2007 |
| WO | WO-2007/145347 A1 | 12/2007 |
| WO | WO-2008/018201 A1 | 2/2008 |
| WO | WO-2008/044368 A1 | 4/2008 |
| WO | WO-2008/044369 A1 | 4/2008 |
| WO | WO-2008/044370 A1 | 4/2008 |
| WO | WO-2008/044371 A1 | 4/2008 |
| WO | WO-2008/047677 A1 | 4/2008 |
| WO | WO-2009/081810 A1 | 7/2009 |
| WO | WO-2011/008533 A2 | 1/2011 |
| WO | WO-2012/177567 A1 | 12/2012 |
| WO | WO-2012/177569 A2 | 12/2012 |
| WO | WO-2012-177569 A3 | 12/2012 |
| WO | WO-2012/177571 A1 | 12/2012 |
| WO | WO-2012/177573 A2 | 12/2012 |
| WO | WO-2014/018233 A1 | 1/2014 |
| WO | WO-2014/143430 A1 | 9/2014 |
| WO | WO-2015/017196 A1 | 2/2015 |

OTHER PUBLICATIONS

Notice of Allowance dated Aug. 10, 2016, for U.S. Appl. No. 14/578,051, filed Dec. 19, 2014, seven pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Abileah, A. et al. (2004). "59.3: Integrated Optical Touch Panel in a 14.1' AMLCD," *SID '04 Digest* (Seattle) pp. 1544-1547.

Abileah, A. et al. (2006). "9.3: Optical Sensors Embedded within AMLCD Panel: Design and Applications," *ADEAC '06, SID* (Atlanta) pp. 102-105.

Abileah, A. et al. (2007). "Optical Sensors Embedded within AMLCD Panel: Design and Applications," *Siggraph-07*, San Diego, 5 pages.

Anonymous. (2002). "Biometric Smart Pen Project," located at http://www.biometricsmartpen.de/ . . . , last visited Apr. 19, 2011, one page.

Bobrov, Y. et al. (2002). "5.2 Manufacturing of a Thin-Film LCD," *Optiva, Inc.*, San Francisco, CA. 4 pages.

Brown, C. et al. (2007). "7.2: A 2.6 inch VGA LCD with Optical Input Function using a 1-Transistor Active-Pixel Sensor," *ISSCC* 2007 pp. 132-133, 592.

Den Boer, W. et al. (2003). "56.3: Active Matrix LCD with Integrated Optical Touch Screen," *SID'03 Digest* (Baltimore) pp. 1-4.

(56) References Cited

OTHER PUBLICATIONS

Chinese Search Report dated Sep. 6, 2015, for CN Application No. CN 201280030349.9, with English translation, six pages.
Chinese Search Report dated Oct. 23, 2015, for CN Application No. CN 201280030351.6, with English translation, four pages.
Echtler, F. et al. (Jan. 2010). "An LED-based Multitouch Sensor for LCD Screens," Cambridge, MA *ACM* 4 pages.
Final Office Action dated Mar. 4, 2004, for U.S. Appl. No. 10/217,798, filed Aug. 12, 2002, 17 pages.
Final Office Action dated Jan. 21, 2005, for U.S. Appl. No. 10/329,217, filed Dec. 23, 2002, 13 pages.
Final Office Action dated Aug. 9, 2005, for U.S. Appl. No. 10/442,433, filed May 20, 2003, six pages.
Final Office Action dated Aug. 23, 2005, for U.S. Appl. No. 10/217,798, filed Aug. 12, 2002, 10 pages.
Final Office Action dated Dec. 13, 2005, for U.S. Appl. No. 10/371,413, filed Feb. 20, 2003, six pages.
Final Office Action dated May 23, 2007, for U.S. Appl. No. 11/137,753, filed May 25, 2005, 11 pages.
Final Office Action dated Oct. 18, 2007, for U.S. Appl. No. 11/351,098, filed Feb. 8, 2006, six pages.
Final Office Action dated Oct. 31, 2007, for U.S. Appl. No. 10/217,798, filed Aug. 12, 2002, nine pages.
Final Office Action dated Mar. 24, 2009, for U.S. Appl. No. 11/351,098, filed Feb. 8, 2006, 10 pages.
Final Office Action dated Feb. 10, 2011, for U.S. Appl. No. 11/901,649, filed Sep. 18, 2007, 20 pages.
Final Office Action dated May 18, 2011, for U.S. Appl. No. 11/978,031, filed Oct. 25, 2007, 17 pages.
Final Office Action dated Jun. 15, 2011, for U.S. Appl. No. 11/595,071, filed Nov. 8, 2006, 9 pages.
Final Office Action dated Jun. 24, 2011, for U.S. Appl. No. 11/978,006, filed Oct. 25, 2007, 12 pages.
Final Office Action dated Jul. 5, 2011, for U.S. Appl. No. 11/977,279, filed Oct. 24, 2007, 12 pages.
Final Office Action dated Sep. 29, 2011, for U.S. Appl. No. 11/977,911, filed Oct. 26, 2007, 22 pages.
Final Office Action dated Oct. 11, 2012, for U.S. Appl. No. 12/566,455, filed Sep. 24, 2009, 8 pages.
Final Office Action dated Oct. 25, 2012, for U.S. Appl. No. 12/568,302, filed Sep. 28, 2009, 13 pages.
Final Office Action dated Oct. 25, 2012, for U.S. Appl. No. 12/568,316, filed Sep. 28, 2009, 15 pages.
Final Office Action dated Jul. 26, 2013, for U.S. Appl. No. 13/166,726, filed Jun. 22, 2011, ten pages.
Final Office Action dated Oct. 31, 2013, for U.S. Appl. No. 13/166,699, filed Jun. 22, 2011, 13 pages.
Final Office Action dated Jan. 13, 2014, for U.S. Appl. No. 12/568,316, filed Sep. 28, 2009, 15 pages.
Final Office Action dated Apr. 28, 2014, for U.S. Appl. No. 13/652,007, filed Oct. 15, 2012, 16 pages.
Final Office Action dated Jul. 14, 2014, for U.S. Appl. No. 13/166,711, filed Jun. 22, 2011, 12 pages.
Final Office Action dated Dec. 2, 2014, for U.S. Appl. No. 13/560,963, filed Jul. 27, 2012,ten pages.
Final Office Action dated Dec. 16, 2014, for U.S. Appl. No. 13/560,958, filed Jul. 27, 2012, twelve pages.
Final Office Action dated Jan. 12, 2015, for U.S. Appl. No. 13/560,973, filed Jul. 27, 2012, six pages.
Final Office Action dated May 4, 2015, for U.S. Appl. No. 13/166,699, filed Jun. 22, 2011, 17 pages.
Final Office Action dated Aug. 20, 2015, for U.S. Appl. No. 13/166,711, filed Jun. 22, 2011, six pages.
Final Office Action dated Feb. 1, 2016, for U.S. Appl. No. 13/560,963, filed Jul. 27, 2012, 12 pages.
Final Office Action dated Feb. 3, 2016, for U.S. Appl. No. 13/166,699, filed Jun. 22, 2011, 15 pages.
Final Office Action dated Mar. 9, 2016, for U.S. Appl. No. 13/831,318, filed Mar. 14, 2013, nine pages.
Final Office Action dated Jun. 3, 2016, for U.S. Appl. No. 14/333,461, filed Jul. 16, 2014, eight pages.
Hong, S.J. et al. (2005). "Smart LCD Using a-Si Photo Sensor," *IMID'05 Digest* pp. 280-283.
International Preliminary Report on Patentability and Written Opinion dated Oct. 8, 2004, for PCT Application No. PCT/US03/05300, filed Feb. 20, 2003, 15 pages.
International Preliminary Report on Patentability and Written Opinion dated Dec. 30, 2004, for PCT Application No. PCT/US02/25573, filed Aug. 12, 2002, 16 pages.
International Preliminary Report on Patentability and Written Opinion dated May 14, 2008, for PCT Application No. PCT/US06/43741, filed Nov. 10, 2006, four pages.
International Search Report dated Apr. 14, 2003, for PCT Application No. PCT/US02/25573, filed Aug. 12, 2002 two pages.
International Search Report dated Jun. 16, 2003, for PCT Application No. PCT/US03/05300, filed Feb. 20, 2003, two pages.
International Search Report dated Nov. 11, 2003, for PCT Application No. PCT/US03/03277, filed Feb. 4, 2003, three pages.
International Search Report dated Sep. 21, 2007, for PCT Application No. PCT/US06/43741, filed Nov. 10, 2006, one page.
International Search Report dated Oct. 17, 2012, for PCT Application No. PCT/US2012/043019, filed Jun. 18, 2012, five pages.
International Search Report dated Oct. 17, 2012, for PCT Application No. PCT/US2012/043023, filed Jun. 18, 2012, six pages.
International Search Report dated Jan. 16, 2013, for PCT Application No. PCT/US2012/043021, filed Jun. 18, 2012, six pages.
International Search Report dated Sep. 12, 2013, for PCT Application No. PCT/US2013/048977, filed Jul. 1, 2013, six pages.
International Search Report dated Apr. 23, 2014, for PCT Application No. PCT/US2014/013927, filed Jan. 30, 2014, four pages.
International Search Report dated Oct. 30, 2014 for PCT Application No. PCT/US2014/047658, four pages.
Kim, J.H. et al. (May 14, 2000). "24.1: Fingerprint Scanner Using a-Si: H TFT-Array," *SID '00 Digest* pp. 353-355.
Kis, A. (2006). "Tactile Sensing and Analogic Algorithms," Ph.D. Dissertation, Péter Pázmány Catholic University, Budapest, Hungary 122 pages.
Non-Final Office Action dated Jun. 4, 2003, for U.S. Appl. No. 10/217,798, filed Aug. 12, 2002, 16 pages.
Non-Final Office Action dated May 21, 2004, for U.S. Appl. No. 10/329,217, filed Dec. 23, 2002, 13 pages.
Non-Final Office Action dated Sep. 21, 2004, for U.S. Appl. No. 10/442,433, filed May 20, 2003, six pages.
Non-Final Office Action dated Nov. 26, 2004, for U.S. Appl. No. 10/307,106, filed Nov. 27, 2002, eight pages.
Non-Final Office Action dated Dec. 10, 2004, for U.S. Appl. No. 10/217,798, filed Aug. 12, 2002, nine pages.
Non-Final Office Action dated Jan. 21, 2005, for U.S. Appl. No. 10/347,149, filed Jan. 17, 2003, nine pages.
Non-Final Office Action dated Apr. 15, 2005, for U.S. Appl. No. 10/371,413, filed Feb. 20, 2003, four pages.
Non-Final Office Action dated Jun. 22, 2005, for U.S. Appl. No. 10/739,455, filed Dec. 17, 2003, 10 pages.
Non-Final Office Action dated Jul. 12, 2005, for U.S. Appl. No. 10/347,149, filed Jan. 17, 2003, four pages.
Non-Final Office Action dated Jan. 13, 2006, for U.S. Appl. No. 10/217,798, filed Aug. 12, 2002, nine pages.
Non-Final Office Action dated May 12, 2006, for U.S. Appl. No. 10/217,798, filed Aug. 12, 2002, seven pages.
Non-Final Office Action dated Aug. 28, 2006, for U.S. Appl. No. 10/371,413, filed Feb. 20, 2003, six pages.
Non-Final Office Action dated Jun. 28, 2007, for U.S. Appl. No. 11/351,098, filed Feb. 8, 2006, 12 pages.
Non-Final Office Action dated Jun. 29, 2007, for U.S. Appl. No. 10/217,798, filed Aug. 12, 2002, 10 pages.
Non-Final Office Action dated Feb. 25, 2008, for U.S. Appl. No. 11/137,753, filed May 25, 2005, 15 pages.
Non-Final Office Action dated Jun. 24, 2008, for U.S. Appl. No. 11/351,098, filed Feb. 8, 2006, 11 pages.
Non-Final Office Action dated Jun. 25, 2009, for U.S. Appl. No. 11/980,029, filed Oct. 29, 2007, 9 pages.

(56) References Cited

OTHER PUBLICATIONS

Non-Final Office Action dated Nov. 23, 2009, for U.S. Appl. No. 11/407,545, filed Apr. 19, 2006, five pages.
Non-Final Office Action dated Jul. 29, 2010, for U.S. Appl. No. 11/901,649, filed Sep. 18, 2007, 20 pages.
Non-Final Office Action dated Oct. 13, 2010, for U.S. Appl. No. 11/978,006, filed Oct. 25, 2007, eight pages.
Non-Final Office Action dated Oct. 14, 2010, for U.S. Appl. No. 11/595,071, filed Nov. 8, 2006, seven pages.
Non-Final Office Action dated Nov. 26, 2010, for U.S. Appl. No. 11/977,279, filed Oct. 24, 2007, nine pages.
Non-Final Office Action dated Nov. 26, 2010, for U.S. Appl. No. 11/977,830, filed Oct. 26, 2007, seven pages.
Non-Final Office Action dated Dec. 13, 2010, for U.S. Appl. No. 11/977,339, filed Oct. 24, 2007, eight pages.
Non-Final Office Action dated Feb. 1, 2011, for U.S. Appl. No. 11/978,031, filed Oct. 25, 2007, 18 pages.
Non-Final Office Action dated Apr. 29, 2011, for U.S. Patent Appl. No. 11/977,911, filed Oct. 26, 2007, 19 pages.
Non-Final Office Action dated Jun. 21, 2011, for U.S. Appl. No. 11/977,339, filed Oct. 24, 2007, 10 pages.
Non-Final Office Action dated Jun. 28, 2011, for U.S. Appl. No. 12/852,883, filed Aug. 8, 2010, 16 pages.
Non-Final Office Action dated Nov. 2, 2011, for U.S. Appl. No. 12/568,316, filed Sep. 28, 2009, 31 pages.
Non-Final Office Action dated Nov. 4, 2011, for U.S. Appl. No. 12/568,302, filed Sep. 28, 2009, 29 pages.
Non-Final Office Action dated Nov. 17, 2011, for U.S. Appl. No. 11/977,339, filed Oct. 24, 2007, nine pages.
Non-Final Office Action dated Jan. 10, 2012, for U.S. Appl. No. 11/977,864, filed Oct. 26, 2007, six pages.
Non-Final Office Action dated Jan. 31, 2012, for U.S. Appl. No. 12/566,477, filed Sep. 24, 2009, 11 pages.
Non-Final Office Action dated Feb. 29, 2012, for U.S. Appl. No. 11/978,031, filed Oct. 25, 2007, 20 pages.
Non-Final Office Action dated Apr. 20, 2012, for U.S. Appl. No. 12/566,455, filed Sep. 24, 2009, eight pages.
Non-Final Office Action dated Jun. 5, 2012, for U.S. Appl. No. 11/595,071, filed Nov. 8, 2006, 14 pages.
Non-Final Office Action dated Jun. 19, 2012, for U.S. Appl. No. 11/977,864, filed Oct. 26, 2007, seven pages.
Non-Final Office Action dated Nov. 15, 2012, for U.S. Appl. No. 12/566,477, filed Sep. 24, 2009, 11 pages.
Non-Final Office Action dated Mar. 5, 2013, for U.S. Appl. No. 13/166,726, filed Jun. 22, 2011, 14 pages.
Non-Final Office Action dated Mar. 29, 2013, for U.S. Appl. No. 13/166,699, filed Jun. 22, 2011, 12 pages.
Non-Final Office Action dated Jun. 17, 2013, for U.S. Appl. No. 13/166,711, filed Jun. 22, 2011, 8 pages.
Non-Final Office Action dated Sep. 18, 2013, for U.S. Appl. No. 13/652,007, filed Oct. 15, 2012, 16 pages.
Non-Final Office Action dated Dec. 16, 2013, for U.S. Appl. No. 13/166,711, filed Jun. 22, 2011, 12 pages.
Non-Final Office Action dated Feb. 27, 2014, for U.S. Appl. No. 11/977,279, filed Oct. 24, 2007, 11 pages.
Non-Final Office Action dated Mar. 14, 2014, for U.S. Appl. No. 11/977,339, filed Oct. 24, 2007, 10 pages.
Non-Final Office Action dated Apr. 24, 2014, for U.S. Appl. No. 13/560,958, filed Jul. 27, 2012, nine pages.
Non-Final Office Action dated May 8, 2014, for U.S. Appl. No. 13/560,973, filed Jul. 27, 2012, six pages.
Non-Final Office Action dated Jun. 4, 2014, for U.S. Appl. No. 13/560,963, filed Jul. 27, 2012, nine pages.
Non-Final Office Action dated Jun. 27, 2014, for U.S. Appl. No. 13/166,699, filed Jun. 22, 2011, 13 pages.
Non-Final Office Action dated Jan. 30, 2015, for U.S. Appl. No. 13/166,711, filed Jun. 22, 2011, 12 pages.
Non-Final Office Action dated May 14, 2015, for U.S. Appl. No. 13/560,963, filed Jul. 27, 2012, twelve pages.
Non-Final Office Action dated May 22, 2015, for U.S. Appl. No. 13/831,318, filed Mar. 14, 2013, eight pages.
Non-Final Office Action dated Aug. 28, 2015, for U.S. Appl. No. 13/560,958, filed Jul. 27, 2012, 11 pages.
Non-Final Office Action dated Sep. 24, 2015, for U.S. Appl. No. 13/166,699, filed Jun. 22, 2011, 14 pages.
Non-Final Office Action dated Dec. 4, 2015, for U.S. Appl. No. 14/333,461, filed Jul. 16, 2014, 15 pages.
Non-Final Office Action dated Feb. 11, 2016, for U.S. Appl. No. 14/578,051, filed Dec. 19, 2014, nine pages.
Non-Final Office Action dated May 13, 2016, for U.S. Appl. No. 15/057,035, filed Feb. 29, 2016, six pages.
Non-Final Office Action dated May 17, 2016, for U.S. Appl. No. 14/333,382, filed Jul. 16, 2014, sixteen pages.
Notice of Allowance dated Feb. 3, 2014, for U.S. Appl. No. 13/166,726, filed Jun. 22, 2011, nine pages.
Notice of Allowance dated May 12, 2014, for U.S. Appl. No. 13/166,726, filed Jun. 22, 2011, nine pages.
Notice of Allowance dated Sep. 4, 2014, for U.S. Appl. No. 13/166,726, filed Jun. 22, 2011, nine pages.
Notice of Allowance dated Dec. 15, 2015, for U.S. Appl. No. 13/560,973, filed Jul. 27, 2012, nine pages.
Notice of Allowance dated Jan. 14, 2016, for U.S. Appl. No. 13/166,711, filed Jun. 22, 2011, five pages.
Notice of Allowance dated May 24, 2016, for U.S. Appl. No. 13/560,958, filed Jul. 27, 2012, ten pages.
Notification of Reasons for Rejection dated Dec. 19, 2011, for JP Patent Application No. 2008-540205, with English Translation, six pages.
Pye, A. (Mar. 2001). "Top Touch-Screen Options," located at http://www.web.archive.org/web/20010627162135.http://www.industrialtechnology.co.uk/2001/mar/touch.html, last visited Apr. 29, 2004, two pages.
Rossiter, J. et al. (2005). "A Novel Tactile Sensor Using a Matrix of LEDs Operating in Both Photoemitter and Photodetector Modes," *IEEE* pp. 994-997.
Search Report dated Jun. 12, 2014, for ROC (Taiwan) Patent Application No. 101122110, one page.
TW Search Report dated Jul. 7, 2014, for TW Patent Application No. 101122109, filed Jun. 20, 2012, one page.
TW Search Report dated Jul. 8, 2014, for TW Patent Application No. 101122107, filed Jun. 20, 2012, one page.
TW Search Report dated Nov. 20, 2015, for TW Patent Application No. 103126285, one page.
U.S. Appl. No. 60/359,263, filed Feb. 20, 2002, by den Boer et al.
U.S. Appl. No. 60/383,040, filed May 23, 2002, by Abileah et al.
U.S. Appl. No. 60/736,708, filed Nov. 14, 2005, by den Boer et al.
U.S. Appl. No. 60/821,325, filed Aug. 3, 2006, by Abileah et al.
Yamaguchi, M. et al. (Jan. 1993). "Two-Dimensional Contact-Type Image Sensor Using Amorphous Silicon Photo-Transistor," *Jpn. J. Appl. Phys.* 32(Part 1, No. 1B):458-461.
Non-Final Office Action dated Jul. 1, 2016, for U.S. Appl. No. 14/333,457, filed Jul. 16, 2014, 27 pages.
TW Search Report dated Jun. 23, 2016, for TW Patent Application No. 104135140, with English Translation, two pages.
Non-Final Office Action dated Sep. 27, 2016, for U.S. Appl. No. 15/144,615, filed May 2, 2016, five pages.
Notice of Allowance dated Sep. 9, 2016, for U.S. Appl. No. 13/560,958, filed Jul. 27, 2012, eight pages.
Non-Final Office Action dated Nov. 25, 2016, for U.S. Appl. No. 13/831,318, filed Mar. 14, 2013, eight pages.
Non-Final Office Action dated Oct. 20, 2016, for U.S. Appl. No. 13/166,699, filed Jun. 22, 2011, 16 pages.
Notice of Allowance dated Oct. 31, 2016, for U.S. Appl. No. 15/057,035, filed Feb. 29, 2016, ten pages.
European Search Report dated May 2, 2016, for EP Application No. 15196245.3, twelve pages.
Final Office Action dated May 4, 2017, for U.S. Appl. No. 15/144,615, filed May 2, 2016, five pages.
Non-Final Office Action dated Jan. 12, 2017, for U.S. Appl. No. 14/869,980, filed Sep. 29, 2015, ten pages.
Non-Final Office Action dated Jan. 23, 2017, for U.S. Appl. No. 14/333,382, filed Jul. 16, 2014, sixteen pages.

(56) References Cited

OTHER PUBLICATIONS

Non-Final Office Action dated Apr. 6, 2107, for U.S. Appl. No. 14/333,461, filed Jul. 16, 2014, six pages.
Notice of Allowance dated Feb. 14, 2017, for U.S. Appl. No. 13/560,963, filed Jul. 27, 2012, nine pages.
Final Office Action dated Jun. 21, 2017, for U.S. Appl. No. 14/333,382, filed Jul. 16, 2014, 17 pages.
Final Office Action dated May 31, 2017, for U.S. Appl. No. 13/166,699, filed Jun. 22, 2011, 16 pages.
Final Office Action dated Aug. 7, 2017, for U.S. Appl. No. 14/869,980, filed Sep. 29, 2015, twelve pages.
Final Office Action dated Aug. 21, 2017, for U.S. Appl. No. 13/831,318, filed Mar. 14, 2013, nine pages.
Final Office Action dated Nov. 30, 2017, for U.S. Appl. No. 14/333,457, filed Jul. 16, 2014, 22 pages.
Non-Final Office Action dated Dec. 14, 2017, for U.S. Appl. No. 15/169,679, filed May 31, 2016, 24 pages.
Notice of Allowance dated Oct. 26, 2107, for U.S. Appl. No. 14/333,461, filed Jul. 16, 2014, seven pages.
Notice of Allowance dated Nov. 9, 2017, for U.S. Appl. No. 14/333,382, filed Jul. 16, 2014, eight pages.
Notice of Allowance dated Nov. 29, 2017, for U.S. Appl. No. 15/144,615, filed May 2, 2016, eight pages.
Non-Final Office Action dated Jan. 2, 2018, for U.S. Appl. No. 14/869,980, filed Sep. 29, 2015, eleven pages.
Non-Final Office Action dated Jan. 17, 2018, for U.S. Appl. No. 14/869,975, filed Sep. 29, 2015, 17 pages.
Notice of Allowance dated Apr. 18, 2018, for U.S. Appl. No. 13/831,318, filed Mar. 14, 2013, ten pages.
Notice of Allowance dated Jun. 6, 2018, for U.S. Appl. No. 14/869,980, filed Sep. 29, 2015, five pages.

* cited by examiner

FIG. 4A

| FRAME 1 | FRAME 2 | FRAME 3 | FRAME 4 | FRAME 5 | FRAME 6 | FRAME 7 | FRAME 8 | FRAME 9 |
|---|---|---|---|---|---|---|---|---|
| FULL PANEL SCAN | FULL PANEL SCAN | FULL PANEL SCAN | FULL PANEL SCAN | FULL PANEL SCAN | FULL PANEL SCAN | FULL PANEL SCAN | FULL PANEL SCAN | FULL PANEL SCAN |

FIG. 4B

| FULL PANEL SCAN | FULL PANEL SCAN | FULL PANEL SCAN | NO SCAN | FULL PANEL SCAN | FULL PANEL SCAN | FULL PANEL SCAN | NO SCAN | FULL PANEL SCAN |
|---|---|---|---|---|---|---|---|---|

FIG. 4C

"FRAME 1"
| DETECT SCAN | IDLE | PROG |
|---|---|---|

"FRAME 2"
| DETECT SCAN | IDLE OR FULL/PARTIAL SCAN | PROG |
|---|---|---|

"FRAME 3"
| DETECT SCAN | IDLE OR FULL/PARTIAL SCAN | PROG |
|---|---|---|

"FRAME 4"
| DETECT SCAN | IDLE OR FULL/PARTIAL SCAN | PROG |
|---|---|---|

"FRAME 5"
| DETECT SCAN | IDLE OR FULL/PARTIAL SCAN | PROG |
|---|---|---|

"FRAME 6"
| DETECT SCAN | IDLE OR FULL/PARTIAL SCAN | PROG |
|---|---|---|

"FRAME 7"
| DETECT SCAN | IDLE OR FULL/PARTIAL SCAN | PROG |
|---|---|---|

"FRAME 8"
| DETECT SCAN | IDLE OR FULL/PARTIAL SCAN | PROG |
|---|---|---|

"FRAME 9"
| DETECT SCAN | IDLE OR FULL/PARTIAL SCAN | PROG |
|---|---|---|

FIG. 4D

"FRAME 1"
| DETECT SCAN | FULL PANEL SCAN |
|---|---|

"FRAME 2"
| DETECT SCAN | FULL PANEL SCAN |
|---|---|

"FRAME 3"
| DETECT SCAN | FULL PANEL SCAN |
|---|---|

"FRAME 4"
| DETECT SCAN | FULL PANEL SCAN |
|---|---|

"FRAME 5"
| DETECT SCAN | FULL PANEL SCAN |
|---|---|

"FRAME 6"
| DETECT SCAN | FULL PANEL SCAN |
|---|---|

"FRAME 7"
| DETECT SCAN | FULL PANEL SCAN |
|---|---|

"FRAME 8"
| DETECT SCAN | FULL PANEL SCAN |
|---|---|

"FRAME 9"
| DETECT SCAN | FULL PANEL SCAN |
|---|---|

| TIME | SCAN |
|---|---|
| $t_1$ | STEP 1 |
| $t_2$ | STEP 2 |
| $t_3$ | STEP 3 |
| $t_4$ | STEP 4 |
| $t_5$ | STEP 5 |
| $t_6$ | STEP 6 |
| $t_7$ | STEP 7 |
| $t_8$ | STEP 8 |
| $t_9$ | STEP 9 |
| $t_{10}$ | STEP 10 |
| $t_{11}$ | STEP 11 |
| $t_{12}$ | STEP 12 |
| $t_{13}$ | STEP 13 |
| $t_{14}$ | STEP 14 |
| $t_{15}$ | STEP 15 |
| $t_{16}$ | STEP 16 |

*FIG. 15A*

| TIME | SCAN A (TOUCH CONTROLLER A) | SCAN B (TOUCH CONTROLLER B) |
|---|---|---|
| $t_1$ | STEP 1A | STEP 1B |
| $t_2$ | STEP 2A | STEP 2B |
| $t_3$ | STEP 3A | STEP 3B |
| $t_4$ | STEP 4A | STEP 4B |
| $t_5$ | STEP 5A | STEP 5B |
| $t_6$ | STEP 6A | STEP 6B |
| $t_7$ | STEP 7A | STEP 7B |
| $t_8$ | STEP 8A | STEP 8B |

*FIG. 15B*

| $S_1$ | X | X | X | X | X | X | X | X | X | $S_{11}$ | X | X | X | X | X |
|---|---|---|---|---|---|---|---|---|---|---|---|---|---|---|---|
| $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |

| $S_1$ | $S_1$ | X | X | X | X | X | X | X | X | $S_{11}$ | $S_{11}$ | X | X | X | X |
|---|---|---|---|---|---|---|---|---|---|---|---|---|---|---|---|
| $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |

| $S_1$ | $S_1$ | $S_1$ | X | X | X | X | X | X | X | $S_{11}$ | $S_{11}$ | $S_{11}$ | X | X | X |
|---|---|---|---|---|---|---|---|---|---|---|---|---|---|---|---|
| $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |

| $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |
|---|---|---|---|---|---|---|---|---|---|---|---|---|---|---|---|
| X | X | X | X | X | X | X | X | X | X | X | X | X | X | $S_{15}$ | X |

*FIG. 21A*

| $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |
|---|---|---|---|---|---|---|---|---|---|---|---|---|---|---|---|
| $S_{15}$ | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ |

*FIG. 21B*

| $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |
|---|---|---|---|---|---|---|---|---|---|---|---|---|---|---|---|
| X | X | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ | $S_{15}$ |

*FIG. 21C*

| $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |
|---|---|---|---|---|---|---|---|---|---|---|---|---|---|---|---|
| X | X | X | X | X | X | X | X | X | X | X | $S_{12}$ | X | $S_{14}$ | X | X |

*FIG. 22A*

| $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |
|---|---|---|---|---|---|---|---|---|---|---|---|---|---|---|---|
| $S_{12}$ | $S_{12}$ | $S_{12}$ | $S_{12}$ | $S_{12}$ | $S_{12}$ | $S_{12}$ | $S_{12}$ | $S_{14}$ | $S_{14}$ | $S_{14}$ | $S_{14}$ | $S_{14}$ | $S_{14}$ | $S_{14}$ | $S_{14}$ |

*FIG. 22B*

| $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | $t_{16}$ |
|---|---|---|---|---|---|---|---|---|---|---|---|---|---|---|---|
| X | X | X | $S_{14}$ | $S_{14}$ | $S_{14}$ | $S_{14}$ | $S_{14}$ | $S_{14}$ | $S_{12}$ | $S_{12}$ | $S_{12}$ | $S_{12}$ | $S_{12}$ | $S_{12}$ | X |

COARSE SCAN AND TARGETED ACTIVE MODE SCAN FOR TOUCH

CROSS-REFERENCE TO RELATED APPLICATION

This application claims benefit of U.S. Provisional Patent Application No. 62/087,792, filed Dec. 4, 2014, the entire disclosure of which is incorporated herein by reference for all purposes.

FIELD OF THE DISCLOSURE

This relates generally to touch sensitive devices and, more specifically, to touch sensitive devices that can have multiple scanning modes.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event. Touch sensing operations, however, can consume a significant amount of power and drain the battery of the touch sensitive device.

BRIEF SUMMARY OF THE DISCLOSURE

This relates to reducing power consumption due to touch sensing operations for touch sensitive devices. Power consumption can be reduced by implementing a coarse scan (e.g., a banked common mode scan) to coarsely detect the presence or absence of an object touching or proximate to a touch sensor panel, and the results of the coarse scan can be used to dynamically adjust the operation of the touch sensitive device to perform or not perform one or more fine scan steps (e.g., a targeted active mode scan). A coarse scan, such as a banked common mode scan, can be a relatively low power scan compared to a fine scan, such as a full panel scan, and can indicate the presence or absence of a touch event at a region of the touch sensor panel. In some examples, the results of the coarse scan can be used to program a touch controller of the touch sensitive device for the next touch sensing frame to idle when no touch event is detected, or to perform a fine scan (e.g., a full or partial panel scan) when one or more touch events are detected. In some examples, the results of the coarse scan can be used to abort one or more scheduled fine scan steps during a current touch sensing frame when no touch event is detected.

BRIEF DESCRIPTION OF THE DRAWINGS

FIG. 4A illustrates an example series of touch sensing frames corresponding to continuous full panel touch sensor scanning according to examples of the disclosure.

FIG. 4B illustrates an example series of touch sensing frames corresponding to reducing the frequency of full panel touch sensor scanning according to examples of the disclosure.

FIG. 4C illustrates an example series of touch sensing frames corresponding to dynamically adjusting operation for an upcoming frame according to examples of the disclosure.

FIG. 4D illustrates an example series of touch sensing frames corresponding to configuring touch sensing frames for a detection scan and full panel touch sensor scan subject to an abort command according to examples of the disclosure.

FIGS. 15A and 15B illustrate example scan plans for a full panel self-capacitance scan of the pixelated touch sensor panels of FIGS. 14A and 14B according to examples of the disclosure.

FIGS. 21A-C illustrate examples of reordering scan steps and reallocating scan time to increase SNR of scans according to examples of the disclosure.

FIGS. 22A-C illustrate additional examples of reordering scan steps and reallocating scan time to increase SNR of scans according to examples of the disclosure.

DETAILED DESCRIPTION OF THE DISCLOSURE

Figure 1A:
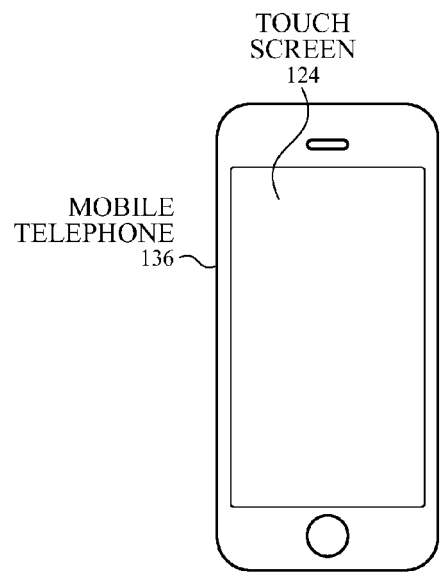
FIGS. 1A-1D illustrate example systems that can implement a banked common-mode scan and a targeted active mode scan according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to reducing power consumption due to touch sensing operations for touch sensitive devices. Continuously scanning a touch sensor panel to detect touch or proximity events can waste a significant amount of power, especially when no objects are touching or proximate to the touch sensor panel for extended periods of time. In order to reduce power consumption, in some examples, a coarse scan can be performed to coarsely detect the presence or absence of a touch event, and the results of the coarse scan can be used to dynamically adjust the operation of the touch sensitive device to perform or not perform one or more fine scan steps (e.g., a targeted active mode scan). A coarse scan, such as a banked common mode scan, can be a relatively low power scan compared to a fine scan such as a full panel scan, and can indicate the presence or absence of a touch event at a region of the touch sensor panel. In some examples, the results of the coarse scan can be used to program a touch controller for the next touch sensing frame to idle when no touch event is detected, or to perform a fine scan (e.g., a full or partial panel scan) when one or more touch events are detected. In some examples, the results of the coarse scan can be used to abort one or more steps of a scheduled fine scan during a current touch sensing frame when no touch event is detected. The latter example can reduce power consumption (e.g., by powered down unused sense channels) without degrading the responsiveness of the touch sensitive device. Additionally or alternatively, the one or more aborted scan steps can be reallocated to other scans.

Although a full panel scan is discussed herein as an example of a fine scan, and a banked common mode scan is discussed herein as an example of a coarse scan, it should be understood that the coarse and fine scans are not limited to these examples. A coarse scan can be any scan that provides information about touch events with a lower resolution than a given fine scan. A fine scan can be any scan that provides information about touch events with a higher resolution than a given coarse scan. A full panel scan can be an example fine scan that can provide the highest resolution scan as it can provide the maximum touch information available for the panel (e.g., unique sensor measurements for the smallest sensing node). A scan of the entire panel as a single sense node can be an example coarse scan that can provide the lowest resolution scan as it can provide the minimum touch information available for the panel (e.g., only one measurement for the largest sensing node configuration).

This also relates to performing a coarse scan and fine scan for a pixelated touch sensor panel. In some examples, one or more objects (e.g., a finger or an active or passive stylus) touching or proximate to the pixelated touch sensor panel can be detected using a coarse scan. When detecting an active stylus, for example, a coarse scan can reduce the number of sense/receive channels necessary for a scan of the entire panel, thereby saving power and reducing hardware required for the touch sensitive device. It should be appreciated however, that the object could be another input device. Once detected, the stylus location can be more accurately detected using a fine scan (e.g., a targeted active mode scan). For example, during a coarse scan, groups of individual pixel electrodes of a touch sensor panel can be coupled together to form super-pixel electrodes (or a bank of pixel electrodes). The super-pixel electrodes can be coupled to available sense/receive channels. In some examples, the coarse location can be indicated by the super-pixel electrode with a maximum detected touch value. In other examples, touch values from adjacent super-pixel electrodes can be used to provide additional resolution to the stylus location within the super-pixel electrode with the maximum detected touch value. After detecting the stylus and its coarse location, coupling between the sense/receive channels and pixel electrodes of the touch sensor panel can be dynamically adjusted and a fine scan can be performed for pixel electrodes proximate to the coarsely detected stylus location. The fine scan can include one or more of a per-pixel individual pixel scan, a row scan and a column scan.

This also related to using coarse and fine scans to reduce power consumption for a pixelated touch sensor panel. One or more coarse scans can be performed to coarsely detect the presence or absence of a touch or hover event, and the results of the coarse scan can be used to dynamically adjust the operation of the touch sensitive device to perform or not perform one or more fine scan steps. A coarse scan, such as a banked common mode scan for a pixelated touch sensor panel, can be a relatively low power scan compared to a fine scan such as a full panel scan for a pixelated touch sensor panel, and can indicate the presence or absence of a touch event at one or more regions of the touch sensor panel. In some examples, the results of the coarse scan can be used to abort one or more steps of a scheduled fine scan (or reprogram the steps of an upcoming scheduled fine scan). Unused sense channels from aborted scan steps can be powered down to reduce power consumption. Additionally or alternatively, the one or more aborted scan steps can be reallocated to other scans. Although a full panel scan is discussed herein as an example of a fine scan, it should be understood that the fine scan is not so limited, and can be any scan of the panel providing information about touch events with a higher resolution than the coarse scan.

Figure 1B:
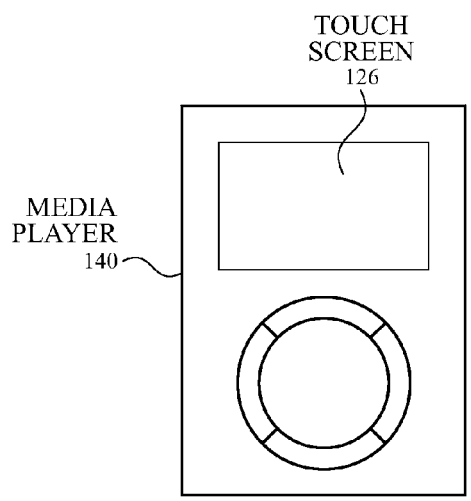
Figure 1C:
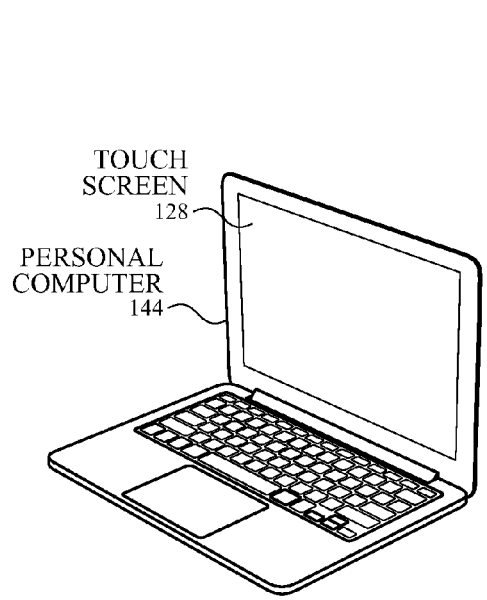
Figure 1D:
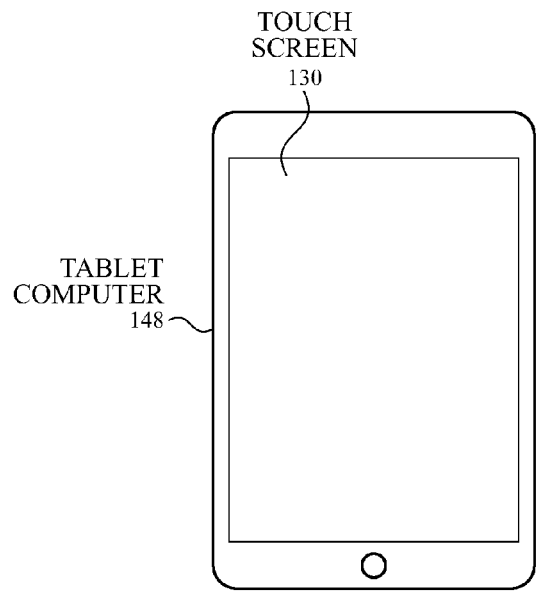

FIGS. 1A-1D illustrate example systems that can implement a banked common-mode scan and a targeted active mode scan according to examples of the disclosure. FIG. 1A illustrates an example mobile telephone 136 that includes a touch screen 124 and other computing system blocks that can implement a banked common-mode scan and a targeted active mode scan according to examples of the disclosure. FIG. 1B illustrates an example digital media player 140 that includes a touch screen 126 and other computing system blocks that can implement a banked common-mode scan and a targeted active mode scan according to examples of the disclosure. FIG. 1C illustrates an example personal computer 144 that includes a touch screen 128 and other computing system blocks that can implement a banked common-mode scan and a targeted active mode scan according to examples of the disclosure. FIG. 1D illustrates an example tablet computing device 148 that includes a touch screen 130 and other computing system blocks that can implement a banked common-mode scan and a targeted active mode scan according to examples of the disclosure. The touch screen and computing system blocks that can implement a banked common-mode scan and a targeted active mode scan can be implemented in other devices including wearable devices.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. In a pixelated touch sensor panel, touch nodes for a mutual capacitance scan can be formed at the adjacencies of pixel electrodes configured as drive electrodes and pixel electrodes configured as sense electrodes. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
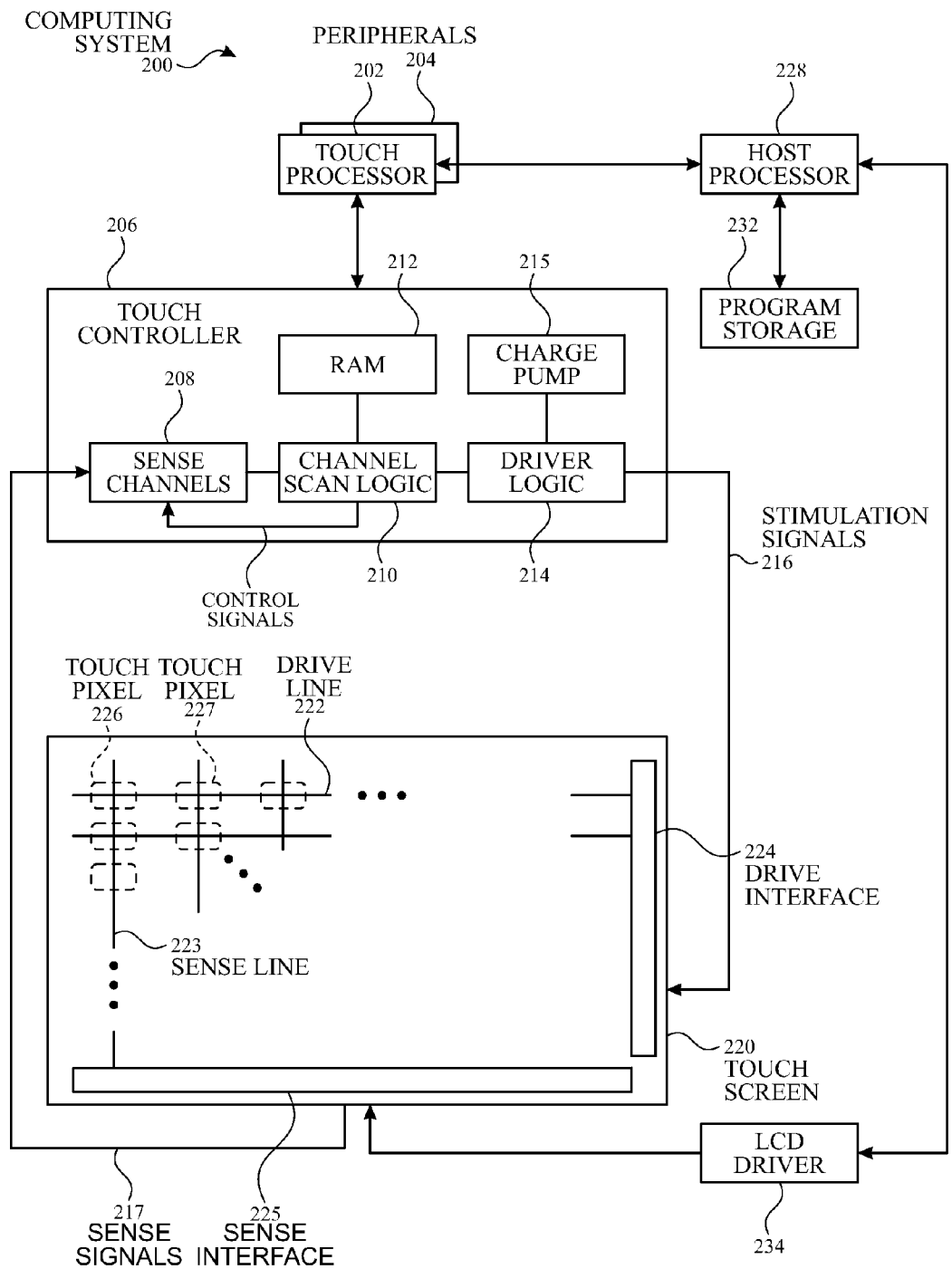
FIG. 2 illustrates an example computing system capable of implementing a banked common-mode scan and a targeted active mode scan according to examples of the disclosure.

FIG. 2 illustrates an example computing system capable of implementing a banked common-mode scan and a targeted active mode scan according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC).

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller, such as a Liquid-Crystal Display (LCD) driver 234. It is understood that although the examples of the disclosure are described with reference to LCD displays, the scope of the disclosure is not so limited and can extend to other types of displays, such as Light-Emitting Diode (LED) displays, including Active-Matrix Organic LED (AMO-LED) and Passive-Matrix Organic LED (PMOLED) displays.

Host processor 228 can use LCD driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

In some examples, RAM 212, program storage 232, or both, can be non-transitory computer readable storage media. One or both of RAM 212 and program storage 232 can have stored therein instructions, which when executed by touch processor 202 or host processor 228 or both, can cause the device including computing system 200 to perform one or more functions and methods of one or more examples of this disclosure.

Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch ("touch image"). In other words, after touch controller 206 has determined whether a touch has been detected at each touch pixel in the touch screen, the pattern of touch pixels in the touch screen at which a touch occurred can be thought of as an "image" of touch (e.g., a pattern of fingers touching the touch screen). Although not shown in the example of FIG. 2, touch screen 220 can alternatively include self-capacitance touch sensing circuitry including an array of self-capacitance electrodes, as described above.

Figure 3:
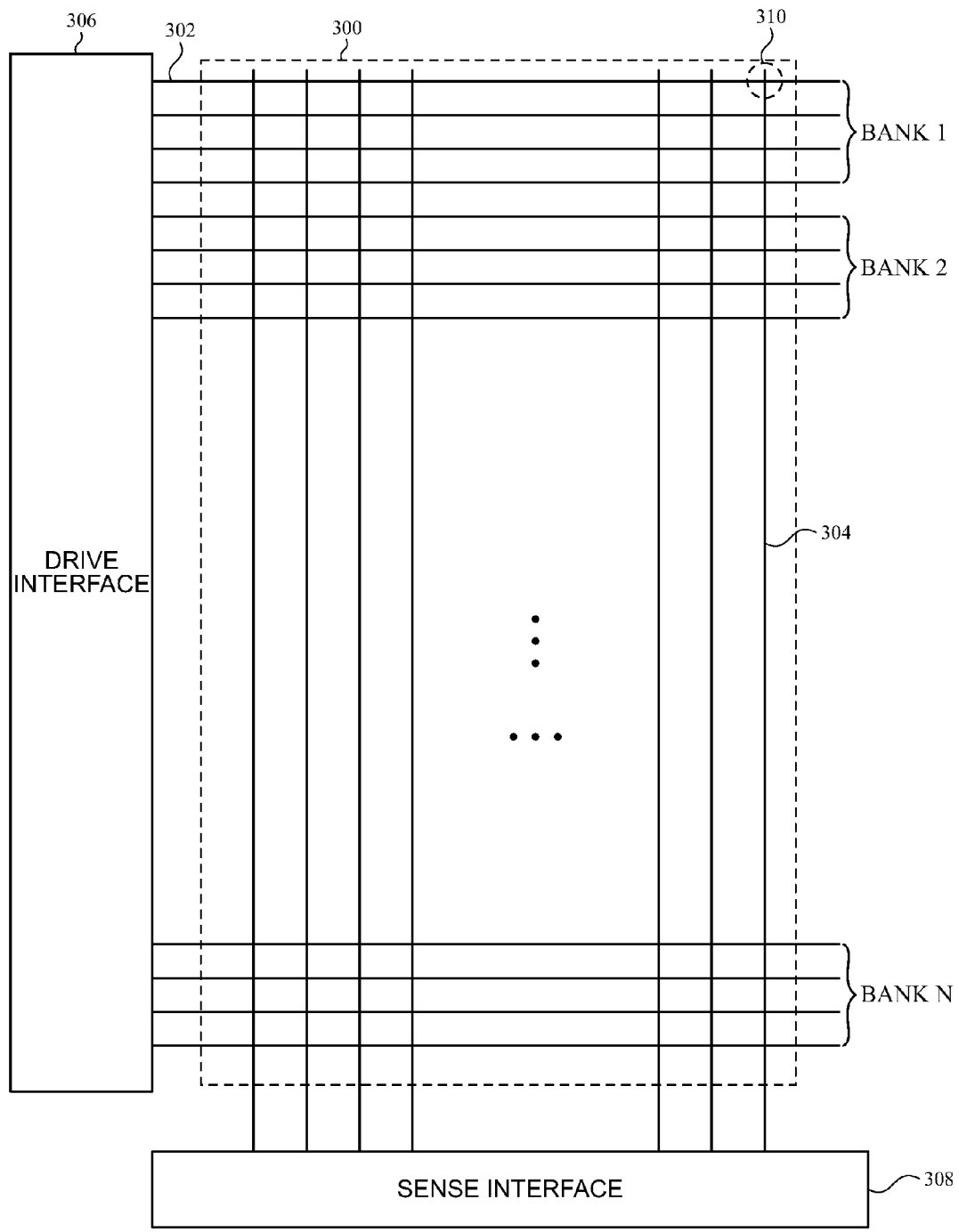
FIG. 3 illustrates an example touch sensor panel according to examples of the disclosure.

FIG. 3 illustrates an example touch sensor panel according to examples of the disclosure. Touch sensor panel 300 can include a plurality of drive lines 302 and a plurality of sense lines 304 forming a plurality of touch nodes 310. Drive lines 302 (arranged in rows in this example) can be driven by stimulation signals received through drive interface 306, and resulting sense signals generated in sense lines 304 (arranged in columns in this example) can be transmitted through sense interface 308 to sense channels in the touch controller. A full panel touch sensor scan can be performed in order to determine whether a touch has been detected at each touch node 310 in the touch sensor panel 300 and/or an amount of touch detected at each touch node 310 in the touch sensor panel 300 (information that can be used to generate an image of touch). A full panel touch sensor scan can provide the maximum touch information for the touch sensor panel by providing information for each touch node in the touch sensor panel formed by a drive line and sense line. In single stimulation examples, each drive line 302 of the touch sensor panel 300 can be stimulated independently (e.g., time multiplexed) and the sense signals generated in sense lines 304 in response to stimulation of a given row can be used to determine the presence and/or amount of touch for each touch node in the given row. In multi-stimulation examples, a plurality of drive lines 302 can be stimulated simultaneous with different stimulation signals for a plurality of stimulation steps and the sense signals generated in sense lines 304 in response to the plurality of stimulation steps can be processed to determine the presence and/or amount of touch for each touch node in the touch sensor panel (corresponding to the plurality of drive lines). A more detailed discussion of multi-stimulation touch sensing can be found in U.S. Pat. No. 7,812,827 entitled "Simultaneous Sensing Arrangement" by Steve Hotelling, et al. (filed 3 Jan. 2007) and incorporated by reference herein. In some examples, the drive lines 302 can be divided into banks and the full panel touch sensor scan can be performed by stimulating and sensing each bank independently using multi-stimulation techniques. Referring to FIG. 3, the touch sensor panel 300 can be divided into N banks comprised of four drive lines 302 each. Although FIG. 3 illustrates banks including four drive lines 302, it is understood that the banks can include a different number of drive lines 302.

In addition to performing a full panel touch sensor scan, the example touch sensor panel can also be configured to perform a banked common mode scan. The banked common mode scan can be performed for all the banks in the panel to provide touch information for the entire panel, though at a lower resolution than the full panel touch sensor scan described above. During a banked common mode scan, a bank of drive lines 302 can be simultaneously stimulated with a common stimulation signal, and the sense signals generated in one or more sense lines 304 in response to stimulation of the bank can be used to determine the presence and/or amount of touch at the region corresponding to the bank. Performing a common mode scan for multiple banks in the panel can provide coarse information about the presence or absence of a touch in one or more banks. In some examples, stimulation of each bank of the touch sensor panel can be time-multiplexed (single stimulation), though in other examples, the common mode stimulation of banks can be frequency-multiplexed or performed using bank-level multi-stimulation techniques. Performing a banked common mode scan (coarse scan) rather a coarse scan of the drive lines 302 of the entire touch sensor panel (i.e., stimulating all drive lines simultaneously with a common mode voltage) can ensure proper sensitivity and signal-to-noise ratio properties for the sense channels. As the number of drive lines per sense channel increases, the large signal from common modes stimulation can reduce the sensitivity and signal-to-noise ratio properties of the sense channel.

Touch sensing scans can be arranged to take place during designated touch sensing frames. In some examples requiring continuous touch information, full panel touch sensor scanning can be repeated during each touch sensing frame in order to detect touch and/or hover events at the touch sensor panel. Continuous touch full panel touch sensor scanning can be advantageous in that it can provide complete touch information for each scanning frame and can allow the system to be immediately responsive to touches. FIG. 4A illustrates an example series of nine touch sensing frames (labeled "FRAME 1" through "FRAME 9") corresponding to continuous full panel touch sensor scanning according to examples of the disclosure. In the example of FIG. 4A, each of the illustrated touch sensing frames can be scheduled to perform a full panel touch sensing scan. Although FIGS. 4A-4D illustrate full panel scans, it should be understood as discussed herein that the illustrated full panel scans can be a lower resolution scan of the panel rather than a maximum resolution scan. Performing a full panel touch sensing scan during each touch sensing frame can consume power even though during some of the touch sensing frames no touch and/or hover event occurs. For example, if no touch event is detected from frame 2 to frame 7, the power consumed on full panel touch sensing scans performed during those frames can be wasted.

In some examples, rather than performing full panel touch sensor scanning during each touch frame, the system can skip full panel touch sensing scans during touch sensing frames after no touch events are detected at the touch sensor panel for a threshold period of time. For example, the system can have two modes. During a first mode (e.g., full-frequency mode), the system can perform continuous full panel touch sensor scanning during touch sensing frames. During a second mode (e.g., reduced-frequency mode), the system can reduce the frequency of full panel touch sensor scanning by dropping scans (e.g., by programming the touch controller to idle rather than scan). The system can switch from the full-frequency mode to the reduced-frequency mode when no touch events are detected on the panel for a threshold number of touch sensing frames, for example. The system can switch from the reduced-frequency mode to the full-frequency mode when a touch event is detected, for example. FIG. 4B illustrates an example series of touch sensing frames corresponding to reducing the frequency of full panel touch sensing scans according to examples of the disclosure. In the example of FIG. 4B, during frame 1 (corresponding to a full-frequency mode), the system can perform a full panel touch sensing scan and detect no touch at the touch event sensor panel. During frames 2 and 3, the system can continue to perform full panel touch sensing scans and similarly detect no touch event at the touch sensor panel. When no touch event is detected during three consecutive touch sensing frames (e.g., a threshold period of touch sensing frames), the system can transition to a reduced-frequency mode in which the full panel touch sensing scans can be performed, for example, every third touch sensing frame (i.e., reduced-frequency). In the example of FIG. 4B, the system performs no scan during touch sensing frames 4 and 5 and performs a full panel touch sensing scan during touch sensing frame 6. The system can repeat the reduced-frequency scanning pattern, performing no scan during two touch sensing frames (frames 7 and 8) and performing a full panel touch sensing scan during a subsequent touch sensing frame (frame 9), until a touch event is detected during a full panel touch sensing scan. The system can transition to the full-frequency mode once a touch event is detected (e.g., at frame 9). Reducing the frequency of the full panel touch sensor scanning can reduce power consumption of the system, but skipping scans can reduce responsiveness because touch events may not be detected during touch sensing frames without a scan, and may wait until a full panel touch sensing scan to be detected.

In some examples, rather than changing the frequency of full panel touch sensor scanning, the system can dynamically alter the operation for the upcoming frame based on a banked common mode detection scan for a current frame. FIG. 4C illustrates an example series of touch sensing frames corresponding to dynamically adjusting operation for an upcoming frame according to examples of the disclosure. In the example of FIG. 4C, the touch sensing frames can include a common mode detection scan (e.g., a banked common mode detection scan) to detect one or more touch events at the touch sensor panel, and a programming operation to program the touch controller to execute the operation of the next touch sensing frame based on the results from the common mode detection scan. Additionally, during the touch sensing frames, the system can idle or execute a touch scan based on the results of the detection scan from the previous scan frame. For example, the system can idle or execute a touch scan based on the last programming step that occurs based on the results of the detection scan from the previous scan frame. The touch scan can be, for example, a full panel touch sensing scan or a partial touch sensing scan, in which drive lines in fewer than all banks of the touch sensor panel can be stimulated as discussed in more detail below.

Although FIG. 4C illustrates a detection scan followed by an idle or touch scan followed by a programming operation, these scans and operations can be performed in different order. For example, the system can first idle or perform a full panel or partial touch sensing scan at the start of a touch sensing frame based on the detection scan and programmed operation from a previous touch sensing frame, followed by performing a common mode detection scan and programming operation to prepare the touch controller for the next touch sensing frame. In some examples, during a touch sensing frame, the system can idle for a portion of the touch sensing frame and perform a full or partial touch sensing scan during the remaining portion of the touch sensing frame. In other examples, the system can first program the touch controller for the current touch sensing frame and then perform a detection scan. If no touch event is detected during the detection scan, the system can idle for the remainder of the touch sensing frame. If a touch event is detected during the detection scan, the system can reprogram the controller to execute the appropriate full panel or partial touch sensing scan (and possibly additional idling).

Performing a common mode detection scan during touch sensing frames rather than a full panel touch sensing scan (as illustrated in FIG. 4A) can save power because the common mode detection scan consumes less power than a full panel scan (e.g., at least four times less power for banks including four drive lines assuming common scanning parameters such as scan duration). Additionally, the full panel scans can be avoided when touch events are not detected. When necessary (e.g., when touch events are detected), the touch controller can be programmed to perform a touch sensing scan (e.g., full power scan). Additionally, the use of partial touch sensing scans can reduce power consumption as compared with a full panel touch sensing scan. Dynamically altering the operation for the upcoming frame based on a banked common mode detection scan for a current frame, however, can reduce responsiveness of the system as touch sensing scans may have to wait for a subsequent touch sensing frame for the appropriate operation to be executed.

In some examples, rather than dynamically altering the operation for the upcoming frame based on a banked common mode detection scan for a current frame (which can reduce responsiveness of the system), the system can be configured to execute a detection scan and a full panel scan during a touch sensing frame, and abort the full panel touch sensing scan based on the detection scan. FIG. 4D illustrates an example series of touch sensing frames corresponding to configuring touch sensing frames for a detection scan and full panel touch sensor scan subject to an abort command according to examples of the disclosure. In the example of FIG. 4D, each of the illustrated touch sensing frames can be scheduled to perform a detection scan (e.g., a banked common mode detection scan) and full panel touch sensing scan. The performance of the full panel touch sensing scan can be subject to an abort operation. If the system detects no touch event at the touch sensor panel during the detection scan, the system can generate an abort signal instructing the touch controller to not execute or terminate the scheduled full panel touch sensing scan. In some examples, the full panel touch sensing scan can begin before processing the results of the detection scan and generation of the abort signal. In such an example, any information obtained from the start of the full panel touch sensing scan before the abort signal is received can be discarded or ignored. If the system detects a touch event at the touch sensor panel during the detection scan, the system can execute the scheduled full panel touch sensing scan without delay. Scheduling the detection scan and full panel touch sensing scan can be advantageous in that power consumption can be reduced by aborting full panel touch sensing scans when no touch events are detected, without reducing the responsiveness of the system in having to wait for a subsequent touch frame to perform a full panel touch sensing scan. Additionally, overhead can be reduced by not reprogramming the touch controller between touch sensing frames.

Figure 4E:
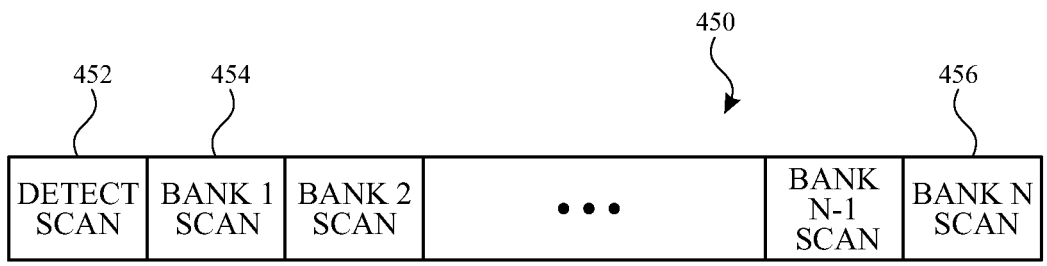
FIG. 4E illustrates an example touch sensing frame corresponding to scheduling a detection scan and multiple bank touch sensing scans subject to one or more abort commands according to examples of the disclosure.

Although FIG. 4D illustrates touch sensing frames corresponding to a touch controller configured to perform a detection scan and full panel touch sensing scan (subject to an abort signal/command), the touch controller can also be configured to perform a partial touch sensing scan. FIG. 4E illustrates an example touch sensing frame corresponding to scheduling a detection scan and multiple bank touch sensing scans subject to one or more abort commands according to examples of the disclosure. As illustrated in FIG. 4E, the touch controller can be configured to perform, during one or more touch sensing frames 450, a detection scan 452 and then a plurality of bank scans from first bank scan 454 through final bank scan 456. During each bank scan, the system can stimulate the drive lines of the bank with stimulation signals (single stimulation or multi-stimulation) and sense the signals generated in the sense lines generated in response to the stimulation signals. Based on the detection scan, the system can generate one or more abort signals. In some examples, if no touch event is detected during the detection scan, the system can generate a global abort command or multiple abort commands for the multiple bank scans. If a touch event is detected requiring a full panel scan, the system can perform the scheduled full panel touch sensing scan by executing all bank scans from first bank scan 454 through final bank scan 456. If a touch event is detected requiring only a partial scan, the system can generate one or more abort signals to not execute or terminate scanning of unnecessary banks. Any information obtained from an aborted unnecessary bank scan can be discarded or ignored.

Although illustrated in FIG. 4E as scheduling individual bank scans with individual abort commands, in other examples, multiple banks (e.g., 2 banks, 4 banks, etc.) can be scheduled to be scanned subjected to a common abort command (e.g., 1 abort command for a 2 bank scan) to reduce the number of scan operations and abort signals.

In other examples, some features illustrated in FIGS. 4A-4E can be combined. For example, the features illustrated in FIGS. 4B and 4D can be combined such that during a full-frequency mode, the scanning operations executed can follow those illustrated by a touch sensing frame in FIG. 4D. However, during extended periods without detected touch events, the system can transition into a reduced-frequency mode during which scanning operations can be dropped to reduce the scanning frequency as illustrated in FIG. 4B. The full-frequency mode can resume once a touch event is detected.

It should be understood that although not illustrated in the touch sensing frames of FIGS. 4A-4E, other functionality can occur during a touch sensing frame including display synchronization and spectral analysis, for example. Additionally, although FIGS. 4A-4E are discussed in the context of row-column mutual capacitance scanning, the principles described herein can be applied to mutual capacitance scanning of other touch sensor panel configurations (e.g., pixelated touch sensor panels as discussed herein) and to other types of scanning operations (e.g., self-capacitance scanning).

Figure 5A:
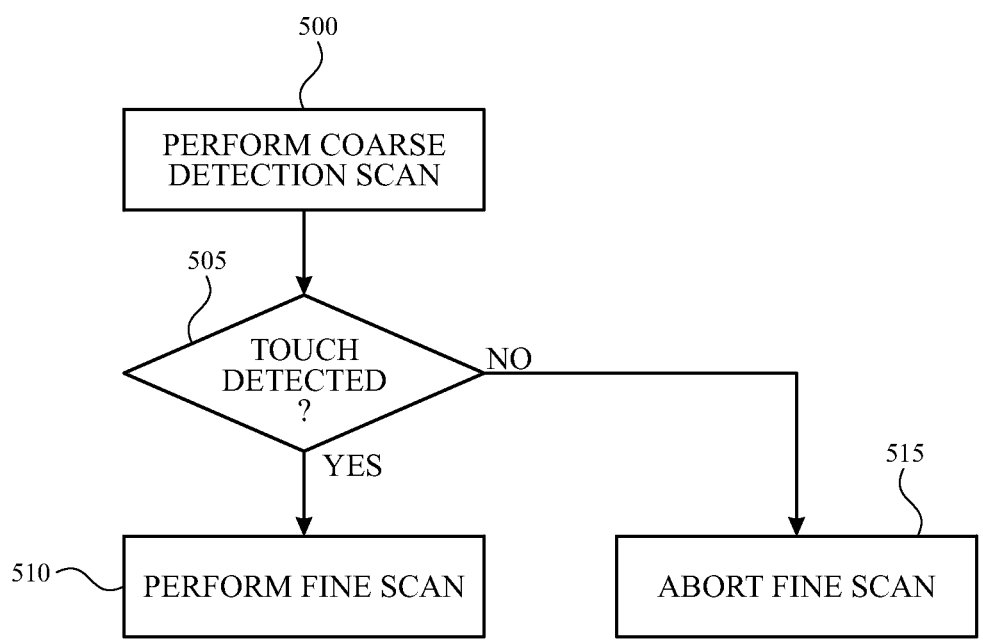
FIG. 5A illustrates an example process for performing scanning operations according to examples of the disclosure.

FIG. 5A illustrates an example process for performing scanning operations according to examples of the disclosure. The system can be configured to perform a coarse scan (e.g., a banked common-mode detect scan) and a fine scan (e.g., a full panel scan) during touch sensing frames. In some examples, the host processor 228 and/or touch processor 202 can program the touch controller 206 to perform a coarse scan and a fine scan during each touch sensing frame. During a given touch sensing frame, the system (e.g., via touch controller 206) can execute a coarse detection scan. For example, the touch controller can execute a banked common-mode scan of the touch sensor panel as described above to detect a touch event at one or more banks of the touch sensor panel (500). The system can determine whether a touch event of an object (e.g., finger, stylus, etc.) is detected at one or more banks of the touch sensor panel (505). If a touch event is detected at one or more banks of the touch sensor panel, the system can perform a fine scan during the touch frame (510). For example, the fine scan can be a full panel touch sensing scan as described above. If no touch event is detected at one or more banks of the touch sensor panel, the system can abort performance of the fine scan (515). In some examples the abort command can be generated by the system firmware within the touch controller based on results from the detection scan. Configuring the system to perform a coarse scan and fine scan during the touch sensing frame can be beneficial by enabling touch event detection by a fine scan in the same touch sensing frame as the one in which the touch event occurs. Additionally, aborting the scan can be beneficial in saving power by not performing fine scans when no touch events are detected.

Figure 5B:
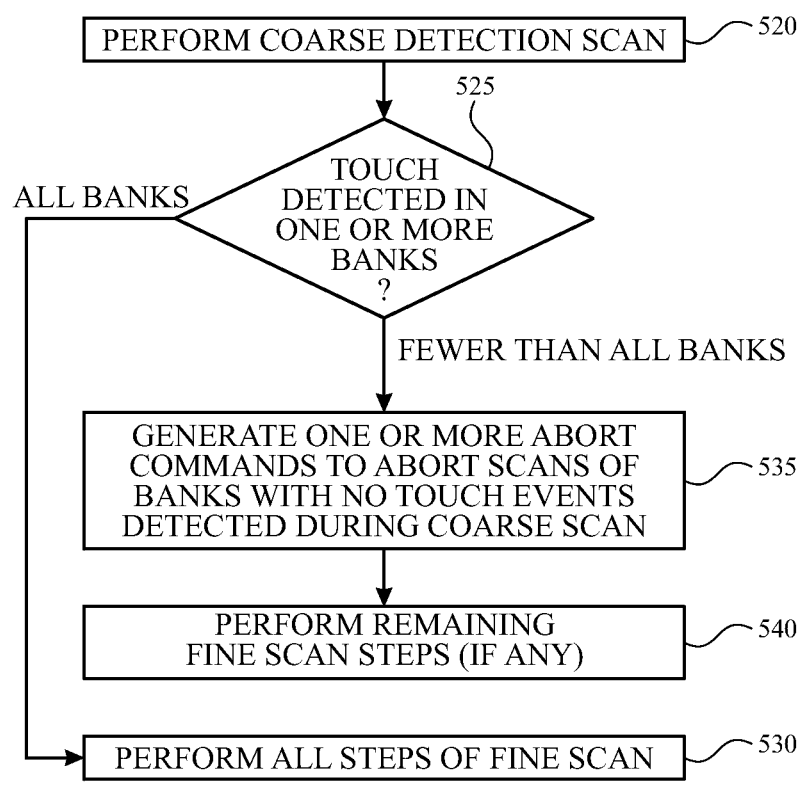
FIG. 5B illustrates another example process for performing scanning operations according to examples of the disclosure.

Additionally, although not illustrated in FIG. 5A, in some examples, the touch sensing frame can have multiple bank scans (collectively forming a full panel scan) as discussed in the context of FIG. 4E, and if a partial touch sensing scan is sufficient based on the detected touch event, the system can perform a fine scan of the applicable banks and abort execution of the scan of the remaining banks. FIG. 5B illustrates another example process for performing scanning operations according to examples of the disclosure. For brevity, the details of the coarse and fine scan are omitted. The system can be configured to perform a coarse scan and a fine scan (including multiple bank scans) during touch sensing frames. The system can perform coarse detection scan (520). The system can determine whether a touch event of an object (e.g., finger, stylus, etc.) is detected at one or more banks of the touch sensor panel (525). If a touch event is detected at each bank of the touch sensor panel, the system can perform all fine scan steps during the touch frame (530). In some examples, as long as touch events are detected at a threshold number of banks, all fine scan steps can be performed. If no touch event is detected at one or more banks of the touch sensor panel, the system can abort performance of the fine scan steps corresponding to the banks at which no touch event is detected. For example, one or more abort commands can be generated by the system based on results from the detection scan (535). The remaining non-aborted fine scan steps, if any, can be performed (540).

Figure 6A:
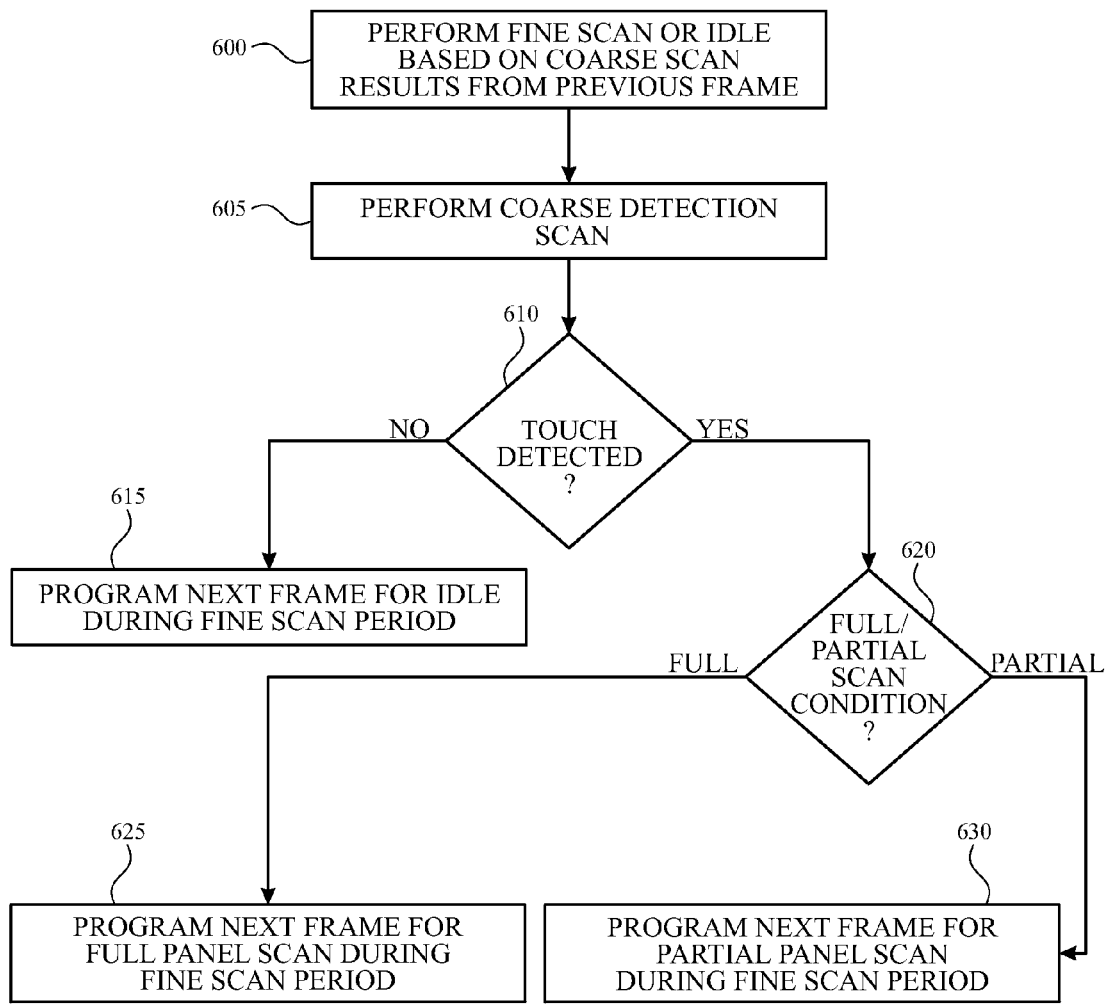
FIG. 6A illustrates an example process for performing scanning operations based on a coarse detection scan according to examples of the disclosure.

FIG. 6A illustrates an example process for performing scanning operations based on a coarse detection scan according to examples of the disclosure. The system can perform, during a touch sensing frame, a coarse scan (e.g., a banked common-mode detection scan) and, depending upon the outcome of a coarse scan in a previous frame, perform a fine scan (e.g., a full panel scan) during the touch sensing frame. In some examples, at the conclusion of a touch sensing frame, the host processor 228 and/or touch processor 202 can program the touch controller 206 to perform, during the next touch sensing frame, a coarse scan. Additionally, at the conclusion of a touch sensing frame, the host processor 228 and/or touch processor 202 can program the touch controller 206 to idle (i.e., not perform a fine scan) or perform a fine scan, depending upon the outcome of the coarse scan of the current touch sensing frame, during the next touch sensing frame. During a given touch sensing frame, the system (e.g., via touch controller 206) can execute a fine scan or idle based on the coarse scan results of the previous frame (i.e., based on the operation scheduled for the current touch sensing frame based on the previous touch sensing frame) (600). The system can also perform a coarse detection scan. For example, the touch controller can execute a banked common-mode scan of the touch sensor panel as described above to detect a touch at one or more banks of the touch sensor panel (605). The system can determine whether a touch event of an object (e.g., finger, stylus, etc.) is detected at one or more banks of the touch sensor panel (610). If no touch event is detected at one or more banks of the touch sensor panel, the system can program the touch controller to idle during the fine scan period of the next touch sensing frame (615). If a touch event is detected, the system can determine whether a full panel touch sensing scan or partial panel touch sensing scan is appropriate based on one or more conditions (620). In some examples, the condition can be evaluating whether the touch event(s) are detected in two or fewer banks, although other conditions can be used to determine whether a full or partial panel touch sensing scan is appropriate. The partial scan condition can correspond to detecting a single object at the touch sensor panel. If the touch event(s) are detected in more than two banks (or the conditions are otherwise satisfied for a full panel scan), the system can program the touch controller to perform a full panel scan during the fine scan period of the next touch sensing frame (625). If the touch event(s) are confined to two or fewer banks (or the conditions are otherwise satisfied for a partial panel scan), the system can program the touch controller to perform a partial panel scan during the fine scan period of the next touch sensing frame (630). In some examples, the system can determine the number of banks for a partial scan. For example, the number of banks can be two in some cases or four in other cases.

Figure 6B:
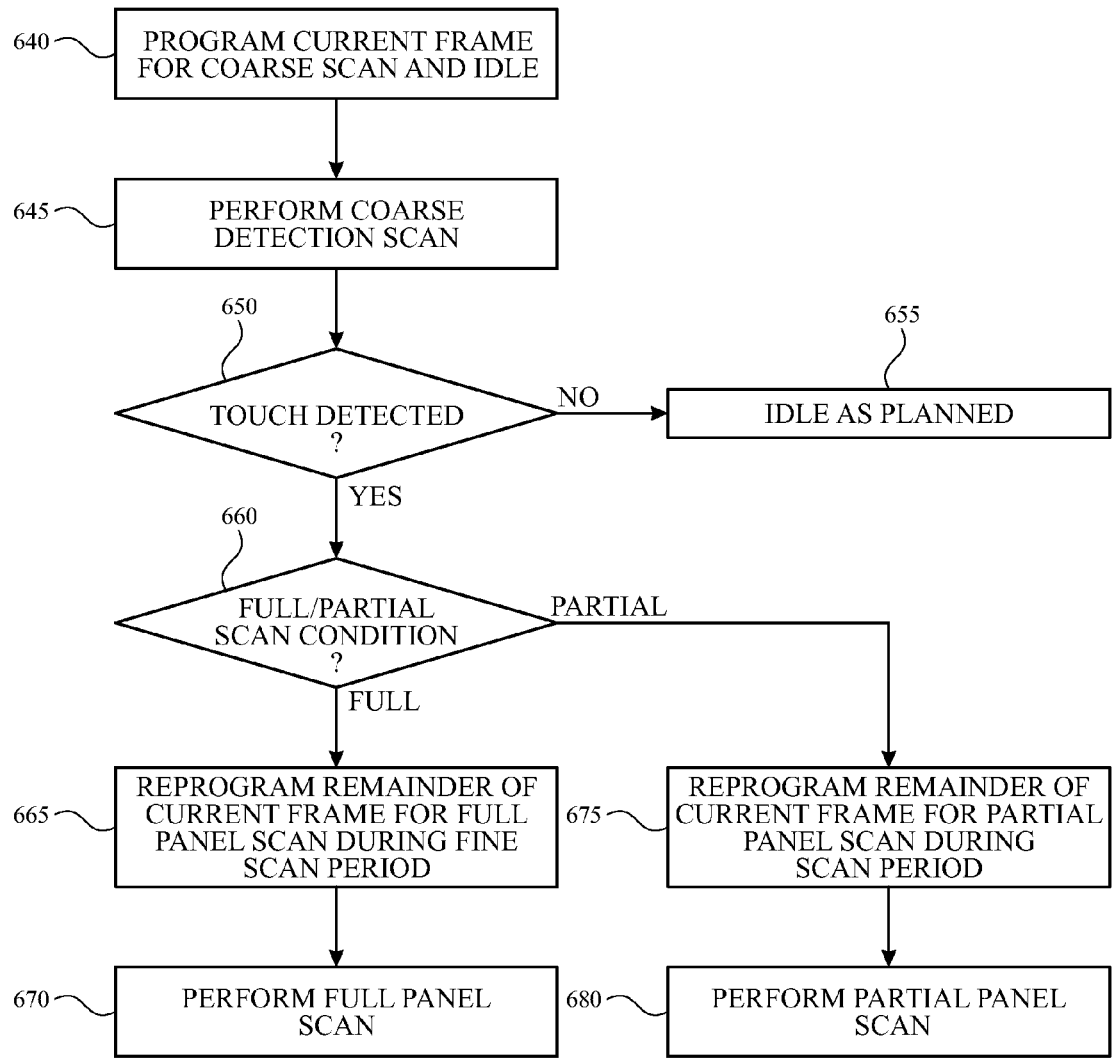
FIG. 6B illustrates another example process for performing scanning operations based on a coarse detection scan according to examples of the disclosure.

It is understood that the order of coarse detection scanning, programming, and fine scanning (or idling) illustrated in FIG. 6A is exemplary and different orders are possible. For example, FIG. 6B illustrates another example process for performing scanning operations based on a coarse detection scan according to examples of the disclosure. As illustrated in FIG. 6B, the system can perform, during a touch sensing frame, a coarse scan (e.g., a banked common-mode detection scan) and, depending upon the outcome of a coarse scan in a previous frame, perform a fine scan (e.g., a full panel scan) during the touch sensing frame. In some examples, at the start of a touch sensing frame, the host processor 228 and/or touch processor 202 can program the touch controller 206 to perform, during the current touch sensing frame, a coarse scan and to idle rather than performing a fine scan (640). During a touch sensing frame, the system (e.g., via touch controller 206) can execute a coarse scan (645). For example, the touch controller can execute a banked common-mode scan of the touch sensor panel as described above to detect a touch at one or more banks of the touch sensor panel. The system can determine whether a touch event of an object (e.g., finger, stylus, etc.) is detected at one or more banks of the touch sensor panel (650). If no touch event is detected at one or more banks of the touch sensor panel, the system can idle during the fine scan period of the touch sensing frame as planned (655). If a touch event is detected, the system can determine whether a full panel touch sensing scan or partial panel touch sensing scan is appropriate based on one or more conditions (660). In some examples, the condition can be evaluating whether the touch event(s) are detected in two or fewer banks, although other conditions can be used to determine whether a full or partial panel touch sensing scan is appropriate. The partial scan condition can correspond to detecting a single object at the touch sensor panel. If the touch event(s) are detected in more than two banks (or the conditions are otherwise satisfied for a full panel scan), the system can program the touch controller to perform a full panel scan during the fine scan period of the current touch sensing frame (665) and perform the full panel touch sensing scan (670). If the touch event(s) are confined to two or fewer banks (or the conditions are otherwise satisfied for a partial panel scan), the system can program the touch controller to perform a partial panel scan during the fine scan period of the current touch sensing frame (675) and perform the partial touch sensing scan (680). In some examples, the system can determine the number of banks for a partial scan. For example, the number of banks can be two in some cases or four in other cases.

In some examples, the touch sensor panel or touch screen of a device can include a pixelated touch sensor panel. A pixel based touch system can include a matrix of small, individual plates of conductive material that can be referred to as touch pixel electrodes. For example, a touch screen can include a plurality of individual touch pixel electrodes, each touch pixel electrode identifying or representing a unique location on the touch screen at which touch or proximity (i.e., a touch or proximity event) is to be sensed, and each touch pixel electrode being electrically isolated from the other touch pixel electrodes in the touch screen/panel. Such a touch screen can be referred to as a pixelated touch screen. A pixelated touch screen configured to detect touch or hover events (e.g., from a finger or passive stylus) by measuring the self-capacitance of each touch pixel electrode can be referred to as a pixelated self-capacitance touch screen. During operation, a touch pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. A pixelated touch screen can also be configured to measure mutual capacitance formed between an active stylus electrode and each of the pixel electrodes when the stylus is touching or proximate to the touch screen to determine the location of the active stylus. In some examples, a touch screen can be multi-touch, single touch, projection scan, full-imaging multi-touch, capacitive touch, etc.

Figure 7:
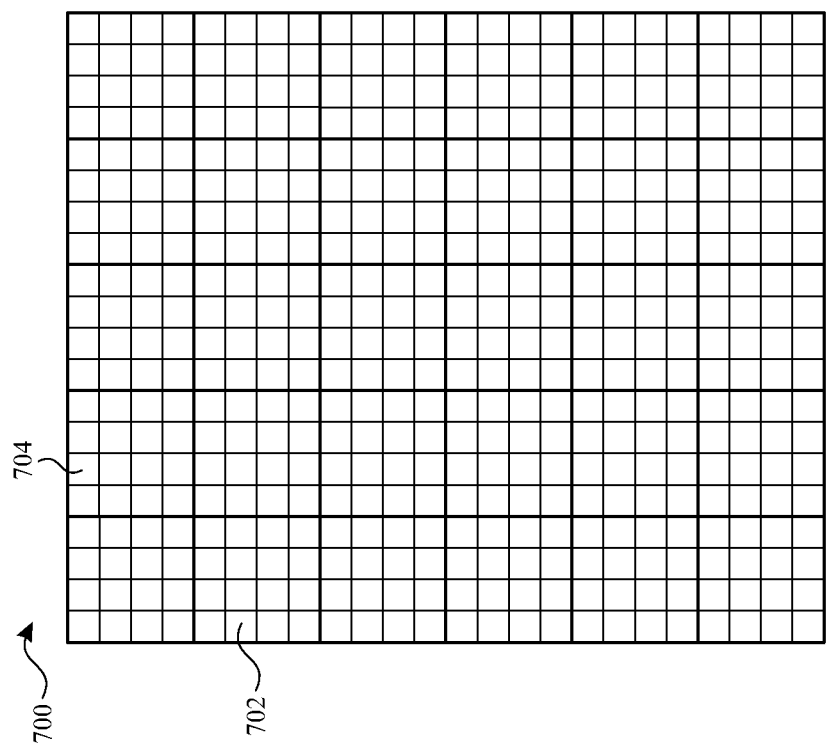
FIG. 7 illustrates an example pixelated touch sensor panel according to examples of the disclosure.

FIG. 7 illustrates an example pixelated touch sensor panel according to examples of the disclosure. The touch sensor panel 700 can include an array of individual pixel electrodes, such as pixel electrodes 702 and 704. During a self-capacitance operation, a pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. During a full panel scan, each touch pixel electrode can be sensed (e.g., single stimulation or multi-stimulation) and the change in self-capacitance measured at each of the pixel electrodes in the panel can be viewed as an image of touch on the touch sensor panel.

Although the touch sensor panel 700 illustrated in FIG. 7 includes a 24×20 array of individual pixel electrodes, it should be understood that the touch sensor panel can include a different number and configuration of pixel electrodes. In order to simultaneously perform a self-capacitance scan of each pixel in 24×20 array of individual pixel electrodes illustrated in FIG. 7, the touch sensitive device can require 480 sense channels. A large number of required sense channels can increase the amount of hardware and/or time required to perform self-capacitance or mutual capacitance scans of the entire touch sensor panel, thereby increasing power consumption of the touch sensing device. Accordingly, in some examples, the touch sensitive device can reduce the amount of sense/receive channels required by forming super-pixels during coarse detection scans.

Figure 8:
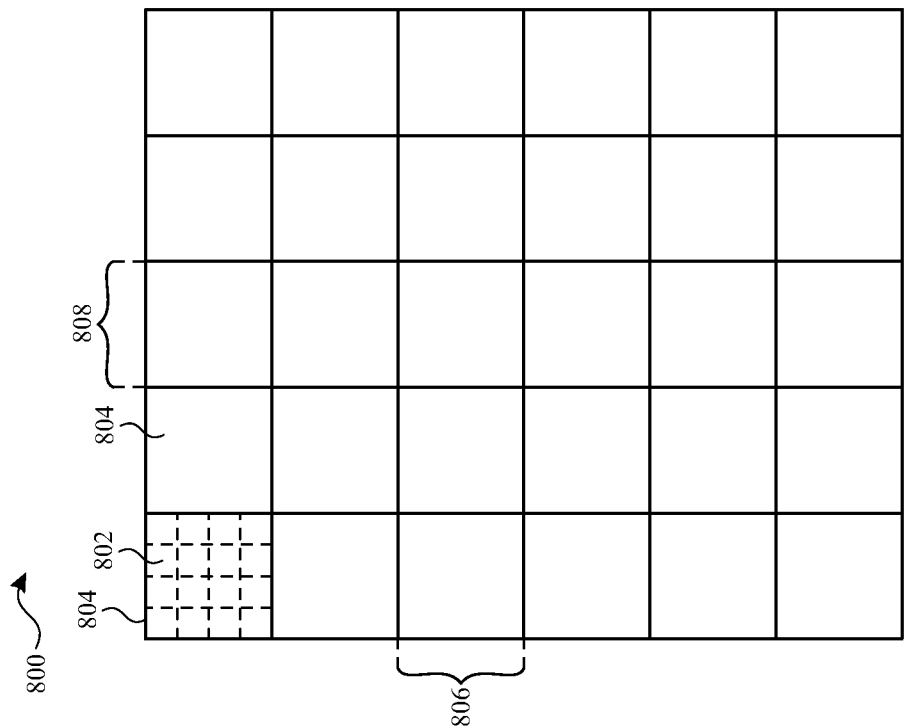
FIG. 8 illustrates an example pixelated touch sensor panel configured to include super-pixel electrodes according to examples of the disclosure.

FIG. 8 illustrates an example pixelated touch sensor panel configured to include super-pixel electrodes according to examples of the disclosure. Touch sensor panel 800 can include individual pixel electrodes, such as pixel electrode 802. A number of pixels electrodes (e.g., N pixel electrodes) can be grouped together (e.g., selectively coupled) during some modes of operation to form super-pixel electrodes, such as super-pixel electrode 804. As illustrated in FIG. 8, super-pixel electrode 804 can include 16 individual pixel electrodes 802, though a super-pixel electrode can be formed from any suitable number of individual pixel electrodes. A number of super-pixels arranged in a row or column can be referred to as a super-row 806 or a super-column 808, respectively. Although the touch sensor panel 800 illustrated in FIG. 8 includes a 6×5 array of super-pixel electrodes, it should be understood that the touch sensor panel can include a different number and configuration of super-pixel electrodes.

During a self-capacitance coarse scan of the pixelated touch sensor panel or touch screen (i.e., common mode super-pixel scan), a super-pixel electrode can be stimulated with an AC waveform, and the self-capacitance to ground of the super-pixel electrode can be measured. As an object approaches the super-pixel electrode, the self-capacitance to ground of the super-pixel electrode can change. This change in the self-capacitance of the super-pixel electrode can be detected and measured by the touch sensing system to determine the positions of multiple objects when they touch or come in proximity to the touch screen. During a coarse scan, each super-pixel electrode can be sensed (e.g., single stimulation or multi-stimulation) and the change in self-capacitance measured at each of the super-pixel electrodes in the panel can be viewed as a coarse image of touch on the touch sensor panel. Stimulating super-pixels during a coarse scan rather than stimulating individual pixel electrodes can reduce the number of sense channels required to scan the entire touch sensor panel during a coarse scan. For example, a super-pixel containing 16 individual pixel electrodes can reduce the number of channels necessary by a factor of 16 when simultaneously sensing the entire panel. Thus, rather than needing 480 sense channels as required for a 24×20 array of individual pixel electrodes, a 6×5 configuration of super-pixel electrodes can require only 30 sense/receive channels. In addition to hardware savings, the coarse scan can also be completed faster than a full panel scan of individual pixel electrodes and consume less power than a full panel scan of individual pixel electrodes. In some cases the number of super-pixels and sense/receive channels can be the same, such that the entire panel can be scanned at once.

Similarly, a mutual capacitance coarse scan of the pixelated touch sensor panel can be used to detect an object, such as an active stylus or other input device. For brevity, the following discussion will address an active stylus as an exemplary object. The stylus can generate stimulation signals which can couple to super-pixel electrodes, forming a mutual capacitance therebetween. The change in mutual capacitance between the active stylus and the super-pixel electrodes can be detected and measured by the touch sensing system to determine the position of the active stylus in contact with or proximity to the touch screen. The use of super-pixel electrodes can also provide the benefits of and associated with reducing the number of sense/receive channels.

Figure 9:
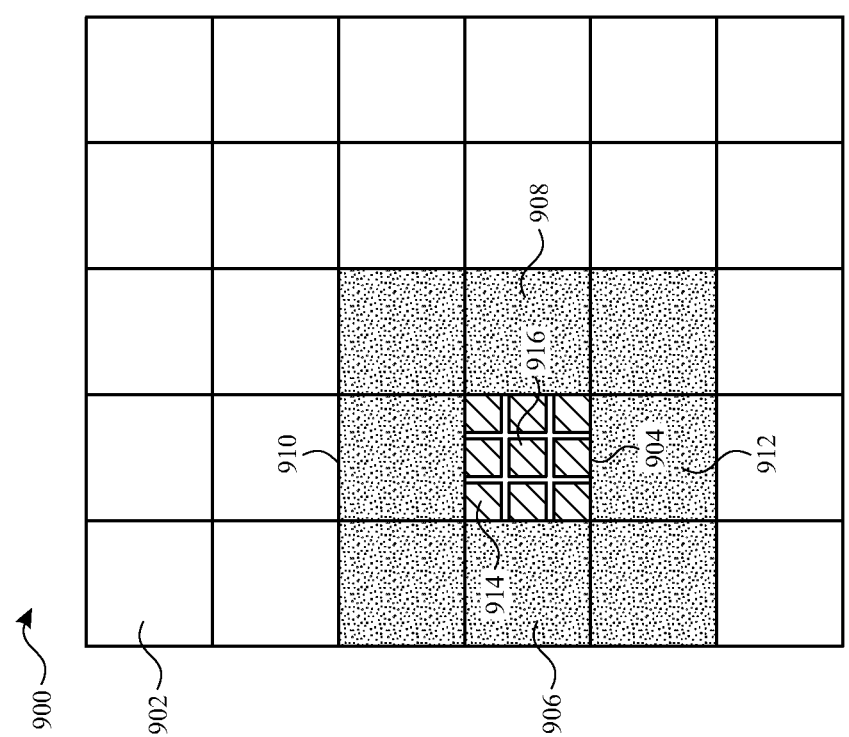
FIG. 9 illustrates an example pixelated touch sensor panel configured to include super-pixel electrodes for coarsely detecting stylus location according to examples of the disclosure.

The common mode super-pixel scan can be used to detect the presence of a stylus, pen or other touching object, and provide coarse information about its location. The super-pixel electrode with the maximum touch value (corresponding to the largest change in self-capacitance due to a finger or passive stylus or mutual capacitance due to the active stylus) can be identified by the touch system. In some examples, additional location information can be estimated using touch values from adjacent super-pixel electrodes. FIG. 9 illustrates an example pixelated touch sensor panel configured to include super-pixel electrodes for coarsely detecting stylus location according to examples of the disclosure. Touch sensor panel 900 can include super-pixel electrodes, such as super-pixel electrode 902. During a coarse scan a touch value can be generated for each super-pixel electrode in the panel. The super-pixel electrode with the maximum touch value can correspond to the super-pixel electrode closest to the stylus. In the example illustrated in FIG. 9, super-pixel electrode 904 can correspond to the super pixel with the maximum touch value. As discussed above, super-pixel electrode 904 with the maximum touch value can be indicative of a stylus present proximate to super-pixel 904.

The touch values of adjacent super-pixel electrodes can be used to provide additional location information. For example, a centroid can be calculated using the touch values corresponding to the super-pixel having the maximum touch value and the super-pixels adjacent to the super-pixel electrode having the maximum value. A centroid can be calculated in both the horizontal (x-axis) and vertical (y-axis) axes. The centroids can indicate whether the stylus location corresponds to the top, bottom or middle of the super-pixel electrode with the maximum touch value and also whether the stylus location corresponds to the left, right or middle portion of the super pixel electrode. For example as illustrated in FIG. 9, the touch values from the adjacent super-pixel electrodes 906, 908, 910 and 912 adjacent to super-pixel electrode 904, and the touch value from super pixel 904, can be used to calculate additional location information. In some examples, all eight adjacent super-pixel electrodes can be used, although in other examples, a different number of adjacent super-pixel electrodes can be used. For example, the centroid can be calculated using the following expressions:

$$\sum_{n=1}^{3} \frac{Rx(n) \cdot n}{Rx(n)} \text{ and } \sum_{n=1}^{3} \frac{Ry(n) \cdot n}{Ry(n)},$$

where $Rx(n)$ and $Ry(n)$ can correspond to the touch values corresponding to the super-pixels included in the centroid calculation (e.g., corresponding to super-pixels 904, 906 and 908 for the x-axis and super pixels 904, 910 and 912 for the y-axis). The centroid calculation can provide location information identifying the stylus location not only as corresponding to super-pixel electrode 904, but also as corresponding to an approximate sub-division or region of super-pixel electrode 904. As illustrated in FIG. 9, the super-pixel electrode can be sub-divided, for example, into 9 areas including top-left, top-middle, top-right, middle-left, middle-middle (e.g., center), middle-right, bottom-left, bottom-middle and bottom-right. For example, region 914 can correspond to the top-left of super-pixel 904 and region 916 can correspond to the center of super pixel 904.

Although a centroid can be used to determine additional precision for the location of a stylus, other metrics can be used instead of or in addition to the centroid. For example, various ratios of the touch values or the relative magnitude of touch values can be used to determine additional location information. For example, a large magnitude of the touch value of super-pixel electrode 910 compared with the touch value of super-pixel electrode 912 can indicate that the location corresponds to the top of super-pixel electrode 904. Similarly, a ratio of touch values (e.g., maximum to adjacent or adjacent to adjacent) can be used to determine additional location information. Additionally, although the example illustrated in FIG. 9 can correspond to a stylus positioned away from the edges of the touch sensor panel, for a stylus positioned proximate to a super-pixel electrode at the edge of the panel, additional location information can still be provided based on available adjacent super-pixel electrodes.

After performing a coarse scan, a fine scan can be performed. The fine scan can use information from the coarse scan to minimize the number of electrodes scanned to reduce scan time and power consumption and make efficient use of the available sense/receive channel hardware. For example, if the coarse scan indicates a super-pixel electrode, the fine scan can focus on the individual pixel electrodes in the indicated super-pixel electrode and possibly some adjacent super-pixel electrodes. If the coarse scan provides additional location information (e.g., top left or center, etc.), the system can make use of the information to be more selective about which individual pixel electrodes to scan during the fine scan.

Figure 10:
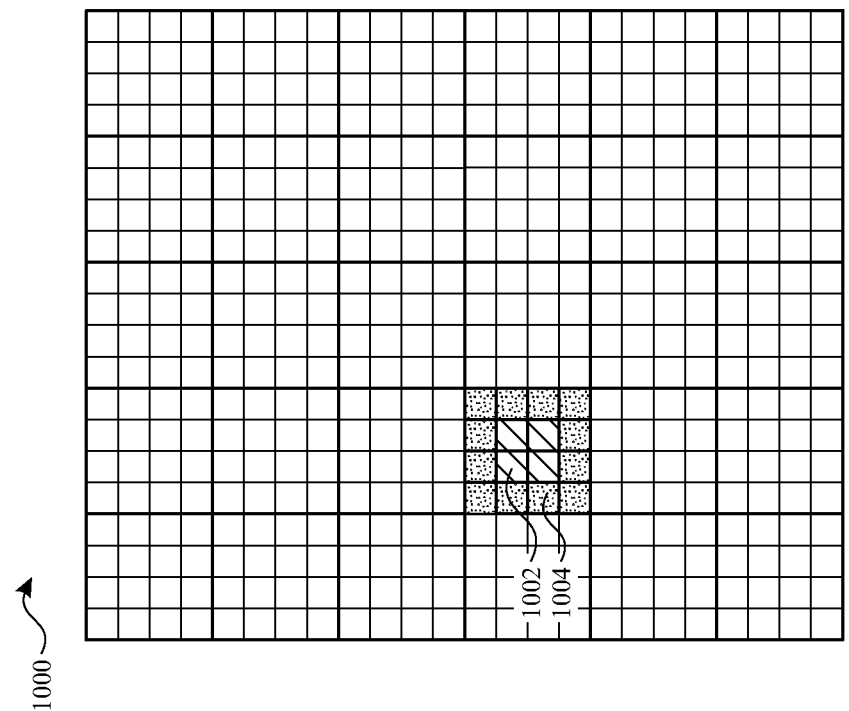
FIG. 10 illustrates an example pixelated touch sensor panel for a per-pixel individual pixel scan according to examples of the disclosure.

In some examples, the fine scan can be a per-pixel individual pixel scan. A per-pixel individual pixel scan can scan a plurality of pixels at or in proximity to the location of the stylus identified by the coarse scan. The system can reconfigure the connection between the electrodes of the touch sensor panel and sense/receive channels for a fine scan. For example, individual pixel electrodes can be coupled with distinct sense/receive channels. FIG. 10 illustrates an example pixelated touch sensor panel for a per-pixel individual pixel scan according to examples of the disclosure. In the example illustrated in FIG. 10, the coarse scan can indicate the coarse location of the stylus as corresponding to the four individual pixel electrodes in region 1002 of touch sensor panel 1000. Region 1002 can correspond to identifying the stylus in the center of super-pixel electrode 1004. In some examples, the coarse scan can indicate a super-pixel electrode rather than one or more individual pixel electrodes within an identified super-pixel electrode. During the fine scan (including one or more scans), individual pixel electrodes can be scanned (using single stimulation or multi-stimulation) and touch values can be generated for the individual pixel electrodes. Pixel electrodes not scanned during the fine scan can be held at a fixed voltage or grounded (not sensed).

The number of individual pixel electrodes scanned can be based on the physical footprint of the stylus. For example, a larger number of individual pixel electrodes can be scanned for a larger stylus footprint, and a smaller number of individual pixel electrodes can be scanned for a smaller stylus footprint. In some cases, one or more individual pixel electrodes in one or more adjacent super-pixels in a super-column and/or super-row can be scanned (simultaneously if enough sense channels are available, or in multiple scan steps). In the example illustrated in FIG. 10, the adjacent pixel electrodes adjacent to region 1002 can be scanned during the fine scan. In some cases the stylus can use a ring electrode, which can have a wider footprint than a stylus with an electrode at the tip of a stylus, requiring scanning of additional individual pixel electrodes. The ring electrode can be used in addition to or in place of an electrode at the tip of the stylus. In some examples, both the ring electrode and the tip electrodes can generate stimulation signals (e.g., at different frequencies) which can be detected during the coarse and/or fine scan. Additionally, orientation information (e.g., provided by the stylus) can be used to determine the number and arrangement of adjacent pixel electrodes to scan. The orientation information can be used to scan pixel electrodes in an asymmetrical pattern, for example, by scanning more individual pixels in the direction indicated by the stylus orientation than in a different direction.

In some cases the number and arrangement of adjacent pixel electrodes to scan during a fine scan can be adjusted based on the detected type of stylus. In some examples, the stylus can transmit information indicating its type and/or physical dimensions (or the information can be detected by the touch sensor panel or entered into the touch sensitive device manually), and the information about the stylus and/or physical dimensions can be used to determine the number and arrangement of pixel electrodes selected for a fine scan. In some examples, the number and arrangement of pixel electrodes selected for the fine can be adjusted dynamically based on stylus information (type, dimension, orientation, etc.) and in other examples the number and arrangement can be fixed.

In some examples, additional individual pixel electrodes (or larger arrangements of electrodes such as super-pixel electrodes, row electrodes or column electrodes) can be sensed during a fine scan in order to measure common mode noise (local or global), and the noise signal measured at these electrodes can be removed from the stylus signals sensed by the fine scan. In some examples, the electrodes can be adjacent to the coarsely detected location. In other examples, the electrode can be proximate, but not adjacent to the coarsely detected location to ensure that local common mode noise can be detected without capturing some of the stylus signal (which can cause some of stylus signals to be subtracted during noise removal). In yet other examples, global common mode noise can be measured from electrodes distant from the coarsely detected location.

Figures 11, 12:
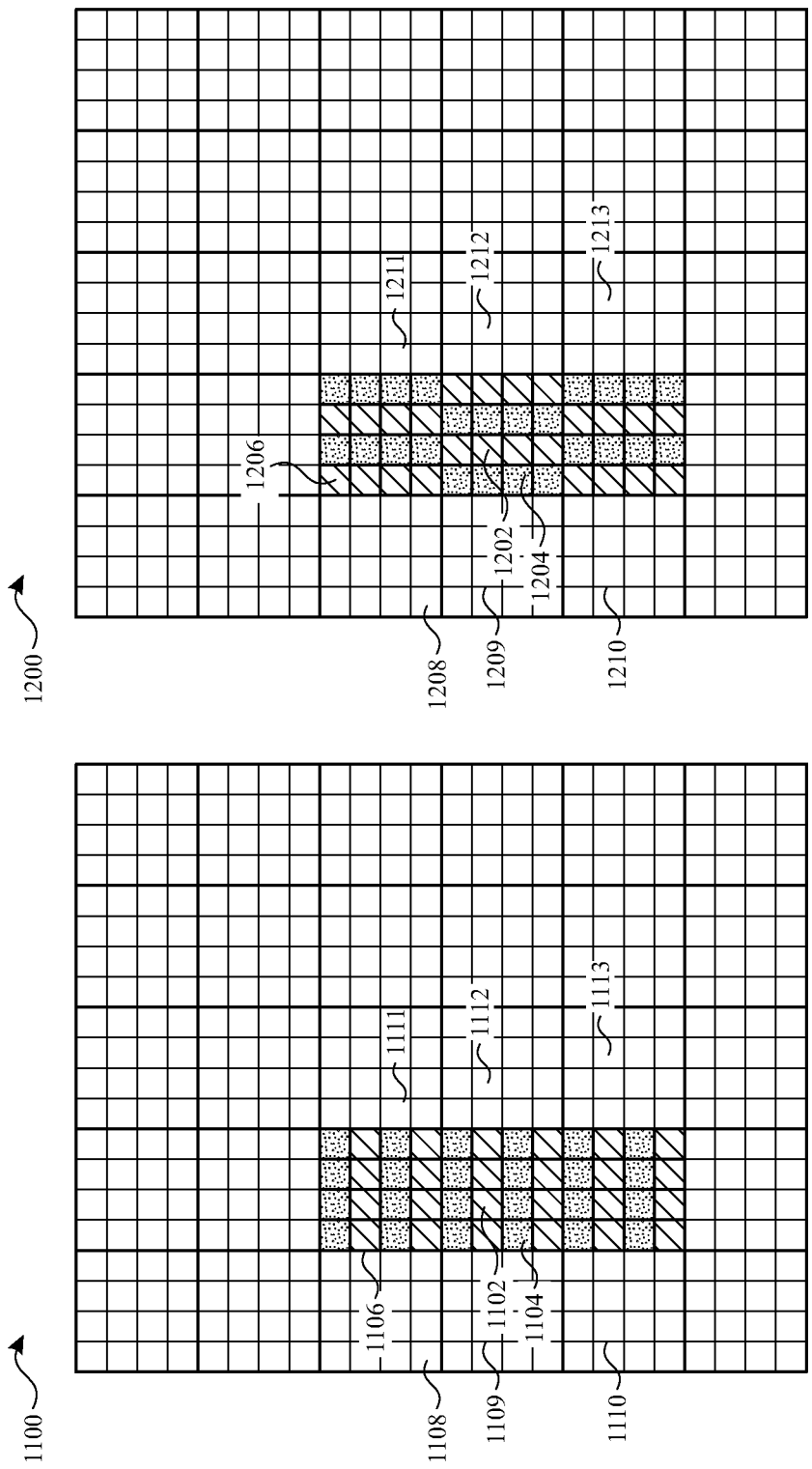
FIG. 11 illustrates an example pixelated touch sensor panel for a row scan according to examples of the disclosure.
FIG. 12 illustrates an example pixelated touch sensor panel for a column scan according to examples of the disclosure.

In some examples, the fine scan can be a row scan and/or column scan. A row scan can scan a plurality of row electrodes formed from individual pixel electrodes at or in proximity to the location of the stylus identified by the coarse scan. A column scan can scan a plurality of column electrodes formed from individual pixel electrodes at or in proximity to the location of the stylus identified by the coarse scan. The system can reconfigure the connection between the electrodes of the touch sensor panel and sense/receive channels for a fine scan. For example, row electrodes or column electrodes can be coupled with distinct sense/receive channels. FIG. 11 illustrates an example pixelated touch sensor panel for a row scan according to examples of the disclosure. In the example illustrated in FIG. 11, the coarse scan can indicate the location of the stylus as corresponding to the four individual pixel electrodes in region 1102 of touch sensor panel 1100. Region 1102 can correspond to identifying the stylus in the center of super-pixel electrode 1104. In some examples, the coarse scan can indicate a super-pixel electrode rather than one or more individual pixel electrodes within an identified super-pixel electrode. During the fine scan (including one or more scans), rows of individual pixel electrodes can be scanned (using single stimulation or multi-stimulation) and touch values can be generated for the rows of individual pixel electrodes. In the example illustrated in FIG. 11, a row 1106 can contain 4 individual pixel electrodes, though a different number of individual pixel electrodes in a row can be used. Pixel electrodes not scanned during the fine scan can be held at a fixed voltage or grounded (i.e., not sensed).

The number of rows of individual pixel electrodes (row electrodes) scanned can be based on the physical footprint of the stylus. For example, a larger number of rows of individual pixel electrodes can be scanned for a larger stylus footprint, and a smaller number of rows of individual pixel electrodes can be scanned for a smaller stylus footprint. In some cases, one or more rows of individual pixel electrodes (or individual pixel electrodes, for example) in one or more adjacent super-pixels in a super-column and/or super-row can be scanned (simultaneously if enough sense channels are available, or in multiple scan steps). In the example illustrated in FIG. 11, the rows of adjacent super-pixel electrodes adjacent to region 1102 can be scanned during the fine scan. Scanning some or all of the rows in one or more adjacent super-pixels (e.g., the super-pixel above and below super-pixel electrode 1104) can help provide sufficient information to generate a stylus signal profile. The signal profile can be used by a position calculation algorithm to calculate the position of the stylus along an axis (e.g. vertical axis/y-axis) with appropriate accuracy. Although not shown, in some examples, scanning one or more rows of individual pixel electrodes (or individual pixel electrodes, for example) for some or all of adjacent super-pixel electrodes (1108-1113) in adjacent super-columns can be performed to ensure that slight movement of the stylus does not lead to the stylus moving outside the sensed area. The number of rows electrodes can also be determined based on stylus orientation or other information as discussed above.

FIG. 12 illustrates an example pixelated touch sensor panel for a column scan according to examples of the disclosure. In the example illustrated in FIG. 12, the coarse scan can indicate the location of the stylus as corresponding to the four individual pixel electrodes in region 1202 of touch sensor panel 1200. Region 1202 can correspond to identifying the stylus in the center of super-pixel electrode 1204. In some examples, the coarse scan can indicate a super-pixel electrode rather than one or more individual pixel electrodes within an identified super-pixel electrode. During the fine scan (including one or more scans), columns of individual pixel electrodes can be scanned (using single stimulation or multi-stimulation) and touch values can be generated for the columns of individual pixel electrodes. In the example illustrated in FIG. 12, a column 1206 can contain 4 individual pixel electrodes, though a different number of individual pixel electrodes in a column can be used. Pixel electrodes not scanned during the fine scan can be held at a fixed voltage or grounded (i.e., not sensed).

The number of columns of individual pixel electrodes (column electrodes) scanned can be based on the physical footprint of the stylus. For example, a larger number of columns of individual pixel electrodes can be scanned for a larger stylus footprint and a smaller number of columns of individual pixel electrodes can be scanned for a smaller stylus footprint. In some cases, one or more columns of individual pixel electrodes (or individual pixel electrodes, for example) in one or more adjacent super-pixels in a super-column and/or super-row can be scanned (simultaneously if enough sense channels are available, or in multiple scan steps). In the example illustrated in FIG. 12, the columns of adjacent super-pixel electrodes adjacent to region 1202 can be scanned during the fine scan. Scanning some or all of the columns in one or more adjacent super-pixels (e.g., the super-pixel above and below super-pixel electrode 1204) can help provide sufficient information to generate a stylus signal profile. The signal profile can be used by a position calculation algorithm to calculate the position of the stylus along an axis (e.g. horizontal axis/x-axis) with appropriate accuracy. Although not shown, in some examples, scanning one or more columns of individual pixel electrodes (or individual pixel electrodes, for example) for some or all of adjacent super-pixel electrodes (1208-1213) in adjacent super-columns can be performed to ensure that slight movement of the stylus does not lead to the stylus moving outside the sensed area. The number of column electrodes can also be determined based on stylus orientation or other information as discussed above.

In some examples, the touch sensitive device can be configured to perform either a per-pixel scan or a row and column scan, though in other examples the touch sensitive device can dynamically select the type of fine scan to perform. For example, the per-pixel scan can provide increased accuracy over the row and column scans and can be better suited to applications requiring additional resolution or to detect multiple objects operating in close proximity to one another. In such a case, the device can dynamically select the per-pixel scan. In other cases, less resolution may be required and the row and column scan can be dynamically selected.

In some examples, multiple objects (e.g., multiple styli) can be used simultaneously. In some examples, the touch sensing device can time multiplex (e.g., scan for each stylus at a different time) the coarse and fine detection of the two stylus devices. In other examples, the touch sensing device can frequency multiplex (e.g., scan for each stylus at a different frequency) the coarse and fine detection of the two stylus devices, though additional sense/receive channels may be necessary to perform the scans for both styli in parallel.

Figure 13:
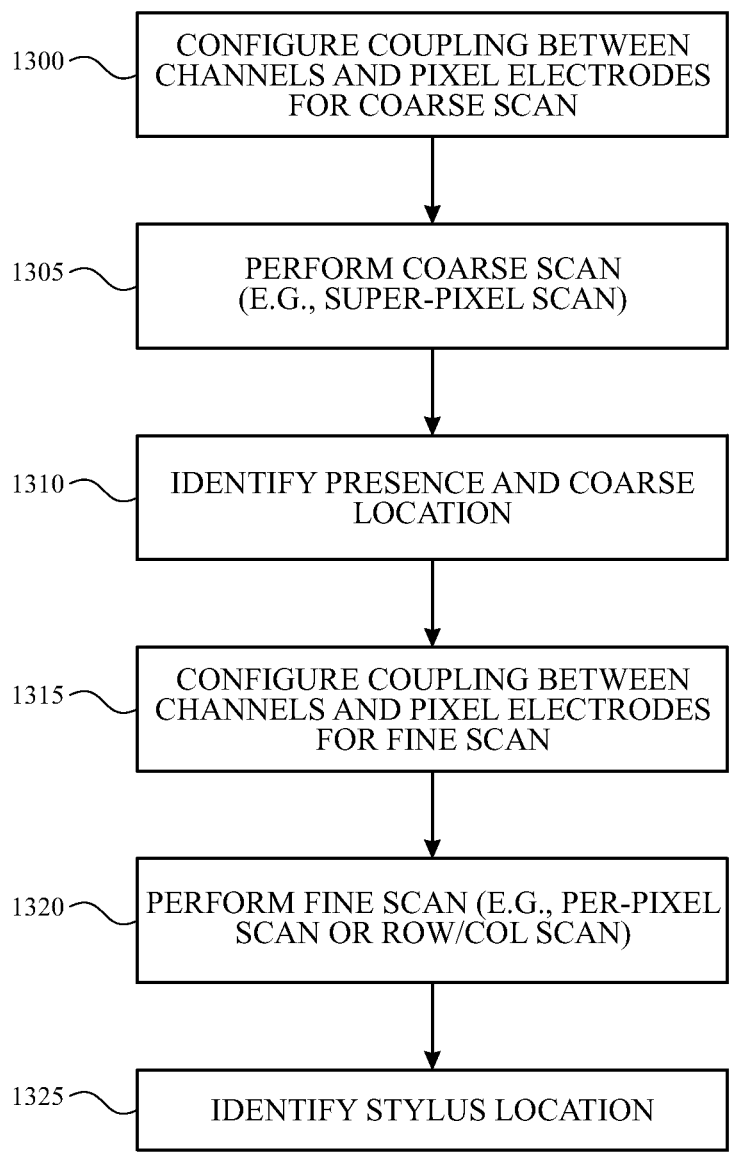
FIG. 13 illustrates an example process for performing scanning operations for a pixelated touch sensor panel based on a coarse detection scan according to examples of the disclosure.

FIG. 13 illustrates an example process for performing scanning operations for a pixelated touch sensor panel based on a coarse detection scan according to examples of the disclosure. The system can configure the connections between available sense/receive channels and electrodes of the pixelated touch sensor panel for a coarse scan (1300). For example, the system can couple individual pixel electrodes to form super-pixels and couple the super pixels to available sense channels. The system can perform the coarse scan (e.g., a super-pixel detection scan) (1305). The system can identify a touch event corresponding to a stylus (if present) and identify the coarse location of the stylus (1310). The coarse location of the stylus can be a specific super-pixel or a specific region within a super-pixel. The system can use the coarse location information and in some cases information about the physical dimensions of the stylus to configure coupling for the connections between sense/receive channels and electrodes of the pixelated touch sensor panel for a fine scan (1315). In some examples, the fine scan can include a per-pixel individual pixel scan and the connections can be between sense channels and individual pixel electrodes. In other examples, the fine scan can include a row scan and the connection can be between sense channels and row electrodes formed by coupling individual pixel electrodes together. In other examples, the fine scan can include a column scan and the connection can be between sense channels and column electrodes formed by coupling individual pixel electrodes together. The system can perform the fine scan (e.g., per-pixel scan, row scan and/or column scan) (1320). The fine scan can also be a higher resolution version of the super-pixel electrode scan (e.g., scanning banks of four individual pixel electrodes—or some other number of individual pixel electrodes smaller than the number of individual pixel electrodes in the coarse scan—coupled together rather than banks of 16 pixel electrodes coupled together to form a super-pixel). The system can determine the location of the stylus based on the results of the fine scan (1325). Performing a coarse scan to detect the presence of the stylus can reduce the power consumption of the system and the number of required sense channels compared with continuously performing full panel individual pixel scans (i.e., scanning each individual pixel electrode to generate the maximum amount of touch information for the entire pixelated sensor panel) before the stylus is detected. Determining the coarse location of the stylus with additional precision can reduce the number of pixels that need to be scanned during a fine scan to determine the high resolution location of the stylus further saving power over a full panel individual pixel scan.

In the discussion of detecting a stylus using a pixelated touch sensor panel, the number of sense/receive channels could be limited based on the dimensions of the stylus. However, when using the pixelated touch sensor panel to detect multiple touches in multiple regions of the touch sensor panel, the number of sense/receive channels and/or the number of scan steps may need to be increased. In some examples, the number of sense/receive channels can be increased, but coarse and fine scans can be implemented to reduce power by powering down sense/receive channels used to detect touch in regions of the pixelated touch sensor panel without objects present. It is understood that powering down unused sense channels can also help reduce power consumption even when the number of sense/receive channels is not increased.

As discussed herein, the pixelated touch sensor panel can include an array of individual pixel electrodes configured to detect touch or hover/proximity events by measuring, for example, changes in the self-capacitance of each individual pixel electrode. In other examples, changes in mutual capacitance can be measured between an active stylus electrode and each individual pixel electrode. During a full panel scan, each touch pixel electrode can be sensed and the change in self-capacitance measured at each of the pixel electrodes in the panel can be viewed as an image of touch on the touch sensor panel. If enough sense/receive channels are available, the full panel scan can be completed in a single scan step. Alternatively, the full panel scan can sense multiple pixel electrodes (e.g., up to the number of sense/receive channels available) during each of multiple steps of the full panel scan. For example, the 24×20 array of pixel electrodes of the pixelated touch sensor panel in FIG. 7 can be scanned in one step if the system includes 480 sense channels. In other examples, the full panel scan can include fewer sense channels, but more steps. For example, the 24×20 array can be scanned in two steps with 240 sense channels or in 12 steps using 40 sense channels. The trade-off between the number of channels and steps can involve consideration of the number of channels available, power consumption and timing (e.g., scan duration), among other concerns.

Figure 14A:
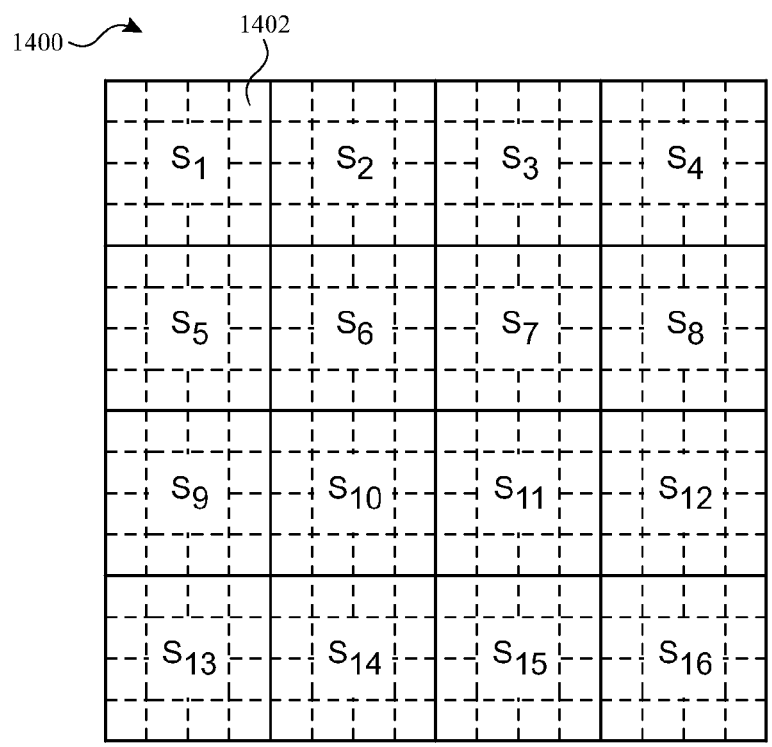
FIG. 14A illustrates an example scan of a pixelated touch sensor panel according to examples of the disclosure.

FIG. 14A illustrates an example scan of a pixelated touch sensor panel according to examples of the disclosure. Pixelated touch sensor panel 1400 illustrated in FIG. 14A includes a 16×16 array of pixel electrodes for a total of 256 pixel electrodes 1402. Pixelated touch sensor panel 1400 can be incorporated into touch sensing system including 16 sense channels. In order to perform a full panel self-capacitance scan of all pixels, the 16 sense channels can be coupled to and sense 16 pixel electrodes during each of 16 steps of the self-capacitance full panel scan. As illustrated in FIG. 14A, the first step (labeled "S1") can include coupling each pixel electrode in the region of S1 to one of the 16 sense channels and sensing changes in self-capacitance. In each further step (labeled "S2" through "S16"), the touch system can couple the available sense channels to the pixel electrodes in the corresponding region and sense the self-capacitance. At the conclusion of the 16 steps of the full panel self-capacitance sense scan, the system can obtain measurements corresponding to each pixel electrode in pixelated touch sensor panel 1400 to obtain an image of touch.

The minimum number of self-capacitance scan steps can be a function of the number of pixel electrodes in the pixelated touch sensor panel, the number of available sense channels in the touch controller and the number of touch controller circuits available assuming that every node in the panel is to be scanned individually. The relationship can be represented mathematically as:

$$x = \frac{M}{N \cdot Q},$$

where x can represent the number of scan steps for a full panel self-capacitance scan, M can represent the number of pixel electrodes in the pixelated touch sensor panel, N can represent the number of sense channels in a touch controller circuit, and Q can represent the number of touch controller circuits. When touch controller circuits have different numbers of sense channels, the denominator in the above equation can be replaced with the total number of sense channels in the touch system. When x is not an integer, the expression should be rounded up to the next integer.

Figure 14B:
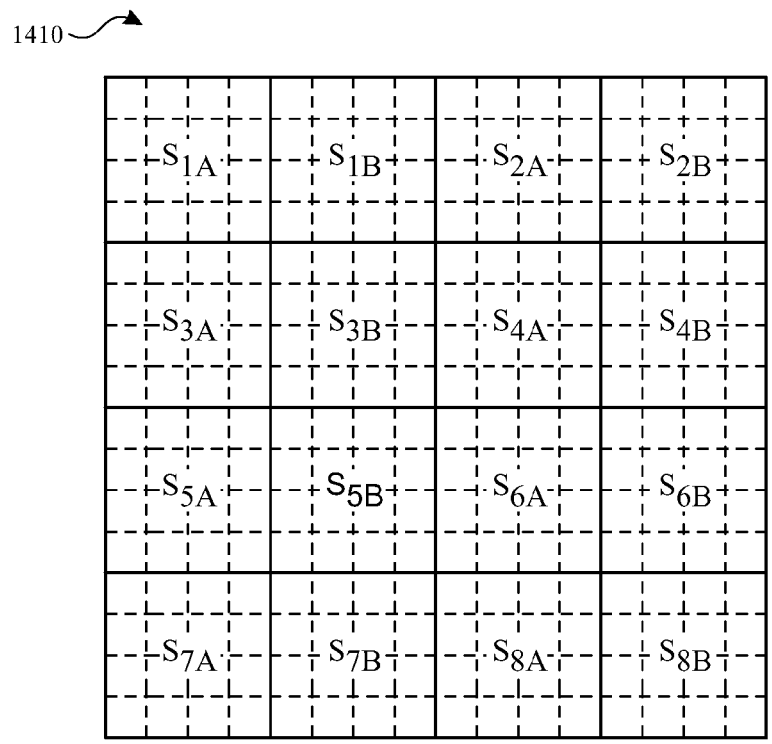
FIG. 14B illustrates an example scan of a pixelated touch sensor panel using multiple touch controllers according to examples of the disclosure.

FIG. 14B illustrates an example scan of a pixelated touch sensor panel using multiple touch controllers according to examples of the disclosure. Pixelated touch sensor panel 1410 illustrated in FIG. 14B can include a 16×16 array of pixel electrodes like pixelated touch sensor panel 1400. Pixelated touch sensor panel 1410 can be incorporated into touch sensing system including two touch controller circuits, each of which includes 16 sense channels. In order to perform a full panel self-capacitance scan of all pixels, the 16 sense channels of one touch controller (touch controller A) can be coupled to and sense 16 pixel electrodes during each of 8 steps of the self-capacitance full panel scan. Likewise, the 16 sense channels of the other touch controller (touch controller B) can be coupled to and sense 16 pixel electrodes during each of 8 steps of the self-capacitance full panel scan. As illustrated in FIG. 14B, the first step for touch controller A (labeled "S1A") can include coupling each pixel electrode in the region of S1A to one of the 16 sense channels of touch controller A and sensing changes in self-capacitance. The first step for touch controller B (labeled "S1B") can include coupling each pixel electrode in the region of S1B to one of the 16 sense channels of touch controller B and sensing changes in self-capacitance. S1A and S1B can occur simultaneously in a first step. In each further step (labeled "S2A" through "S8B"), the touch system can couple the available sense channels of touch controllers A and B to the pixel electrodes in the corresponding region and sense the self-capacitance. At the conclusion of the 8 steps of the full panel self-capacitance sense scan, the system can obtain measurements corresponding to each pixel electrode in pixelated touch sensor panel 1410 to obtain an image of touch.

Execution of the steps of a full panel scan can be performed based on scheduled scans (including scheduled scan steps), which can be part of a scan plan for the system. Execution of the full panel scan steps can be performed to generate high resolution scan images (touch images). It should be understood that a full panel scan of each pixel of the touch sensor is an example of a fine scan, but in other examples a fine scan could be a different resolution scan that is higher resolution than a coarse scan. Additionally, although the example scans in FIGS. 14A and 14B include square regions of pixel electrodes and order the scans from left to right and from top to bottom, the full panel scans are not so limited. In some configurations any pixel can be assigned to any sense channel during any scan step. In some examples, to simplify routing (or due to routing constraints), touch controller A can be responsible for scanning a contiguous half of the panel (e.g., the left two columns of the panel in FIG. 14B) and touch controller B can be responsible for scanning the other contiguous half of the panel (e.g., the right two columns of the panel FIG. 14B). Unlike the illustration of FIG. 14B, the two touch controllers do not have to scan adjacent regions of the panel in a common scan step.

FIGS. 15A and 15B illustrate example scan plans for a full panel self-capacitance scan of the pixelated touch sensor panels of FIGS. 14A and 14B according to examples of the disclosure. As illustrated in FIG. 15A, during each time period from t1 to t16 (i.e., sequential time steps), the touch controller performs a scheduled scan step corresponding to sensing the self-capacitance at each pixel in the region corresponding to the steps as illustrated in FIG. 14A. For example, at t1, pixel electrodes in the region corresponding to S1 can be sensed. Likewise, at t2, pixel electrodes in the region corresponding to S2 can be sensed. Scans can continue for the corresponding region for each time period to complete the full panel scan. FIG. 15B illustrates the scheduled scan steps performed by two touch controllers, touch controller A and touch controller B, during the full panel scan. For example, at t1, pixel electrodes in the region corresponding to S1A can be sensed by touch controller A and pixel electrodes in the region corresponding to S1B can be sense by touch controller B. Scans can continue for the corresponding region for each touch controller for each time period to complete the full panel scan.

Figure 16:
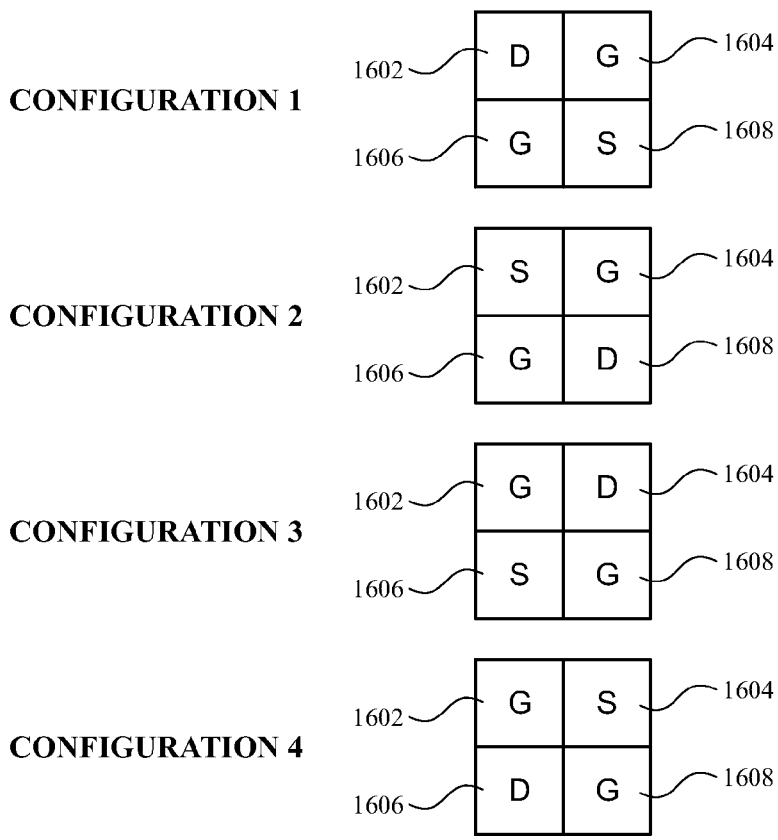
FIG. 16 illustrates example sensing configurations for a group of pixel electrodes to sense mutual capacitance according to examples of the disclosure.

In other examples, the touch system can sense mutual capacitance at the pixelated touch sensor panel (e.g., cross-coupling between two individual pixel electrodes) to generate an image of touch. FIG. 16 illustrates example sensing configurations for a group of pixel electrodes to sense mutual capacitance according to examples of the disclosure. FIG. 16 illustrates four example configurations to sense a mutual capacitance for each pixel electrode in the group. The group of pixel electrodes includes pixel electrodes 1602, 1604, 1606 and 1608. In the first configuration, pixel electrode 1602 can be configured as a drive electrode, pixel electrode 1608 can be configured as a sense electrode, and pixel electrodes 1604 and 1606 can be grounded or coupled to a DC voltage. During a mutual capacitance scan in the first configuration, the system can apply one or more stimulation signals to the drive electrode. The sense electrode can be coupled to a sense channel and can sense the signal coupling between the drive electrode and sense electrode. The first configuration can generate a measurement representative of the touch signal for pixel electrode 1608.

In the second configuration, pixel electrode 1608 can be configured as a drive electrode, pixel electrode 1602 can be configured as a sense electrode (e.g., held at a fixed DC voltage), and pixel electrodes 1604 and 1606 can be grounded or coupled to a DC voltage. During a mutual capacitance scan in the second configuration, the sense electrode can sense the signal coupling between the drive electrode and sense electrode to generate a measurement representative of the touch signal for pixel electrode 1602. In the third configuration, pixel electrode 1604 can be configured as a drive electrode, pixel electrode 1606 can be configured as a sense electrode, and pixel electrodes 1602 and 1608 can be grounded or coupled to a DC voltage. During a mutual capacitance scan in the third configuration, the sense electrode can sense the signal coupling between the drive electrode and sense electrode to generate a measurement representative of the touch signal for pixel electrode 1606. In the fourth configuration, pixel electrode 1606 can be configured as a drive electrode, pixel electrode 1604 can be configured as a sense electrode, and pixel electrodes

1602 and 1608 can be grounded or coupled to a DC voltage. During a mutual capacitance scan in the fourth configuration, the sense electrode can sense the signal coupling between the drive electrode and sense electrode to generate a measurement representative of the touch signal for pixel electrode 1604. By performing mutual capacitance scans in the four configurations for pixel electrodes 1602, 1604, 1606 and 1608, the system can generate a measurement for each pixel electrode in the group.

In some examples, rather than associating the measurement for each configuration with one of the individual pixel electrodes configured as a sense electrode, the measurements can be representative of the cross-coupling between the corresponding drive and sense electrode for each configuration, respectively. For example, rather than associating the mutual capacitance measurement of the first configuration described above with sense electrode 1608, the mutual capacitance measurement can be associated with drive electrode 1602 and sense electrode 1608.

The mutual capacitance scans described in FIG. 16 can be applied to other groups of pixels in the touch sensor panel in a single stimulation or multi-stimulation scheme to generate measurements of each pixel in the touch sensor panel to generate an image of touch. As described herein, the mutual capacitance scan can include a plurality of steps to generate the image of touch for the entire pixelated touch sensor panel. Like the full panel self-capacitance scan described above, the full-panel mutual capacitance scan steps can be scheduled for scanning the pixelated touch sensor panel.

Although four configurations are described in FIG. 16, in other examples, the mutual capacitance for a group of pixel electrodes can be represented by fewer measurements. For example, the system can use one of the four configurations to generate one measurement for the group of four pixel electrodes. In other examples, the system can use two of the four configurations (e.g., configuration 1 and configuration 3) to generate two measurements that can be used to generate the image of touch. In some examples, any number of configurations can be used and the measurements can be combined to generate a measurement representative of the group of pixel electrodes. It should be understood that the four pixel configurations described in FIG. 16 are representative, and other configurations can be possible for a four pixel group and when scanning a larger number of pixel electrodes.

The full panel fine scans, whether mutual capacitance or self-capacitance scans, can waste considerable power when there are no objects touching or in proximity to the panel or when objects are coarsely detected in few regions of the pixelated touch sensor panel. In order to reduce power consumption by the system, the system can perform one or more coarse scans before performing a fine scan such as a full panel scan. Based on the coarse scan, the system can adjust the subsequent scanning (e.g., by reprogramming the subsequent scheduled scan or by aborting one or more steps of the scheduled scan) of the touch sensor panel. Sense channels that are unused due to the adjusted scanning can be powered down to save power. In other examples, rather than aborting scan steps or reprogramming the controller to idle for periods, some scan steps can be repeated (and the results averaged) to increase signal-to-noise ratio for the (SNR) scan.

The one or more coarse scans can include banked common-mode self-capacitance and/or banked common-mode mutual capacitance scans. In some examples, one coarse scan can adequately provide coarse information to adjust the fine scan. In other examples, information from more than one coarse scan can be used together to identify poorly grounded or floating objects to correct measured touch signals.

Figure 17A:
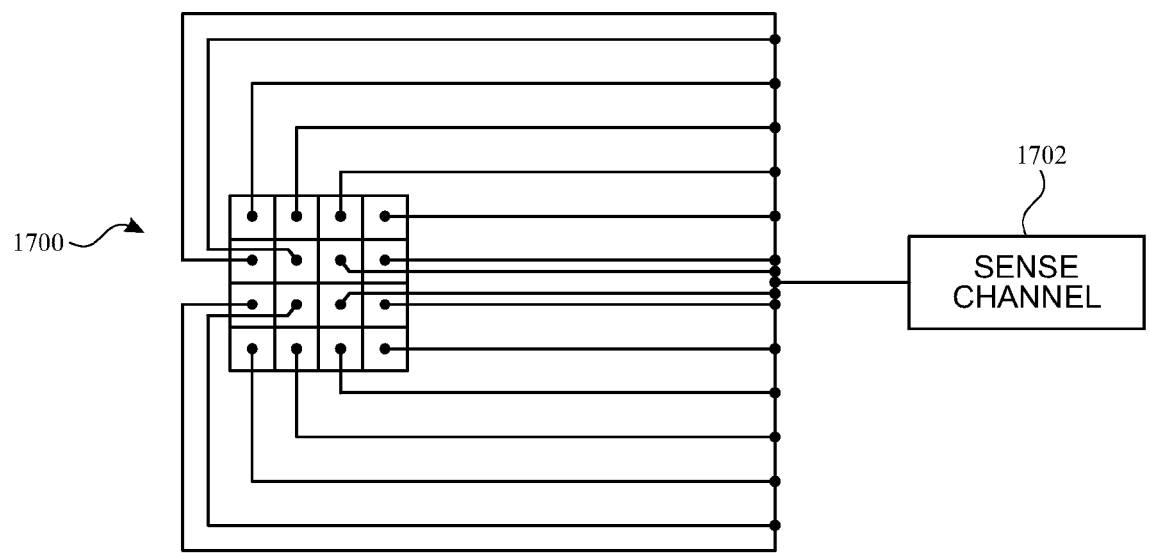
FIG. 17A illustrates an example banked common mode self-capacitance scan according to examples of the disclosure.

The common mode self-capacitance scan can include coupling multiple pixel electrodes to a common sense channel for the scan, for example, as in the common mode super-pixel scan described above. The multiple pixel electrodes coupled to the common sense channels can be considered as a bank of electrodes. FIG. 17A illustrates an example banked common mode self-capacitance scan according to examples of the disclosure. FIG. 17A illustrates a bank 1700 of 16 individual pixel electrodes coupled to sense channel 1702. During the banked common mode self-capacitance scan, each of the sense channels can be coupled to a bank of individual pixels so as to scan the entire touch sensor panel in a single self-capacitance scan. If desired, however, the banked common mode scan can couple fewer individual pixel electrodes to the sense channels and include additional scan steps in order to generate a higher resolution coarse scan.

Figure 17B:
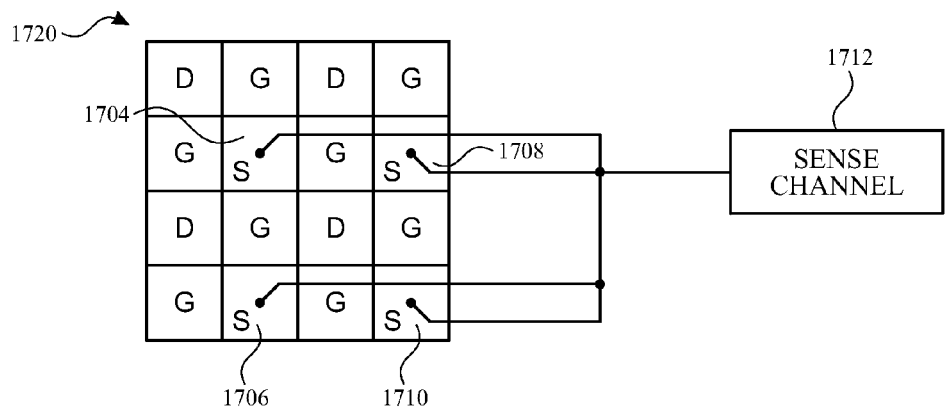
FIG. 17B illustrates an example banked common mode mutual capacitance scan according to examples of the disclosure.

The common mode mutual capacitance scan can include coupling multiple sense electrodes to a common sense channel. FIG. 17B illustrates an example banked common mode mutual capacitance scan according to examples of the disclosure. FIG. 17B illustrates a bank 1720 of 16 individual pixel electrodes configured in a mutual capacitance configuration. Pixel electrodes 1704, 1706, 1708 and 1710 correspond to sense electrodes, which can be coupled to a common sense channel 1712. The remaining pixel electrodes can be drive electrodes or coupled to ground or a DC voltage. During the banked common mode mutual capacitance scan, each of the sense channels can be coupled to multiple sense pixels so as to scan the entire touch sensor panel in a single mutual capacitance scan. If desired, however, the banked common mode scan can couple fewer sense electrodes to the sense channels and include additional scan steps in order to generate a higher resolution coarse scan. Additionally or alternatively, the bank 1720 of individual pixel electrodes can be arranged according to one or more of the configurations of FIG. 16 in multiple steps to generate a higher resolution coarse scan.

Figure 18:
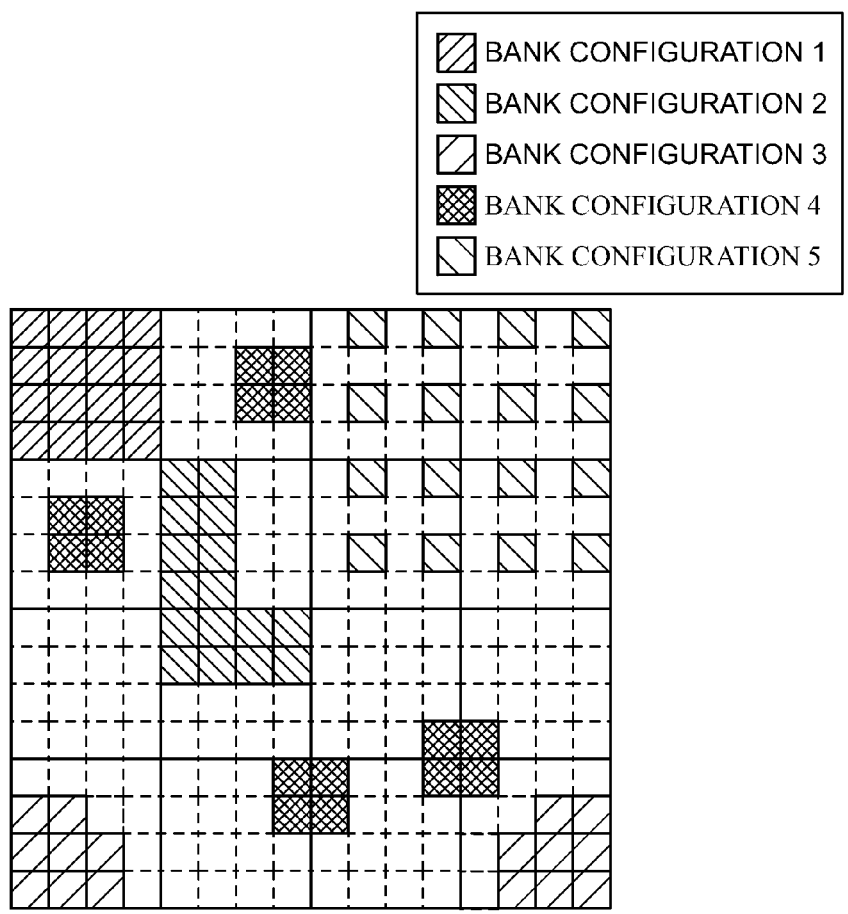
FIG. 18 illustrates example configurations of individual pixel electrodes forming banks according to examples of the disclosure.

The bank of pixels for a mutual capacitance or self-capacitance coarse scan can define a region of a pixelated touch sensor panel. The measurement at each sense channel can coarsely represent the location of an object touching or proximate to the region. Although the regions defined by the banks illustrated in FIGS. 17A and 17B are illustrated as a contiguous, square arrangement of pixels, the banks of pixel electrodes can have a different arrangement. FIG. 18 illustrates example configurations of individual pixel electrodes forming banks according to examples of the disclosure. FIG. 18 illustrates five different configurations of individual pixel electrodes for banks including 16 individual pixel electrodes. The first bank configuration in FIG. 18 includes a contiguous square arrangement of pixel electrodes. However, in other configurations, the bank can include an arrangement of contiguous pixels having a different shape such as the L-shape illustrated by the second configuration in FIG. 18. Alternatively, the shape can be a polygon or a row or column of electrodes. In other examples, the pixel electrodes forming the bank can be partially or entirely non-contiguous. For example, in the third configuration of FIG. 18, the bank can be formed from two groups of contiguous pixel electrodes on opposite sides of the panel, such that the bank wraps around the border of the pixelated touch sensor panel. In other examples, the partially contiguous bank can include small groups of contiguous electrodes.

The fourth configuration of FIG. 18 illustrates four small groups of contiguous electrodes (2×2 squares), for example. It should be understood that the small groups can include a different number of pixel electrodes and as few as an individual pixel electrode. The small groups can each include the same number of electrodes or they can have different numbers of electrodes. The small groups can also take on a variety of shapes. In the other examples, as illustrated by the fifth bank configuration, the pixel electrodes can be entirely non-contiguous. It should be understood that the bank configurations in FIG. 18 are merely examples, and other arrangements or configurations are possible.

Although FIG. 18 illustrates different configurations of individual pixel electrodes for banks including 16 individual pixel electrodes, the banks can include different numbers of pixel electrodes. In some examples, the number of pixel electrodes per bank can be selected based on the number of sense channels available. For example, if the pixelated touch sensor panel includes 480 individual pixel electrodes and 20 sense channels are available, each bank can include 24 touch pixel electrodes so as to scan the entire touch sensor panel in one single step self-capacitance scan. In other examples, the number of pixels per bank can be defined based on a desired resolution for the scan. For example, if the desired resolution requires a bank with 16 individual pixel electrodes, even if 48 sense channels are available, the system can use 30 sense channels for the coarse scan and power down the remaining 18 channels. Alternatively, if the desired resolution requires a bank with 4 pixel electrodes, even if only 60 sense channels are available, the system can use two coarse scan steps to generate a coarse image of touch for the entire panel. In other examples, the coarse scan can scan fewer than all pixel electrodes to generate a lower resolution coarse image of touch. Additionally, banks can be different sizes (i.e., include different numbers of electrodes. For example, some banks can include a first number of pixel electrodes and other banks can have a second number of pixel electrodes.

Figure 19A:
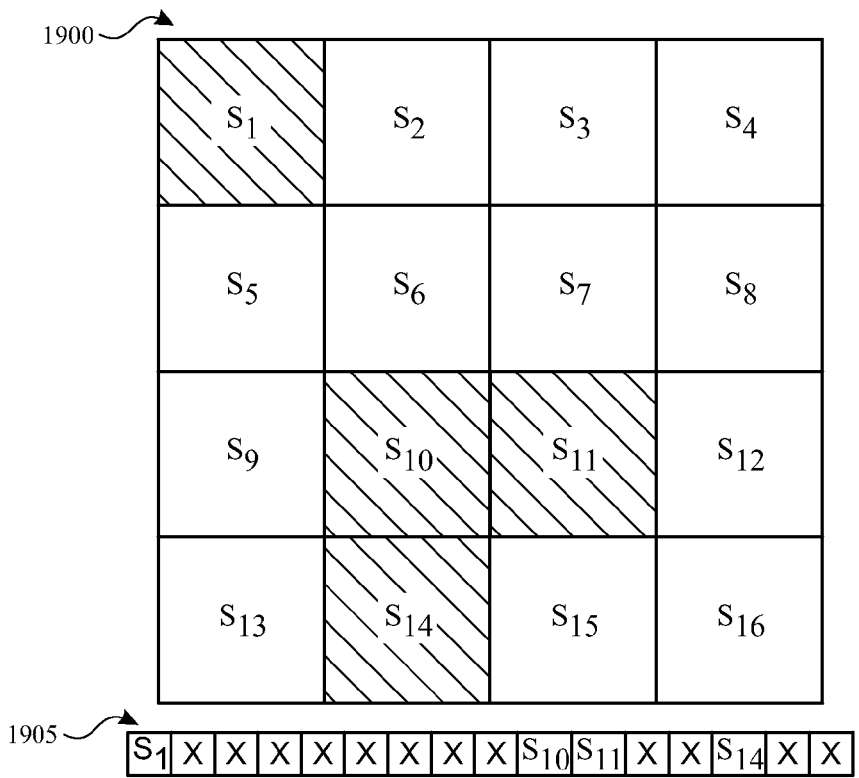
FIG. 19A illustrates an example timeline of scheduled fine scan steps modified based on the results of a coarse scan of a pixelated touch sensor panel according to examples of the disclosure.

As discussed herein, information from the one or more coarse scans can be used to identify regions (banks) of the pixelated touch sensor panel that detect an object touching or hovering (i.e., touch events) or detect no object. The touch information can be used to determine which scan steps of the scheduled fine scan should be aborted. In some examples, the region (bank) defined by a scan step of a fine scan can correspond to the region (bank) defined by the coarse scan. FIG. 19A illustrates an example timeline of scheduled fine scan steps modified based on the results of a coarse scan of a pixelated touch sensor panel according to examples of the disclosure. FIG. 19A divides a pixelated touch sensor panel 1900 into 16 regions for a coarse scan and for a scheduled fine scan. The scheduled fine scan can be a full panel scan of the pixelated sensor panel including 16 scan steps (S1 through S16). The pixelated sensor panel is divided into 16 regions for the fine scan, each region scanned during one of the fine scan steps. The 16 scan steps can be scheduled to be performed in the 16 time periods illustrated in timeline 1905. The coarse scan can be a banked common mode self-capacitance scan (e.g., a super-pixel self-capacitance scan), which can coarsely scan the banks (coarse scan regions) of the pixelated touch sensor in one scan step. In the example illustrated in FIG. 19A, the system detects an object touching or hovering at the shaded regions labeled S1, S10, S11 and S14 during the coarse scan. During the subsequent fine scan, the system can perform scan steps S1, S10, S1 and S14, and the system can abort the scan of the remaining steps. As illustrated in timeline 1905, aborted scan steps can be represented by an "X", and the remaining scan steps can be executed in their scheduled time periods.

Figure 19B:
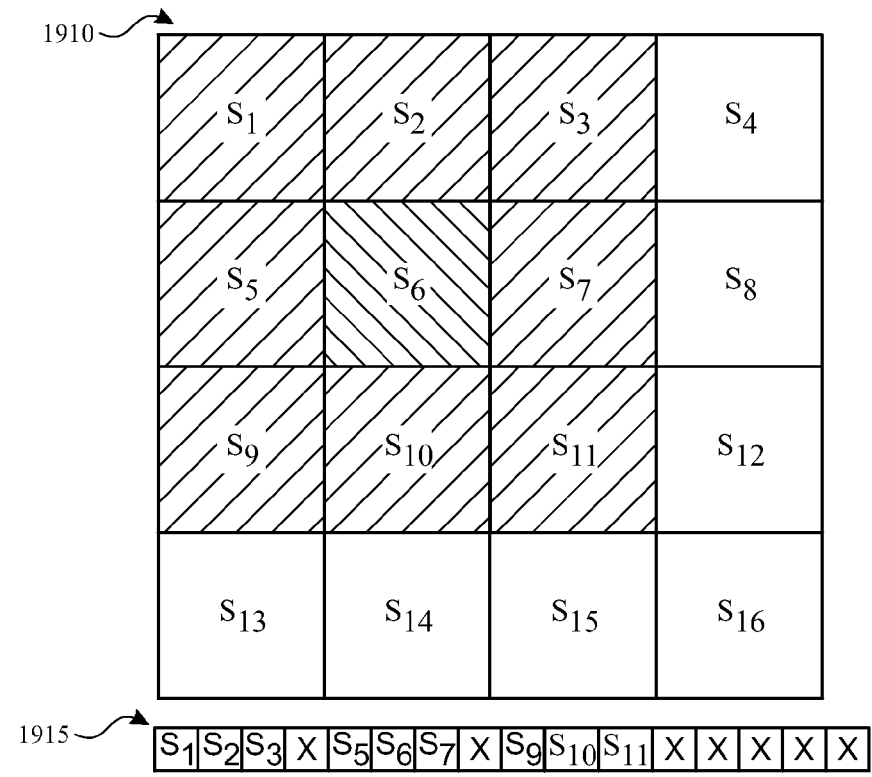
FIG. 19B illustrates an example timeline of scheduled fine scan steps modified based on the results of a coarse scan of a pixelated touch sensor panel with additional margin according to examples of the disclosure.

In some examples, the system can apply a border region around regions at which objects are detected before determining which scans to abort. FIG. 19B illustrates an example timeline of scheduled fine scan steps modified based on the results of a coarse scan of a pixelated touch sensor panel with additional margin according to examples of the disclosure. Like FIG. 19A, FIG. 19B divides a pixelated touch sensor panel 1910 into 16 regions for a coarse scan and for a fine scan including 16 scan steps (S1 through S16) scheduled to be performed in the 16 time periods illustrated in timeline 1915. In the example illustrated in FIG. 19B, the system detects an object touching or hovering at the shaded region labeled S6 during the coarse scan. The system detects no object touching or hovering at the remaining regions. The system can add a border region around the regions at which an object is coarsely detected. An exemplary border region around shaded region labeled S6 can be represented by shaded regions S1, S2, S3, S5, S7, S9, S10 and S11. During the subsequent fine scan, the system can perform scan steps S1, S2, S3, S5, S6, S7, S9, S10 and S11, and the system can abort the scan of the remaining steps. As illustrated in timeline 1915, aborted scan steps can be represented by an "X", and the remaining scan steps can be executed in their scheduled time periods. Adding a border region before determining scan steps to abort can improve performance when detecting an object moving with respect to the touch sensor panel.

Figure 19C:
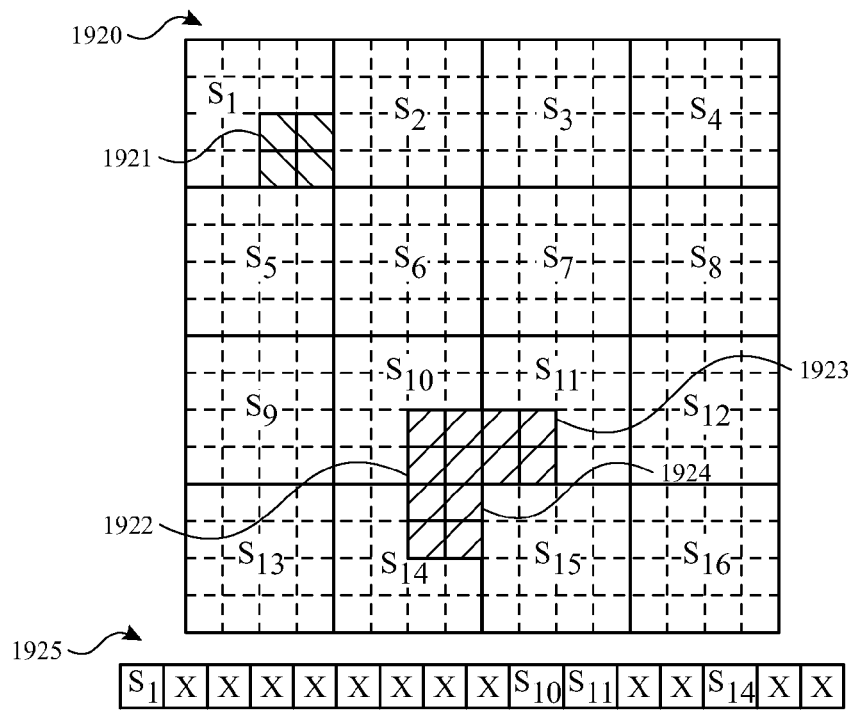
FIG. 19C illustrates another example timeline of scheduled fine scan steps modified based on the results of a coarse scan of a pixelated touch sensor panel according to examples of the disclosure.

In some examples, the region defined by the scan step and the region defined by the coarse scan can be different. FIG. 19C illustrates another example timeline of scheduled fine scan steps modified based on the results of a coarse scan of a pixelated touch sensor panel according to examples of the disclosure. Like FIG. 19A, FIG. 19C divides a pixelated touch sensor panel 1920 into 16 regions for a fine scan including 16 scan steps (S1 through S16) scheduled to be performed in the 16 time periods illustrated in timeline 1925. For the coarse scan, however, the region corresponding to each bank can be different than the region for each fine scan step. For example, the bank size can be four individual pixel electrodes for coarse scan, whereas the region for each fine scan step can include 16 individual pixel electrodes. In the example illustrated in FIG. 19C, the system detects an object touching or hovering at shaded regions 1921-1924 during the banked coarse scan. The system detects no object touching or hovering at the remaining regions during the banked coarse scan. During the subsequent fine scan, the system can perform scan steps S1, S10, S11 and S14, and the system can abort the scan of the remaining steps. Steps S1, S10, S11 and S14 can correspond to the regions encompassing shaded regions 1921-1924. As illustrated in timeline 1925, aborted scan steps can be represented by an "X", and the remaining scan steps can be executed in their scheduled time periods.

Figure 19D:
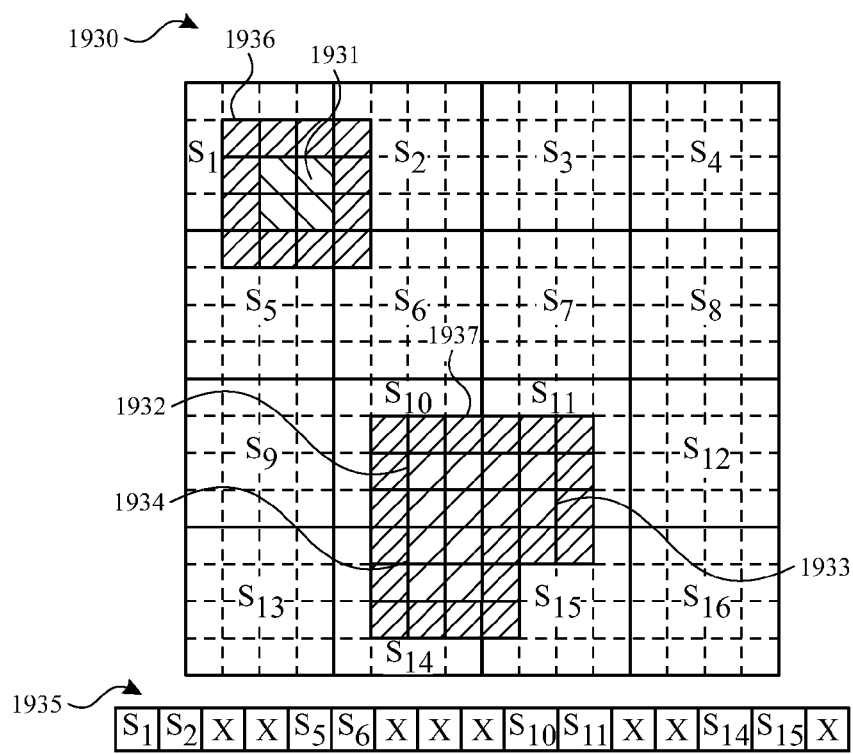
FIG. 19D illustrates another example timeline of scheduled fine scan steps modified based on the results of a coarse scan of a pixelated touch sensor panel with additional margin according to examples of the disclosure.

As discussed above, the system can apply a border region around regions at which objects are detected before determining which scans to abort. FIG. 19D illustrates another example timeline of scheduled fine scan steps modified based on the results of a coarse scan of a pixelated touch sensor panel with additional margin according to examples of the disclosure. Like FIG. 19C, FIG. 19D divides a pixelated touch sensor panel 1930 into 16 regions for a fine scan including 16 scan steps (S1 through S16) scheduled to be performed in the 16 time periods illustrated in timeline 1935. For the coarse scan, however, the region corresponding to each bank can be different than the region for the fine scan. For example, the bank size can be four individual pixel electrodes for coarse scan, whereas the region for each fine scan step can include 16 individual pixel electrodes. In the example illustrated in FIG. 19D, the system detects an object touching or hovering at shaded regions 1931-1934 during the banked coarse scan. The system detects no object touching or hovering at the remaining regions during the banked coarse scan. The system can add a border region around the regions at which an object is coarsely detected. A first border region 1936 can be around shaded region 1931 and a second border region 1937 can be around shaded regions 1932-1934. During the subsequent fine scan, the system can perform scan steps S1, S2, S5, S6, S10, S11, S14 and S15, and the system can abort the scan of the remaining steps. Steps S1, S2, S5, S6, S10, S11, S14 and S15 can correspond to the regions encompassing shaded regions 1931-1934 and border regions 1936 and 1937. As illustrated in timeline 1935, aborted scan steps can be represented by an "X", and the remaining scan steps can be executed in their scheduled time periods.

The border region illustrated in FIG. 19C includes the regions adjacent to the region at which touch is detected during the coarse scan. The border region illustrated in FIG. 19D includes individual electrodes around the region at which touch is detected during the coarse scan. In some examples, the border region can be as small as one electrode or as large as one or more adjacent regions. A larger border region can result in aborting fewer scans, whereas a smaller border region can result in more aborting more scans. The size of the border region can be optimized to balance between performance (i.e., to be more responsive to moving objects) and power savings (i.e., aborting more scans can save more power).

In FIGS. 19A-D, aborting a fine scan step can refer to performing no scanning of a fine scan region (i.e., the region of the panel to be scanned during the scheduled fine scan step) during the aborted scan step (all channels for the scan are powered down), and performing a fine scan step can refer to performing scanning of all of the fine scan region (all channels for the scan are powered up). In other words, aborting a scan step refers to aborting the entire fine scan region and performing a scan steps refers to scanning the entire fine scan region. In some examples, however, aborting a scan step can refer to aborting scanning for a portion of the scan step and powering down only those sense channels corresponding to the portions of the scan step that are aborted. The sense channels corresponding to the remaining portions of the fine scan region (i.e., not aborted portions) can be scanned. For example, rather than aborting all scanning for an entire fine scan region for a step, the system can abort, during the fine scan step, scans of one or more coarse scan regions (i.e., corresponding to the region of the panel to be scanned during the coarse scan) at which no touch is detected, and can perform scans of one or more coarse scan regions at which touch is detected.

Figures 19E, 20A, 20B, 20C:
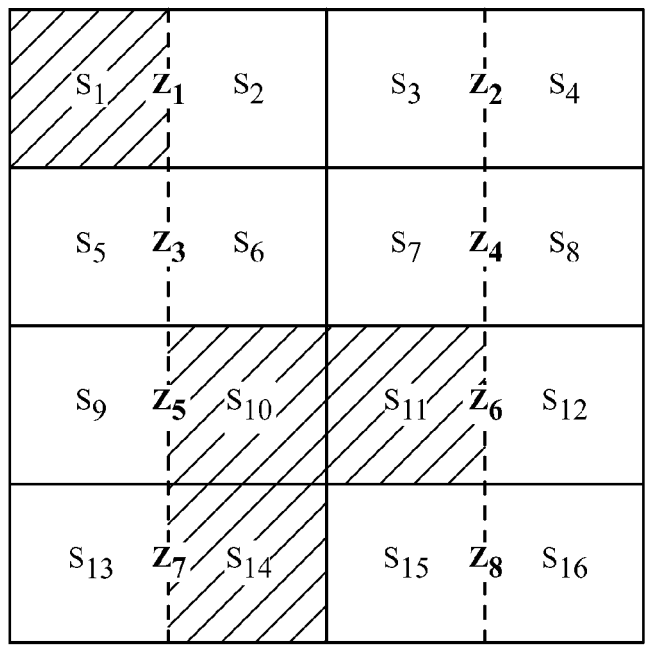
FIG. 19E illustrates another example timeline of scheduled fine scan steps modified based on the results of a coarse scan of a pixelated touch sensor panel according to examples of the disclosure.
FIGS. 20A-C illustrate examples of reallocating scan time to increase SNR of scans according to examples of the disclosure.

FIG. 19E illustrates another example timeline of scheduled fine scan steps modified based on the results of a coarse scan of a pixelated touch sensor panel according to examples of the disclosure. FIG. 19E divides a pixelated touch sensor panel into 16 regions for a coarse scan (as in FIGS. 19A and 19B) and 8 regions for a scheduled fine scan. The coarse scan can be performed for the 16 regions as discussed above. The scheduled fine scan of the touch sensor panel, however, can be completed in 8 fine scan steps (Z1-Z8) rather than in 16 scheduled fine scan steps illustrated in FIGS. 19A and 19B. For example, the regions of the panel corresponding to S1 and S2 in FIG. 19A can be scanned in a first fine scan step Z1 illustrated in FIG. 19E, and the regions of the panel corresponding to S3 and S4 in FIG. 19A can be scanned in a second fine scan step Z2 illustrated in FIG. 19E. The remaining regions can likewise be apportioned to the remaining scan steps. Instead of scanning the regions of the panel corresponding to S1, S10, S11 and S14 (at which touch events were detected during the coarse scan) during the corresponding fine scan steps and having the sense channels powered down during the remaining scan steps as illustrated in FIG. 19A, in the example illustrated in FIG. 19E, during some fine scan steps, a portion of the sense channels can be powered up and a portion of the sense channels can be powered down. For example, at fine scan step Z1, the sense channels associated with the scan of region of the panel corresponding to S1 in FIG. 19A (i.e., corresponding to a first coarse scan region in FIG. 19E) can powered up and the sense channels associated with the scan of region of the panel corresponding to S2 (i.e., corresponding to a second coarse scan region in FIG. 19E) can be powered down in order to benefit from power savings described herein. Likewise, the sense channels associated with the region of the panel corresponding to S9, S12 and S13 in FIG. 19A can be powered down during steps scan steps Z5-Z7 illustrated in FIG. 19E, respectively, while the sense channels associated with the region of the panel corresponding to S10, S11 and S14 in FIG. 19A can powered to sense touch events. As a result, rather than aborting or performing the entire scan step, the system can abort part of a fine scan step (e.g., corresponding to one or more coarse scan regions) and perform part of the fine scan step.

Similarly, referring back to FIG. 19C, rather than performing fine scans of steps S1, S10, S11 and S14 due to detecting touch events at coarse regions 1921-1924, the system can perform, during the fine scan, fine scans of coarse regions 1921-1924 and power down the sense channels corresponding to the remaining portions of the region corresponding to fine scan regions S1, S10, S11 and S14. Likewise, referring back to FIG. 19D (in which a border is added before determining which scans to abort/perform), rather than performing fine scans of steps S1, S2, S5, S6, S10, S11, S14 and S15, the system can perform, during the fine scan, fine scans of S1, S10, S11 and S14 and portions of the fine scans of S2, S5, S6 and S15. S1, S10, S11 and S14 can be scanned fully because each of the coarse scan regions forming the corresponding fine scan regions detects a touch event (or is considered as having detected the touch event by adding the border region). S2, S5, S6 and S15 can be scanned in part, because fewer than all coarse scan regions forming the corresponding fine scan regions detects a touch event (or is considered as having detected the touch event by adding the border region). For example, the two coarse scan regions forming the left half of the fine scan region scanned during S2 can be fine scanned during S2, and the two coarse scan regions forming the right half can be powered down. Likewise, the coarse scan region forming the upper left corner of the fine scan region scanned during S6 can be fine scanned during S6, and the remaining coarse scan regions can be powered down.

It should be understood that although described as performing part of a fine scan step corresponding to a coarse scan region, in other examples a portion of a fine scan region can be fine scanned during a step (and the sense channels corresponding to the rest of the fine scan region can be powered down) where the portion does not correspond to a coarse scan region. For example, in FIG. 19D, the fine scan can activate sense channels corresponding to areas at which a touch event was detected and disable sense channels corresponding to areas at which no touch event was detected. For example, when performing fine scan step S1, the system can power up the 9×9 region of S1 at which touch was detected (or is considered as having detected the touch event by adding the border region), and the sense channels to be coupled to the remaining 7 pixel electrodes can be disabled.

As described herein, in some examples, rather than abort scans based on the coarse scan, the system can repeat or duplicate some scan steps to increase SNR for the scan. The SNR improvement can come from averaging results of repeated scan steps or from increasing the duration of a scan step by performing the scan for more than one scan step period. This can be referred to as reallocating scan time to increase SNR of the scans. FIGS. 20A-C illustrate examples of reallocating scan time to increase SNR of scans according to examples of the disclosure. FIG. 20A represents a scheduled fine scan including scan steps (S1-S16) for scanning a pixelated touch sensor panel, with aborted scans based on a coarse scan. Each of the scan steps can refer to a fine scan of a region of the touch sensor panel as discussed herein. The aborted scans can be represented by "X" and the remaining scheduled scans can be represented by the scan step label. For example, in FIG. 20A, steps S1 and S11 remain scheduled (at t1 and t1), with the remaining scan steps aborted. Instead of aborting the scan steps, however, periods of time during which the system may have otherwise idled during an aborted scan step can be reallocated to repeat non-aborted scan steps. FIG. 20B represents a scheduled fine scan reallocating time from aborted scan steps for increased SNR of remaining scan steps. In FIG. 20B, each box can correspond to a time period (t1-t16) allotted to a scan step planned for a region of the touch sensor panel. The scan step label can represent the scan step performed and the corresponding region performed (or not performed when represented by an "X") during the time period. For example, scan step S1 can be repeated during the time period of aborted scan step S2 (i.e., at t1 and t2) and scan step S11 can be repeated during the time period of aborted scan step S12 (i.e., at t11 and t12). In other words, the region associated with S1 can be scanned during the time periods originally allotted for scan steps S1 and S2. Likewise, the region associated with S11 is scanned during the time periods originally allotted for scan steps S11 and S12. The results from duplicate scan steps can be averaged to increase the SNR by a factor of $\sqrt{N}$, where N is the number of times a scan step is repeated. Although FIG. 20B illustrates performing the remaining scheduled scan steps twice, in other examples, the scan steps can be repeated more than once. For example, FIG. 20C illustrates repeating scan step S1 three times and repeating scan step S11 three times.

In some examples, the scheduled scan steps can be reordered based on the results of the coarse scan. FIGS. 21A-C illustrate examples of reordering scan steps and reallocating scan time to increase SNR of scans according to examples of the disclosure. FIG. 21A represents a scheduled fine scan including scan steps (S1-S16) for scanning a pixelated touch sensor panel, with aborted scans based on a coarse scan. In the example of FIG. 21A, step S15 remains scheduled, with the remaining scan steps aborted. Instead of aborting the scan steps, however, periods of time during which the system may have otherwise idled during an aborted scan step can be reallocated to repeat non-aborted scan steps. Additionally, the scan steps can be reordered such that the system can perform scan steps without waiting for the scheduled time period. For example, FIG. 21B represents a scheduled fine scan reordering the scan steps and reallocating time from aborted scan steps for increased SNR of remaining scan steps. For example, original scan step S15 can be reordered to occur during the first time period t1 (i.e., originally allotted to scan step S1) and to be repeated during t2-t16, the time periods of aborted scan steps S2-S16 (including during the time period of originally schedule scan step S15). Although illustrated as repeating for all the aborted time periods, scan step S15 can be repeated fewer times than illustrated in FIG. 21B (or not at all). The results from duplicate scan steps can be averaged to increase the SNR. Although FIG. 21B illustrates reordering original scan step S15 to the first time period, in other examples, rather than reordering scan step S15, the repeated scan can be allocated to earlier time periods (i.e., with original scan step S15 performed during the time period originally allotted to scan step S15). Additionally, although illustrated in FIG. 21B as reordering scan step S15 to the first time period (t1), in other examples, the system cannot abort, reorder and/or repeat scans before execution of the fine scans begins. As a result, the originally scheduled scan can begin to be performed (and the results can be discarded) and the reordered and/or reallocated scan can begin at some time after the beginning of the scheduled fine scan. For example, FIG. 21C represents reordering and/or repeating scan step S15, but only after two aborted scan step time periods (t1 and t2) lapse. The number of lapsed time periods can depend on the time between the coarse scan and the fine scan and can depend on the processing time to analyze and act upon the coarse scan results.

FIGS. 22A-C illustrate additional examples of reordering scan steps and reallocating scan time to increase SNR of scans according to examples of the disclosure. FIG. 22A represents a scheduled fine scan including scan steps (S1-S16) for scanning a pixelated touch sensor panel, with aborted scans based on a coarse scan. In the example of FIG. 22A, steps S12 and S14 remain scheduled (during t12 and t14), with the remaining scan steps aborted. Instead of aborting the scan steps, however, periods of time during which the system may have otherwise idled during an aborted scan step can be reallocated to repeat non-aborted scan steps. Additionally, the scan steps can be reordered such that the system can perform scan steps without waiting for the scheduled time period. For example, FIG. 22B represents a scheduled fine scan reordering the scan steps and reallocating time from aborted scan steps for increased SNR of remaining scan steps. For example, scan step S12 can be reordered to occur during the first time period (t1) and to be repeated during the time period of aborted scan steps S2-S8 (t2-t8). Likewise, scan step S14 can be reordered to occur during the ninth time period (t9) and to be repeated during t10-t16, the time periods of aborted scan steps S9-S16 (including during the time period of originally scheduled scan step S14). Although illustrated as repeating for an additional seven time periods each, scan step S12 and S14 can be repeated fewer times than illustrated in FIG. 22B (or not at all). Additionally, the scans can be repeated a different number of times (e.g., scan step S12 can be repeated three times and scan step S14 can be repeated five times). The results from duplicate scan steps for S12 can be averaged to increase the SNR, and the results from duplicate scan steps for S14 can be averaged to increase the SNR. Although FIG. 22B illustrates reordering scan steps S12 and S14 to earlier time periods, in other examples, rather than reordering scan step S12 and S14, the repeated scan can be allocated to earlier time periods. Additionally, although illustrated in FIG. 22B as reordering scan step S12 to the first time period, in other examples, the system cannot abort, reorder and/or repeat scans in time. As a result, the originally scheduled scan can be performed (and the results can be discarded) and the reordered and/or reallocated scan can begin at some time after the beginning of the scheduled fine scan. Additionally or alternatively, scan step S14 can be reordered before scan step S12, even though scan step S14 was originally scheduled to be performed in a time period (t14) after scan step S12 (performed during time period t12). For example, FIG. 22C represents reordering and/or repeating scan steps S12 and S14, but only after three aborted scan step time periods lapse (t1-t3) and beginning with scan steps S14 (from t4-t9) followed by scan steps S12 (t10-t15). The number of lapsed time periods can depend on the time between the coarse scan and the fine scan and can depend on the processing time to analyze and act upon the coarse scan results.

Reallocating and/or reordering scheduled scans can increase complexity of the system. Additionally, as discussed herein, in some cases, scans cannot be reordered in the time before execution of steps of the fine scan. As a result, in some examples, the system can reorder and/or reallocate scans when one or more conditions are satisfied. For example, the system can reorder and/or reallocate scan time periods when the coarse scan detects few objects. In some examples, the system can reorder and/or reallocate scan time periods only when a single object (e.g., one finger or one stylus) is detected. In some examples reordering and/or reallocating scan steps can be performed when fewer than a threshold number of coarse or fine scan banks detect a touch event. For example, reordering and/or reallocating can be performed if fewer than 4 fine scan banks detect a touch event, or if fewer than 6 coarse scan banks detect a touch event. Alternatively, the system can reorder and/or reallocate scan steps when touch events are detected at less than a threshold percentage of the panel (e.g., touch events detected in less than 10% of the coarse banks).

The system can also measure SNR using one or more metrics. The system (e.g., hardware or firmware) can then evaluate power savings versus SNR tradeoffs to determine whether to reallocate scan time for improved SNR or to power down channels to save power. The evaluation of SNR can determine how many abandoned scans to reallocate for duplicate scans in order to get enough SNR improvement. In this way, the system can increase integration time as needed to gain sufficient SNR while also saving power by abandoning scans.

The determination of which scan steps to execute (or abort) for a fine scan based on the coarse scan results can be depend on various considerations other than based on the presence or absence of touch in various regions of the touch sensor panel. For example, as discussed above, the determination can also be based on a boundary region around regions at which touch is detected during a coarse scan. Additionally, some regions of the pixelated touch sensor panel can be scanned during the fine scan even if no touches are detected during the coarse scan (i.e., irrespective of the coarse scan results indicating no touch events). For example, some regions of the touch sensor panel can be scanned at all times, periodically, and/or based on the user interface. For example, if a touch screen displays a keyboard, the system can fine scan the portions of the touch sensor panel corresponding to keyboard, even when no touches are detected at those portions during the coarse scans. In another example, in an audio/video playback application, the system can scan portions of the touch screen corresponding to the playback controls (play/pause, fast forward, rewind, etc.) even if no touches are detected at those portions during the coarse scans.

Additionally, some regions of the touch sensor panel can be scanned, even when no touch is detected at the region, when a touch is detected in a related or linked region. For example, if a touch screen displays a keyboard, if a touch is detected at any portion of the keyboard during the coarse scan, other regions of the touch sensor panel corresponding to the keyboard can be scanned with a fine scan, even if no touch is detected at that region of the keyboard. The related or linked region can be context specific, such as linking regions based on the application in use, or can be based on the state of the device or the type of fine scan to be performed. The decisions regarding which regions to fine scan even without detecting a touch can also be determined based on the user interface, application in use, use of an input device such as a stylus, and a number of touch events detected at the panel in a coarse scan.

Figure 23:
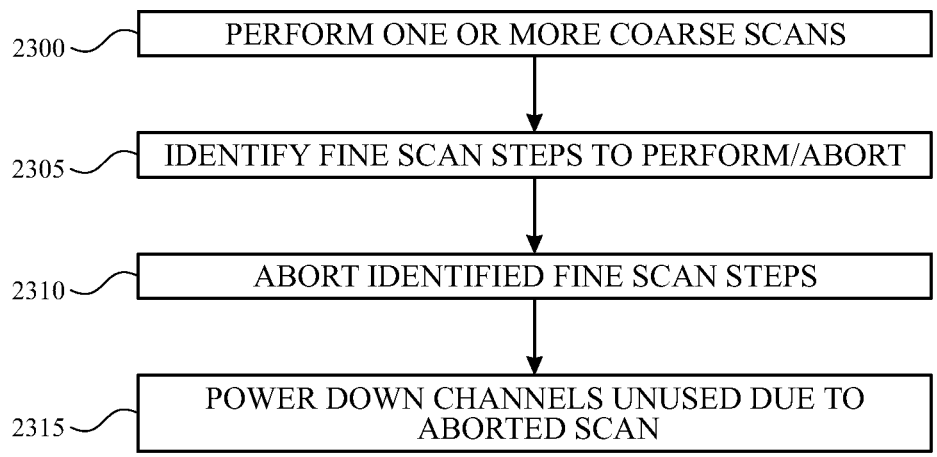
FIG. 23 illustrates an example process for modifying scanning operations based on one or more coarse detection scans according to examples of the disclosure.

FIG. 23 illustrates an example process for modifying scanning operations based on one or more coarse detection scans according to examples of the disclosure. The system can perform one or more coarse scans (2300). The one or more coarse scans can include self-capacitance and/or mutual capacitance scans to scan regions of the pixelated touch sensor panel in one or more scan steps. The system can identify which scheduled fine scan steps to perform or abort based on the results of the one or more coarse scans (2305). For example, the results of the one or more coarse scans can be analyzed to identify which regions of the pixelated touch sensor panel detected an object touching or hovering at the region (i.e., touch event) and which regions of the pixelated touch sensor panel detected no object touching or hovering at the region. In some examples, the system can perform prescheduled fine scan steps which scan at least part of a region detecting a touch event during the coarse scan. The system can abort prescheduled fine scan steps which scan a region detecting no touch event during the coarse scan. In some examples, before determining which scan steps to perform or abort, the system can add a border region around regions of touch sensor panel detecting touch events during the coarse scan. The electrodes in the border region can be considered as having detected a touch event during the coarse scan even if no touch event was detected at the border region. The system can then abort prescheduled fine scan steps which scan a region detecting no touch event during the coarse scan when considering the border region as having detected a touch event during the coarse scan.

In some examples, even if the fine scan step would otherwise be aborted based on the absence of touch events in one or more regions scheduled to be scanned during fine scan step, the fine scan step can be performed and not aborted. For example, in some cases, when touch is detected in a first region during a coarse scan, a fine scan of a linked or related region can be performed and not aborted, even when the no touch event is detected during the coarse scan of the linked or related region. Likewise, some regions of the panel can be scanned during each fine scan or periodically based, for example, on the user interface or state of the device. In such cases, the system can perform and not abort fine scan steps of those regions even when no touch event is detected during the coarse scan of the region.

After identifying which scheduled fine scan steps to abort and which fine scan steps to perform, the system can perform the scheduled fine scan steps that were identified to be performed at their respective scheduled times and abort the scheduled fine scan steps that were identified to be aborted (2310). The sense/receive channels assigned to sense during the aborted scan steps can be powered down during the time of the aborted fine scan steps (2315).

Figure 24:
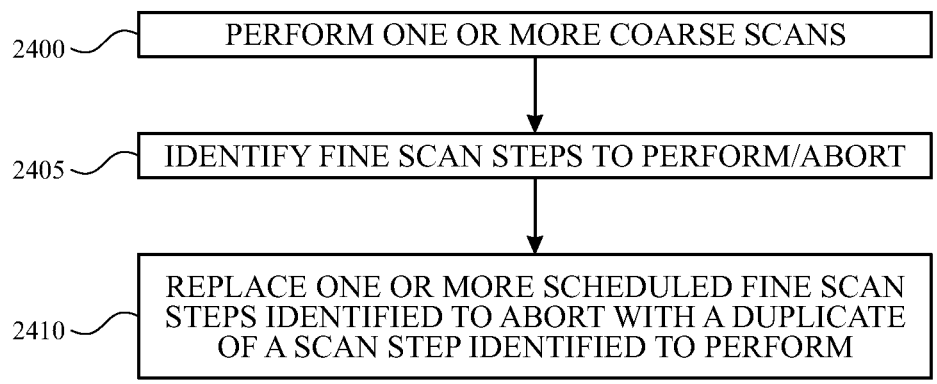
FIG. 24 illustrates another example process for modifying scanning operations based on one or more coarse detection scans according to examples of the disclosure.

FIG. 24 illustrates another example process for modifying scanning operations based on one or more coarse detection scans according to examples of the disclosure. The system can perform one or more coarse scans (2400). The one or more coarse scans can include self-capacitance and/or mutual capacitance scans to scan regions of the pixelated touch sensor panel in one or more scan steps. The system can identify which scheduled fine scan steps to perform or abort based on the results of the one or more coarse scans (2405). For example, the results of the one or more coarse scans can be analyzed to identify which regions of the pixelated touch sensor panel detected an object touching or hovering at the region (i.e., touch event) and which regions of the pixelated touch sensor panel detected no object touching or hovering at the region. In some examples, the system can perform prescheduled fine scan steps which scan at least part of a region detecting a touch event during the coarse scan. The system can abort prescheduled fine steps which scan a region detecting no touch event during the coarse scan. In some examples, before determining which scan steps to perform or abort, the system can add a border region around regions of touch sensor panel detecting touch events during the coarse scan. The electrodes in the border region can be considered as having detected a touch event during the coarse scan even if no touch event was detected at the border region. The system can then abort prescheduled fine scan steps which scan a region detecting no touch event during the coarse scan when considering the border region as having detected a touch event during the coarse scan.

In some examples, even if the fine scan step would otherwise be aborted based on the absence of touch events in one or more regions scheduled to be scanned during fine scan step, the fine scan step can be performed and not aborted. For example, in some cases, when touch is detected in a first region during a coarse scan, a fine scan of a linked or related region can be performed and not aborted, even when the no touch event is detected during the coarse scan of the linked or related region. Likewise, some regions of the panel can be scanned during each fine scan or periodically based, for example, on the user interface or state of the device. In such cases, the system can perform and not abort fine scan steps of those regions even when no touch event is detected during the coarse scan of the region.

Rather than simply aborting scan steps as in the process described with respect to FIG. 23, the system can replace one or more scheduled fine scan steps that were identified to be aborted, with one or more fine scan steps that were identified to be performed or duplicates of a fine scan step that was identified to be performed (2410). After replacing the one or more scheduled fine scan steps, the system can perform the scheduled fine scan steps that were identified to be performed and duplicate fine scan step at their respective scheduled times and abort the scheduled fine scan steps that were identified to be aborted and were not replaced with original or duplicate scan steps. The sense/receive channels assigned to sense during the aborted scan steps that were not replaced with duplicate scan steps can be powered down during the time of the aborted fine scan steps.

Therefore, according to the above, some examples of the disclosure are directed to an apparatus comprising a touch sensor panel and processing circuitry. The processing circuitry can be capable of scheduling a coarse scan and a fine scan to be executed during a scan frame, executing the coarse scan, and aborting at least a portion of the fine scan when no touch event is detected during execution of the coarse scan. Additionally or alternatively to one or more of the examples disclosed above, the touch sensor panel can comprise drive lines and sense lines. Additionally or alternatively to one or more of the examples disclosed above, executing the coarse scan can comprise stimulating a bank comprising a plurality of the drive lines with a common mode stimulation signal, receiving sense signals at one or more of the sense lines, the sense signals generated in response to the common mode stimulation signal, and generating at least one touch value for the bank. Additionally or alternatively to one or more of the examples disclosed above, executing the fine scan can comprise stimulating, in one or more steps, the drive lines with stimulation signals, receiving sense signals at the sense lines, the sense signals generated in response to the stimulation signals applied to the drive lines, and generating a touch value for a plurality of touch sensing nodes of the touch sensor panel, each of the plurality of touch sensing nodes measuring the mutual capacitance between a drive line and a sense line. Additionally or alternatively to one or more of the examples disclosed above, executing the fine scan can comprise stimulating, in one or more steps, the drive lines of one or more banks, but fewer than all banks, with stimulation signals, each bank comprising a plurality of the drive lines, at least one of the one or more banks having detected a touch event during the coarse scan, receiving sense signals at the sense lines, the sense signals generated in response to the stimulation signals applied to the drive lines of the one or more banks, and generating a touch value for a plurality of touch sensing nodes corresponding to the one or more banks, each touch sensing node measuring the mutual capacitance between a drive line and a sense line. Additionally or alternatively to one or more of the examples disclosed above, the processing circuitry can be further capable of generating an abort command, the abort command preventing or terminating execution of the fine scan. Additionally or alternatively to one or more of the examples disclosed above, the processing circuitry can be further capable of generating a one or more abort commands, the one or more abort commands preventing or terminating execution of one or more portions of the fine scan. Additionally or alternatively to one or more of the examples disclosed above, the processing circuitry can be further capable of discarding scan results from an aborted fine scan.

Other examples of the disclosure are directed to an apparatus comprising a touch sensor panel and processing circuitry. The processing circuitry can be capable of performing, during a first touch sensing frame, a first coarse scan and determining an operation for a second touch sensing frame based on a result of the first coarse scan. The processing circuitry can be further capable of performing, during the second touch sensing frame, a second coarse scan, and performing, during the second touch sensing frame, the determined operation. Additionally or alternatively to one or more of the examples disclosed above, the processing circuitry can comprise a touch controller capable of performing scanning operations, and a portion of the processing circuitry can be capable of programming the touch controller to perform the determined operation during the second touch sensing frame. Additionally or alternatively to one or more of the examples disclosed above, the first and second coarse scans can be banked common mode scans. Additionally or alternatively to one or more of the examples disclosed above, determining the operation for the second touch sensing frame based on the result of the first coarse scan can comprise determining an idle operation when the results of the first coarse scan indicate no touch event was detected. Additionally or alternatively to one or more of the examples disclosed above, determining the operation for the second touch sensing frame based on the result of the first coarse scan can comprise determining a full panel scan operation when the results of the first coarse scan indicate one or more touch events detected at at least a threshold number of banks of the touch sensor panel. Additionally or alternatively to one or more of the examples disclosed above, determining the operation for the second touch sensing frame based on the result of the first coarse scan can comprise determining a partial panel scan operation when the results of the first coarse scan indicate touch events detected at fewer than a threshold number of banks of the touch sensor panel.

Other examples of the disclosure are directed to an apparatus comprising a touch sensor panel and processing circuitry. The processing circuitry can be capable of performing a first detection scan to identify a location of an object touching or proximate to the touch sensor panel with a coarse resolution, and in response to identifying the coarse location of the object, reconfiguring a connection between electrodes of the touch sensor panel and sense channels of the processing circuitry and performing a second detection scan to identify the location of the object with a fine resolution. Additionally or alternatively to one or more of the examples disclosed above, during the first detection scan a plurality of super-pixel electrodes can be formed, each super-pixel formed by coupling together a plurality of pixel electrodes of the touch sensor panel. Touch values can be generated for the plurality of super-pixels electrodes. Additionally or alternatively to one or more of the examples disclosed above, identifying the location of the object with the coarse resolution can comprise identifying a super-pixel electrode corresponding to a maximum generated touch value. Additionally or alternatively to one or more of the examples disclosed above, identifying the location of the object with the coarse resolution can comprise identifying a region of the super-pixel electrode based on touch values of super-pixel electrodes adjacent to the super-pixel electrode corresponding to the maximum generated touch value. Additionally or alternatively to one or more of the examples disclosed above, the second detection scan can sense self-capacitance or mutual capacitance of individual pixel electrodes at the location identified with coarse resolution. Additionally or alternatively to one or more of the examples disclosed above, the second detection scan can sense self-capacitance or mutual capacitance of rows of individual pixel electrodes at the location identified with coarse resolution. Additionally or alternatively to one or more of the examples disclosed above, the second detection scan can sense self-capacitance or mutual capacitance of columns of individual pixel electrodes at the location identified with coarse resolution. Additionally or alternatively to one or more of the examples disclosed above, the second detection scan can sense self-capacitance or mutual capacitance pixel electrodes adjacent to the location identified with coarse resolution. Additionally or alternatively to one or more of the examples disclosed above, the number of super-pixel electrodes can correspond to the number of available sense channels of the processing circuitry.

Other examples of the disclosure are directed to a method executed by one or more processing circuits. The method can comprise scheduling a coarse scan and a fine scan to be executed during a scan frame, executing the coarse scan, and aborting at least a portion of the fine scan when no touch event is detected during execution of the coarse scan. Additionally or alternatively to one or more of the examples disclosed above, the coarse scan can be a banked common mode scan, wherein drive lines of the touch sensor panel are divided between a plurality of banks, and banks are stimulated with a common mode stimulation signal. Additionally or alternatively to one or more of the examples disclosed above, the fine scan can be a full panel scan. Additionally or alternatively to one or more of the examples disclosed above, the scan results from the fine scan can be discarded or ignored.

Other examples of the disclosure are directed to a method executed by one or more processing circuits. The method can comprise performing, during a first touch sensing frame, a first coarse scan, determining an operation for a second touch sensing frame based on a result of the first coarse scan, performing, during the second touch sensing frame, a second coarse scan, and performing, during the second touch sensing frame, the determined operation. Additionally or alternatively to one or more of the examples disclosed above, the method can further comprise programming a touch controller to perform the determined operation during the second touch sensing frame. Additionally or alternatively to one or more of the examples disclosed above, the first and second coarse scans can be banked common mode scans. Additionally or alternatively to one or more of the examples disclosed above, determining the operation for the second touch sensing frame based on the result of the first coarse scan can comprise determining an idle operation when the results of the first coarse scan indicate no touch event was detected. Additionally or alternatively to one or more of the examples disclosed above, determining the operation for the second touch sensing frame based on the result of the first coarse scan can comprise determining a full panel scan operation when the results of the first coarse scan indicate one or more touch events detected at at least a threshold number of banks of a touch sensor panel. Additionally or alternatively to one or more of the examples disclosed above, determining the operation for the second touch sensing frame based on the result of the first coarse scan can comprise determining a partial panel scan operation when the results of the first coarse scan indicate touch events detected at fewer than a threshold number of banks of the touch sensor panel.

Other examples of the disclosure are directed to a method executed by one or more processing circuits. The method can comprise performing a first detection scan to identify a location of an object touching or proximate to the touch sensor panel with a coarse resolution, and in response to identifying the coarse location of the object, reconfiguring a connection between electrodes of the touch sensor panel and sense channels of the processing circuitry and performing a second detection scan to identify the location of the object with a fine resolution. Additionally or alternatively to one or more of the examples disclosed above, the method can further comprise: during the first detection scan, forming a plurality of super-pixel electrodes, each super-pixel formed by coupling together a plurality of pixel electrodes of the touch sensor panel and generating touch values for the plurality of super-pixels electrodes. Additionally or alternatively to one or more of the examples disclosed above, identifying the location of the object with the coarse resolution can comprise identifying a super-pixel electrode corresponding to a maximum generated touch value. Additionally or alternatively to one or more of the examples disclosed above, identifying the location of the object with the coarse resolution can comprise identifying a region of the super-pixel electrode based on touch values of super-pixel electrodes adjacent to the super-pixel electrode corresponding to the maximum generated touch value. Additionally or alternatively to one or more of the examples disclosed above, the second detection scan can sense self-capacitance or mutual capacitance of individual pixel electrodes at the location identified with coarse resolution. Additionally or alternatively to one or more of the examples disclosed above, the second detection scan can sense self-capacitance or mutual capacitance of rows of individual pixel electrodes at the location identified with coarse resolution. Additionally or alternatively to one or more of the examples disclosed above, the second detection scan can sense self-capacitance or mutual capacitance of columns of individual pixel electrodes at the location identified with coarse resolution. Additionally or alternatively to one or more of the examples disclosed above, the second detection scan can sense self-capacitance or mutual capacitance pixel electrodes adjacent to the location identified with coarse resolution. Additionally or alternatively to one or more of the examples disclosed above, the number of super-pixel electrodes can correspond to the number of available sense channels of the processing circuitry.

Some examples of the disclosure are directed to a non-transitory computer readable storage medium. The computer readable medium can contain instructions that, when executed by a processor, can perform a method. The method can comprise scheduling a coarse scan and a fine scan to be executed during a scan frame, executing the coarse scan, and aborting at least a portion of the fine scan when no touch event is detected during execution of the coarse scan. Additionally or alternatively to one or more of the examples disclosed above, the coarse scan can be a banked common mode scan, wherein drive lines of the touch sensor panel are divided between a plurality of banks, and banks are stimulated with a common mode stimulation signal. Additionally or alternatively to one or more of the examples disclosed above, the fine scan can be a full panel scan. Additionally or alternatively to one or more of the examples disclosed above, the scan results from the fine scan can be discarded or ignored.

Some examples of the disclosure are directed to a non-transitory computer readable storage medium. The computer readable medium can contain instructions that, when executed by a processor, can perform a method. The method can comprise performing, during a first touch sensing frame, a first coarse scan, determining an operation for a second touch sensing frame based on a result of the first coarse scan, performing, during the second touch sensing frame, a second coarse scan, and performing, during the second touch sensing frame, the determined operation. Additionally or alternatively to one or more of the examples disclosed above, the method can further comprise programming a touch controller to perform the determined operation during the second touch sensing frame. Additionally or alternatively to one or more of the examples disclosed above, the first and second coarse scans can be banked common mode scans. Additionally or alternatively to one or more of the examples disclosed above, determining the operation for the second touch sensing frame based on the result of the first coarse scan can comprise determining an idle operation when the results of the first coarse scan indicate no touch event was detected. Additionally or alternatively to one or more of the examples disclosed above, determining the operation for the second touch sensing frame based on the result of the first coarse scan can comprise determining a full panel scan operation when the results of the first coarse scan indicate one or more touch events detected at at least a threshold number of banks of a touch sensor panel. Additionally or alternatively to one or more of the examples disclosed above, determining the operation for the second touch sensing frame based on the result of the first coarse scan can comprise determining a partial panel scan operation when the results of the first coarse scan indicate touch events detected at fewer than a threshold number of banks of the touch sensor panel.

Some examples of the disclosure are directed to a non-transitory computer readable storage medium. The computer readable medium can contain instructions that, when executed by a processor, can perform a method. The method can comprise performing a first detection scan to identify a location of an object touching or proximate to the touch sensor panel with a coarse resolution, and in response to identifying the coarse location of the object, reconfiguring a connection between electrodes of the touch sensor panel and sense channels of the processing circuitry and performing a second detection scan to identify the location of the object with a fine resolution.

Therefore, according to the above, some examples of the disclosure are directed to an apparatus (e.g., a touch controller). The apparatus can comprise sense channels and processing circuitry. The sense channels can be configured to be coupled to one or more electrodes of a pixelated touch sensor panel. The processing circuitry can be capable of scheduling one or more coarse scans of the pixelated touch sensor panel and a fine scan of the pixelated touch sensor panel, executing the one or more coarse scans, identifying one or more first banks of a plurality of first banks of electrodes of the pixelated touch sensor panel at which no touch event is detected by execution of the one or more coarse scans, determining one or more steps of the fine scan to abort based on at least the one or more first banks at which no touch event is detected by the execution of the one or more coarse scans, and aborting the determined one or more steps of the fine scan. Additionally or alternatively to one or more of the examples disclosed above, one or more of the sense channels unused during an aborted fine scan step can be powered down. Additionally or alternatively to one or more of the examples disclosed above, the one or more coarse scans can include a self-capacitance scan. During a self-capacitance scan each of a plurality of the sense channels can be coupled to one of the plurality of first banks of electrodes of the pixelated touch sensor panel, such that the self-capacitance scan can coarsely measure self-capacitance for the pixelated sensor panel in one scan step. Additionally or alternatively to one or more of the examples disclosed above, during each of the one or more steps of the fine scan, the sense channels can be coupled to individual electrodes of one of a plurality of second banks of electrodes. Additionally or alternatively to one or more of the examples disclosed above, the determining one or more steps of the fine scan to abort can include determining to abort a step of the fine scan when no touch event is detected during the execution of the one or more coarse scans at electrodes of a second bank to be scanned during the step of the fine scan. Additionally or alternatively to one or more of the examples disclosed above, the processing circuitry can be further capable of identifying one or more first banks of a plurality of first banks of electrodes of the pixelated touch sensor panel at which a touch event is detected by the execution of the one or more coarse scans, and identifying one or more electrodes proximate to and outside the one or more first banks at which the event is detected as having detected the touch event. Additionally or alternatively to one or more of the examples disclosed above, the processing circuitry can be further capable of identifying one or more first banks of a plurality of first banks of electrodes of the pixelated touch sensor panel at which a touch event is detected by the execution of the one or more coarse scans, and identifying one or more electrodes linked to the one or more first banks at which the event is detected as having detected the touch event. Additionally or alternatively to one or more of the examples disclosed above, determining the one or more steps of the fine scan to abort can include determining to not abort a step of the fine scan irrespective of the one or more coarse scans based on a state of the device. Additionally or alternatively to one or more of the examples disclosed above, the processing circuitry can be further capable of replacing an aborted step of the fine scan with a duplicate of a non-aborted scan step of the fine scan. Additionally or alternatively to one or more of the examples disclosed above, the processing circuitry can be further capable of replacing an aborted step of the fine scan with a non-aborted scan step of the fine scan.

Some examples of the disclosure are directed to a method for reducing power consumption of touch scanning operations for a device including a pixelated touch sensor panel. The method can comprise scheduling one or more coarse scans of the pixelated touch sensor panel and a fine scan of the pixelated touch sensor panel, executing the one or more coarse scans, identifying one or more first banks of a plurality of first banks of electrodes of the pixelated touch sensor panel at which no touch event is detected by execution of the one or more coarse scans, determining one or more steps of the fine scan to abort based on at least the one or more first banks at which no touch event is detected by the execution of the one or more coarse scans, and aborting the determined one or more steps of the fine scan. Additionally or alternatively to one or more of the examples disclosed above, the method can further comprise powering down one or more sense channels unused during an aborted fine scan step. Additionally or alternatively to one or more of the examples disclosed above, the one or more coarse scans can include a self-capacitance scan that measures a self-capacitance for each of the plurality of first banks of electrodes such that the pixelated sensor panel can be coarsely scanned in one scan step. Additionally or alternatively to one or more of the examples disclosed above, each step of the fine scan scans electrodes of one of a plurality of second banks of electrodes. Additionally or alternatively to one or more of the examples disclosed above, determining the one or more steps of the fine scan to abort can include determining to abort a step of the fine scan when no touch event is detected during the execution of the one or more coarse scans at electrodes of a second bank to be scanned during the step of the fine scan. Additionally or alternatively to one or more of the examples disclosed above, the method can further comprise identifying one or more first banks of a plurality of first banks of electrodes of the pixelated touch sensor panel at which a touch event is detected by the execution of the one or more coarse scans, and identifying one or more electrodes proximate to and outside the one or more first banks at which the event is detected as having detected the touch event. Additionally or alternatively to one or more of the examples disclosed above, the method can further comprise identifying one or more first banks of a plurality of first banks of electrodes of the pixelated touch sensor panel at which a touch event is detected by the execution of the one or more coarse scans, and identifying one or more electrodes linked to the one or more first banks at which the event is detected as having detected the touch event. Additionally or alternatively to one or more of the examples disclosed above, the method can further comprise replacing an aborted step of the fine scan with a duplicate of a non-aborted scan step of the fine scan. Additionally or alternatively to one or more of the examples disclosed above, the method can further comprise replacing an aborted step of the fine scan with a non-aborted scan step of the fine scan. Additionally or alternatively to one or more of the examples disclosed above, determining the one or more steps of the fine scan to abort can include determining to not abort a step of the fine scan irrespective of the one or more coarse scans based on a state of the device.

Some examples of the disclosure are directed to a non-transitory computer readable storage medium. The computer readable medium can contain instructions that, when executed by a processor, can perform a method. The method can comprise scheduling one or more coarse scans of the pixelated touch sensor panel and a fine scan of the pixelated touch sensor panel, executing the one or more coarse scans, identifying one or more first banks of a plurality of first banks of electrodes of the pixelated touch sensor panel at which no touch event is detected by execution of the one or more coarse scans, determining one or more steps of the fine scan to abort based on at least the one or more first banks at which no touch event is detected by the execution of the one or more coarse scans, and aborting the determined one or more steps of the fine scan. Additionally or alternatively to one or more of the examples disclosed above, the method can further comprise powering down one or more sense channels unused during an aborted fine scan step. Additionally or alternatively to one or more of the examples disclosed above, the one or more coarse scans can include a self-capacitance scan that measures a self-capacitance for each of the plurality of first banks of electrodes such that the pixelated sensor panel can be coarsely scanned in one scan step. Additionally or alternatively to one or more of the examples disclosed above, each step of the fine scan scans electrodes of one of a plurality of second banks of electrodes. Additionally or alternatively to one or more of the examples disclosed above, determining the one or more steps of the fine scan to abort can include determining to abort a step of the fine scan when no touch event is detected during the execution of the one or more coarse scans at electrodes of a second bank to be scanned during the step of the fine scan. Additionally or alternatively to one or more of the examples disclosed above, the method can further comprise identifying one or more first banks of a plurality of first banks of electrodes of the pixelated touch sensor panel at which a touch event is detected by the execution of the one or more coarse scans, and identifying one or more electrodes proximate to and outside the one or more first banks at which the event is detected as having detected the touch event. Additionally or alternatively to one or more of the examples disclosed above, the method can further comprise identifying one or more first banks of a plurality of first banks of electrodes of the pixelated touch sensor panel at which a touch event is detected by the execution of the one or more coarse scans, and identifying one or more electrodes linked to the one or more first banks at which the event is detected as having detected the touch event. Additionally or alternatively to one or more of the examples disclosed above, the method can further comprise replacing an aborted step of the fine scan with a duplicate of a non-aborted scan step of the fine scan. Additionally or alternatively to one or more of the examples disclosed above, the method can further comprise replacing an aborted step of the fine scan with a non-aborted scan step of the fine scan. Additionally or alternatively to one or more of the examples disclosed above, determining the one or more steps of the fine scan to abort can include determining to not abort a step of the fine scan irrespective of the one or more coarse scans based on a state of the device.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An apparatus comprising:
a touch sensor panel; and
processing circuitry coupled to the touch sensor panel, the processing circuitry capable of:
scheduling, prior to the start of a scan frame, a coarse scan to be executed during a first time period of the scan frame and a fine scan to be executed during a second time period of the scan frame, wherein the second time period is after the first time period and wherein the fine scan includes a plurality of predetermined fine scan steps;
executing the coarse scan;
beginning execution of the fine scan after executing the coarse scan; and
aborting, after executing at least a first portion of the fine scan including one or more first fine scan steps of the plurality of predetermined fine scan steps, at least a second portion of the fine scan including one or more second fine scan steps of the plurality of predetermined fine scan steps when no touch event is detected during execution of the coarse scan.

2. The apparatus of claim 1, wherein the touch sensor panel comprises drive lines and sense lines, and executing the coarse scan comprises:
stimulating a bank comprising a plurality of the drive lines with a common mode stimulation signal;
receiving sense signals at one or more of the sense lines, the sense signals generated in response to the common mode stimulation signal; and
generating at least one touch value for the bank.

3. The apparatus of claim 1, wherein the touch sensor panel comprises drive lines and sense lines, and executing the fine scan comprises:
stimulating, in one or more steps, the drive lines with stimulation signals;
receiving sense signals at the sense lines, the sense signals generated in response to the stimulation signals applied to the drive lines; and
generating a touch value for a plurality of touch sensing nodes of the touch sensor panel, each of the plurality of touch sensing nodes measuring a mutual capacitance between a drive line and a sense line.

4. The apparatus of claim 1, wherein the touch sensor panel comprises drive lines and sense lines, and executing the fine scan comprises:
stimulating, in one or more steps, the drive lines of one or more banks, but fewer than all banks, with stimulation signals, each bank comprising a plurality of the drive lines, at least one of the one or more banks having detected a touch event during the coarse scan;
receiving sense signals at the sense lines, the sense signals generated in response to the stimulation signals applied to the drive lines of the one or more banks; and
generating a touch value for a plurality of touch sensing nodes corresponding to the one or more banks, each touch sensing node measuring a mutual capacitance between a drive line and a sense line.

5. The apparatus of claim 1, wherein the processing circuitry is further capable of generating an abort command, the abort command preventing or terminating execution of the fine scan.

6. The apparatus of claim 1, wherein the processing circuitry is further capable of generating one or more abort commands, the one or more abort commands preventing or terminating execution of one or more portions of the fine scan.

7. The apparatus of claim 1, wherein the processing circuitry is further capable of discarding scan results from an aborted fine scan.

8. A method for reducing power consumption of touch scanning operations, comprising:
scheduling, prior to the start of a scan frame, a coarse scan to be executed during a first time period of the scan frame and a fine scan to be executed during a second time period of the scan frame, wherein the second time period is after the first time period and wherein the fine scan includes a plurality of predetermined fine scan steps;
executing the coarse scan;
beginning execution of the fine scan after executing the coarse scan; and
aborting, after executing at least a first portion of the fine scan including one or more first fine scan steps of the plurality of predetermined fine scan steps, at least a second portion of the fine scan including one or more second fine scan steps of the plurality of predetermined fine scan steps when no touch event is detected during execution of the coarse scan.

9. The method of claim 8, wherein the coarse scan is a banked common mode scan, wherein drive lines of a touch sensor panel are divided between a plurality of banks, and banks are stimulated with a common mode stimulation signal.

10. The method of claim 8, wherein the fine scan is a full panel scan.

11. The method of claim 8, wherein scan results from the fine scan are discarded or ignored.

12. The method of claim 8, further comprising:
generating an abort command, the abort command preventing or terminating execution of the fine scan.

13. The method of claim 8, further comprising generating one or more abort commands, the one or more abort commands preventing or terminating execution of one or more portions of the fine scan.

14. A non-transitory computer readable storage medium, the computer readable medium containing instructions that, when executed by a processor, can perform a method, the method comprising:
scheduling, prior to the start of a scan frame, a coarse scan to be executed during a first time period of the scan frame and a fine scan to be executed during a second time period of the scan frame, wherein the second time period is after the first time period and wherein the fine scan includes a plurality of predetermined fine scan steps;
executing the coarse scan;
beginning execution of the fine scan after executing the coarse scan; and
aborting, after executing at least a first portion of the fine scan including one or more first fine scan steps of the plurality of predetermined fine scan steps, at least a second portion of the fine scan including one or more second fine scan steps of the plurality of predetermined fine scan steps when no touch event is detected during execution of the coarse scan.

15. The non-transitory computer readable storage medium of claim 14, wherein executing the coarse scan comprises:
stimulating a bank comprising a plurality of drive lines of a touch sensor panel with a common mode stimulation signal;
receiving sense signals at one or more sense lines of the touch sensor panel, the sense signals generated in response to the common mode stimulation signal; and
generating at least one touch value for the bank.

16. The non-transitory computer readable storage medium of claim 14, wherein executing the fine scan comprises:
stimulating, in one or more steps, drive lines of a touch sensor panel with stimulation signals;
receiving sense signals at sense lines of the touch sensor panel, the sense signals generated in response to the stimulation signals applied to the drive lines; and
generating a touch value for a plurality of touch sensing nodes of the touch sensor panel, each of the plurality of touch sensing nodes measuring a mutual capacitance between a drive line and a sense line.

17. The non-transitory computer readable storage medium of claim 14, wherein executing the fine scan comprises:
stimulating, in one or more steps, one or more banks, but fewer than all banks, of a touch sensor panel with stimulation signals, the touch sensor panel comprising drive lines and sense lines, each bank comprising a plurality of the drive lines, at least one of the one or more banks having detected a touch event during the coarse scan;
receiving sense signals at the sense lines, the sense signals generated in response to the stimulation signals applied to the plurality of drive lines of the one or more banks; and
generating a touch value for a plurality of touch sensing nodes corresponding to the one or more banks, each touch sensing node measuring a mutual capacitance between a drive line and a sense line.

18. The non-transitory computer readable storage medium of claim 14, further comprising:
generating an abort command, the abort command preventing or terminating execution of the fine scan.

19. The non-transitory computer readable storage medium of claim 14, further comprising:
generating one or more abort commands, the one or more abort commands preventing or terminating execution of one or more portions of the fine scan.

20. The non-transitory computer readable storage medium of claim 14, further comprising:
discarding scan results from an aborted fine scan.

* * * * *